United States Patent
Iwasaki

(10) Patent No.: US 6,987,931 B2
(45) Date of Patent: Jan. 17, 2006

(54) FLASH CONTROL DEVICE, FLASH CONTROL SYSTEM, MASTER FLASH DEVICE, AND REMOTE FLASH DEVICE

(75) Inventor: Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/849,428

(22) Filed: May 20, 2004

(65) Prior Publication Data

US 2004/0240868 A1     Dec. 2, 2004

(30) Foreign Application Priority Data

May 30, 2003   (JP)   .............................. 2003-154774

(51) Int. Cl.
*G03B 15/05*     (2006.01)
(52) U.S. Cl. ...................... 396/157; 396/157; 396/171; 396/182
(58) Field of Classification Search .................. 396/56, 396/57, 157, 171, 182
See application file for complete search history.

(56) References Cited

U.S. PATENT DOCUMENTS 6,512,890 B2 *   1/2003   Kawasaki et al. .......... 396/157

FOREIGN PATENT DOCUMENTS

| JP | A 6-194725 | 7/1994 |
|---|---|---|
| JP | A 2000-89306 | 3/2000 |

* cited by examiner

Primary Examiner—W.B. Perkey
(74) Attorney, Agent, or Firm—Oliff & Berridge, PLC

(57) ABSTRACT

A flash control device has selectable two light emission modes. The first light emission mode causes a remote flash part to perform a light emission with a main light emission of a master flash part. The second light emission mode causes a remote flash part to perform a light emission with a pulse light emission (communication light emission) of the master flash part. Light emission indication of the communication light emission is transmitted at a timing preceding the main light emission by a predetermined wait time period. When the main light emission is performed within a predetermined light-emission start time period after the shutter is released, the flash control device automatically selects the first light emission mode, and selects the second light emission mode otherwise. Accordingly, when performing a rear synchronous photographing operation, the remote flash part can be effectively prevented from mistakenly performing a light emission.

20 Claims, 35 Drawing Sheets

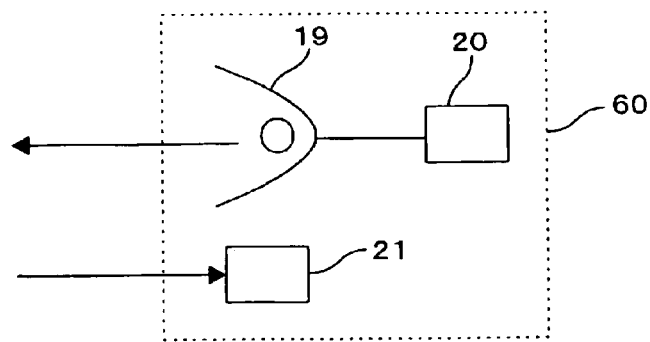
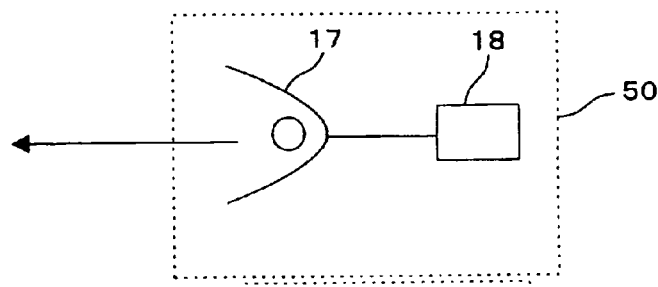
Fig.1
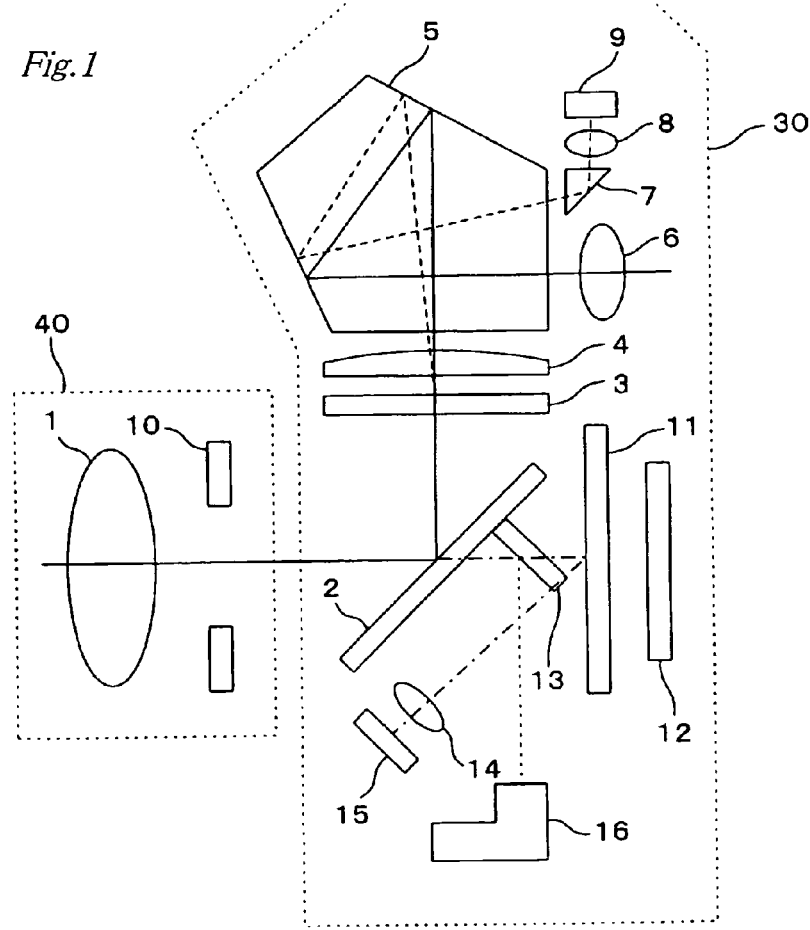

Fig. 3
Fig.3(a)
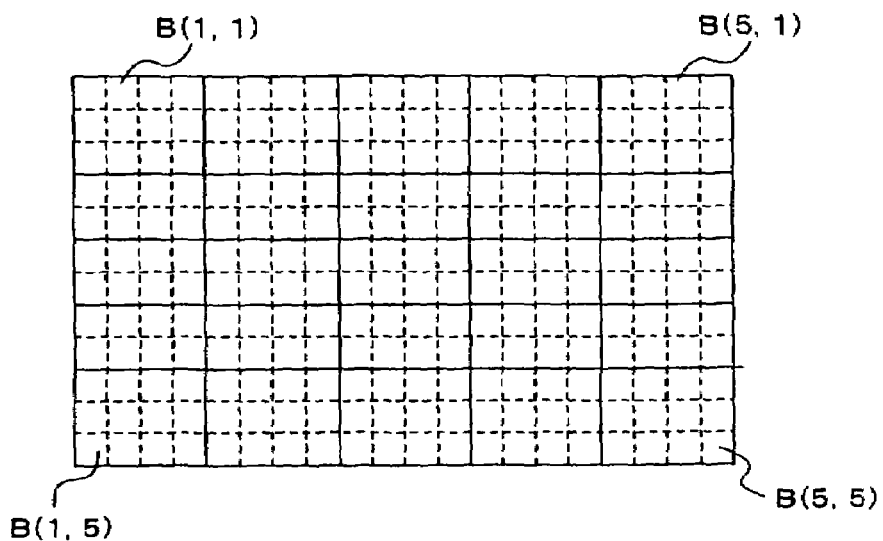
Fig.3(b)
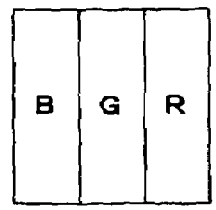
Fig.3(c)
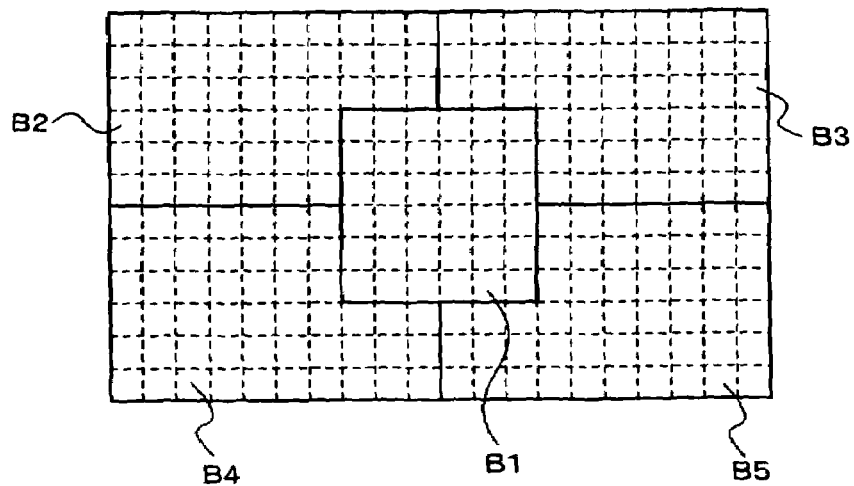

Fig. 4
Fig.4(a)
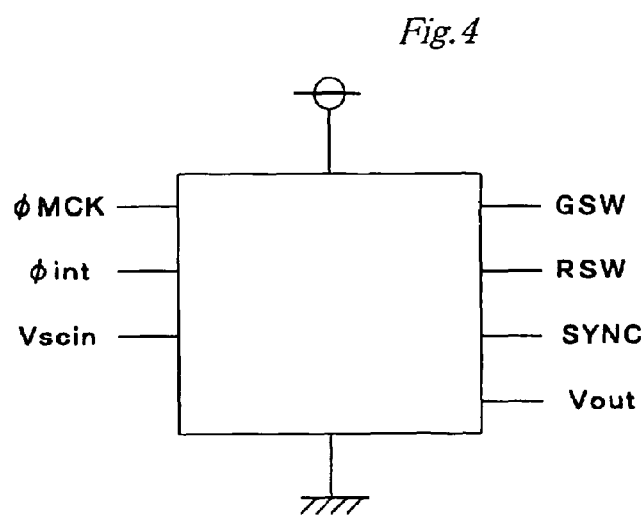
Fig.4(b)
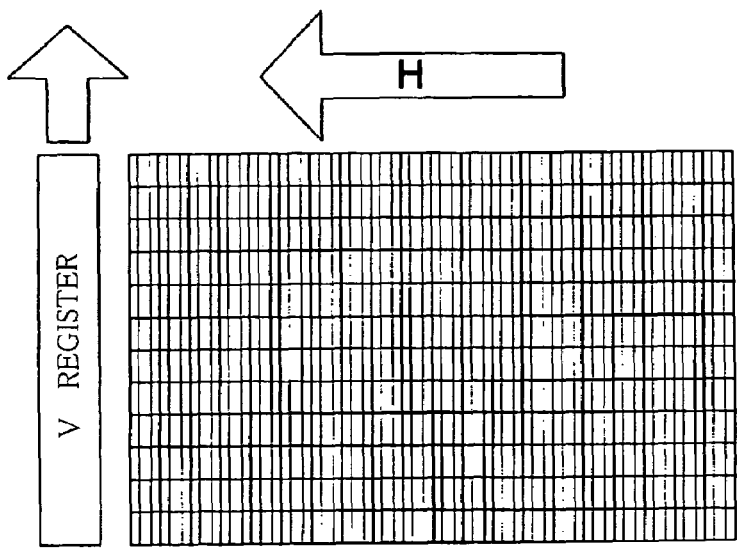
Fig.4(c)
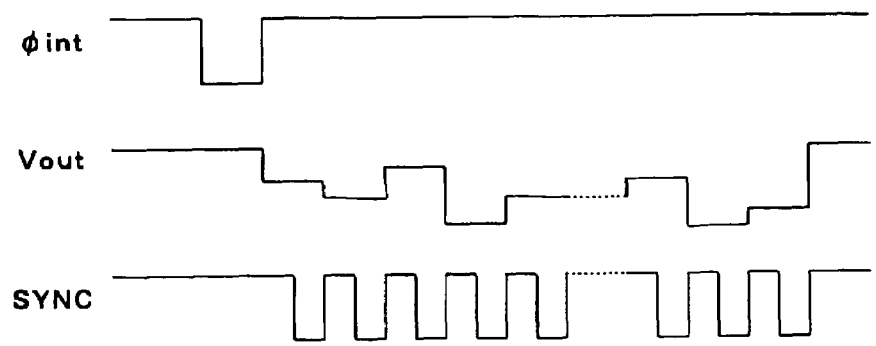

Fig.5
Fig.5(a)
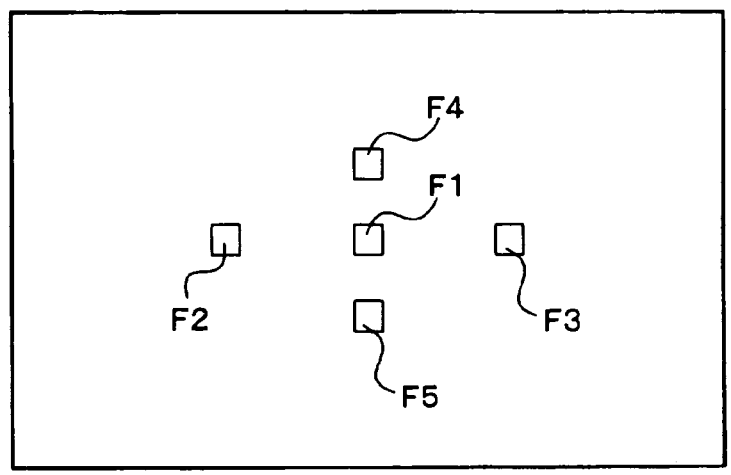
Fig.5(b)
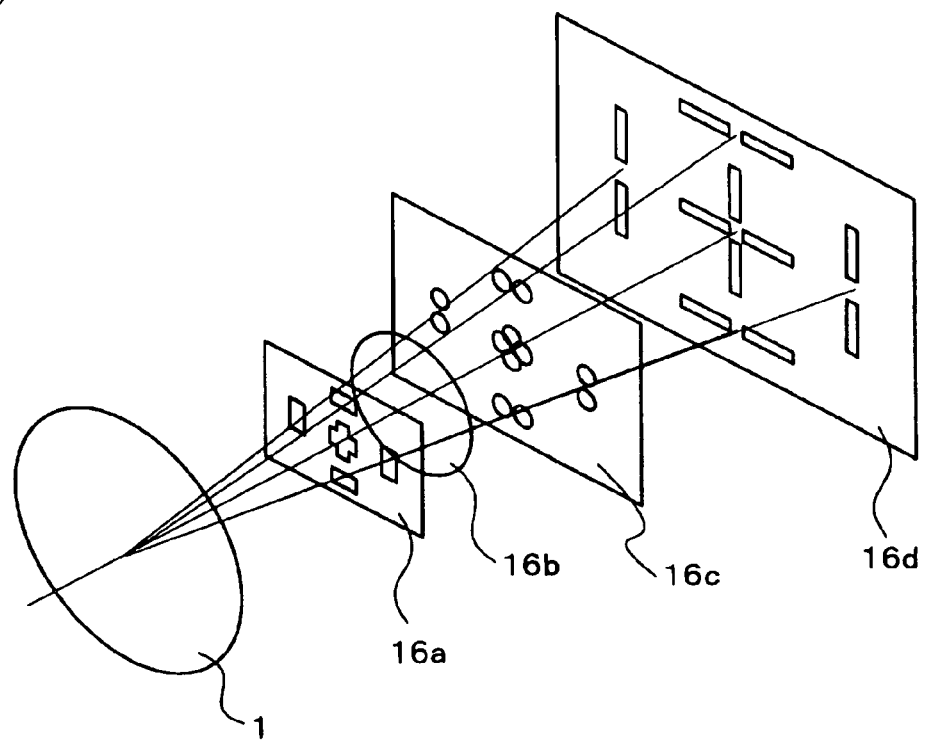

*Fig. 7*
Fig.7(a)
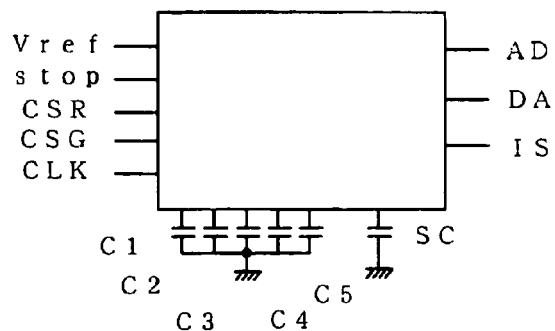
Fig.7(b)
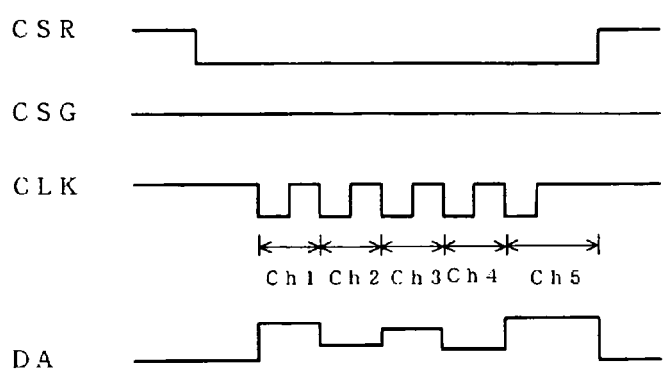
Fig.7(c)
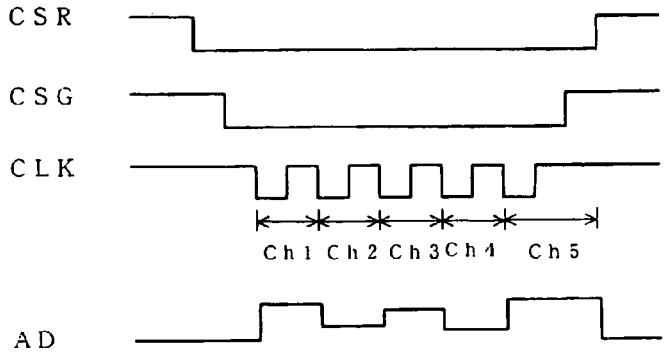

FIG. 22(a)
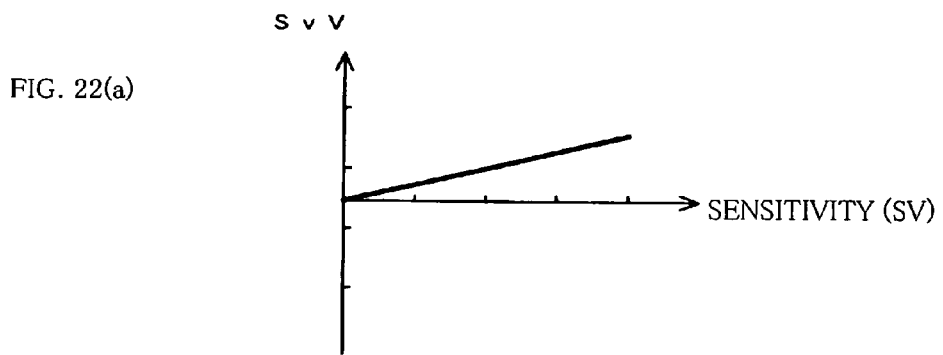
FIG. 22(b)
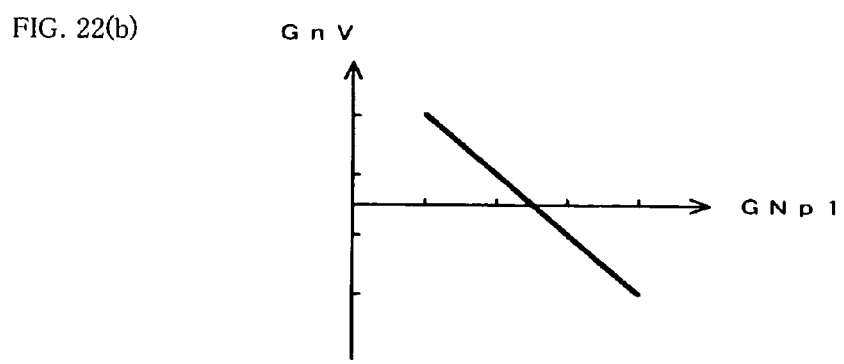
FIG. 22(c)
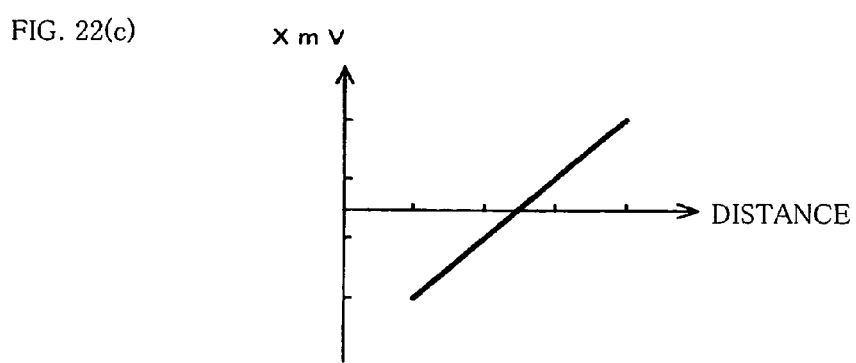
FIG. 22(d)
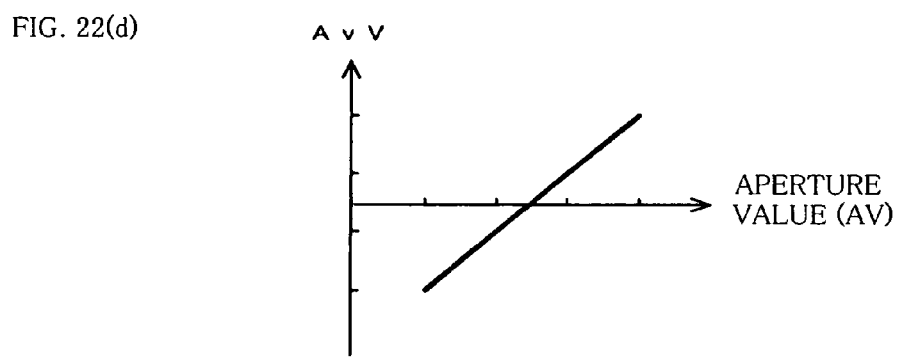
Fig.22

FIG. 24(a)
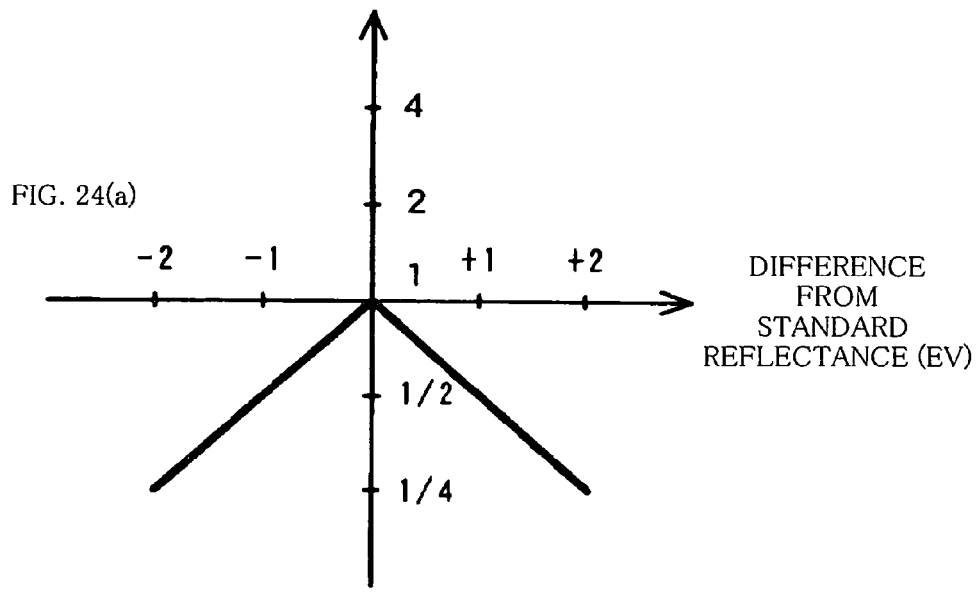
FIG. 24(b)
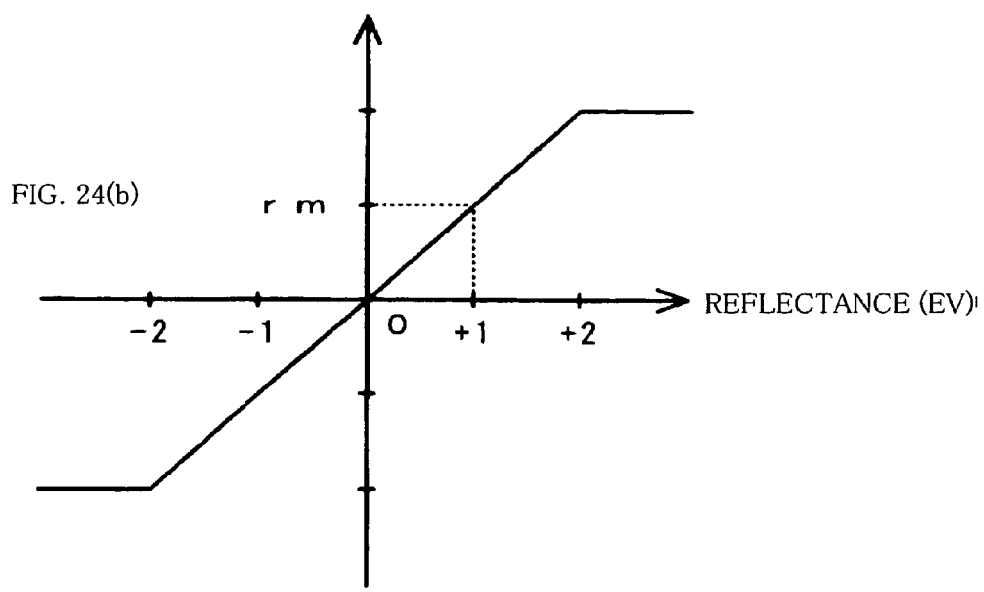
Fig.24

FIG. 25(a)
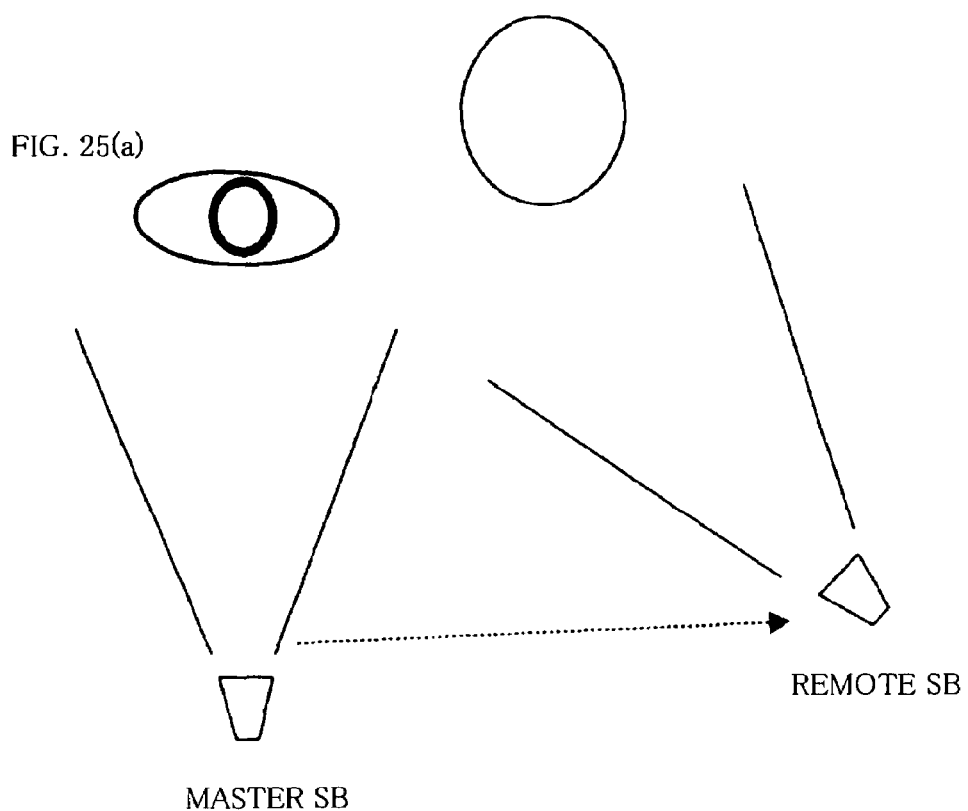
MASTER SB
REMOTE SB
FIG. 25(b)
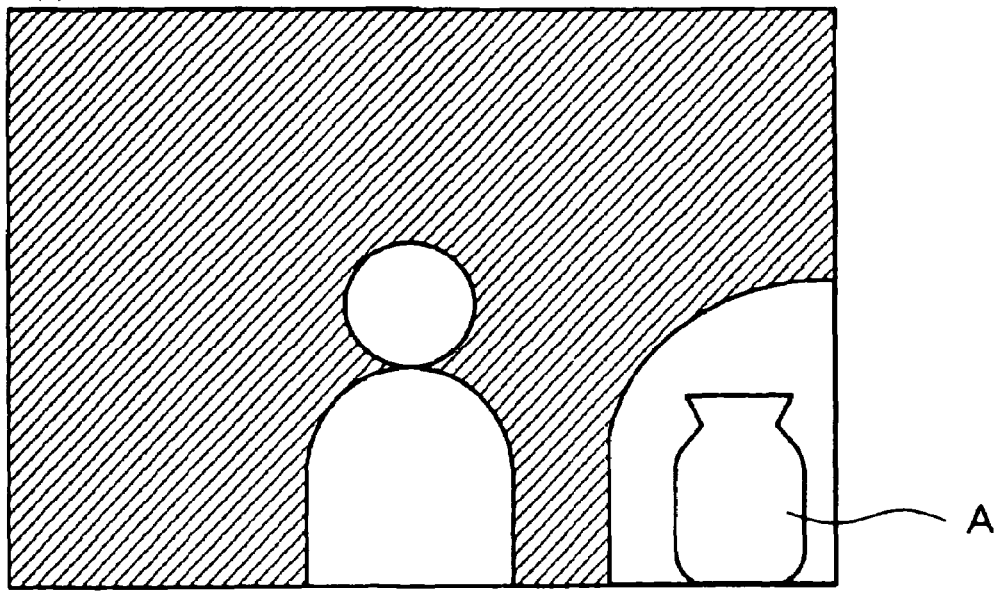
A
Fig.25

| REMOTE SETTING | COMMAND | DATA |
|---|---|---|
| | 0 1 1 0 | 1 0 0 1 (TTL) |

| PRELIMINARY LIGHT EMISSION (LOW) | COMMAND | DATA |
|---|---|---|
| | 1 0 0 1 | ONLY TRIGGER |

| PRELIMINARY LIGHT EMISSION (HIGH) | COMMAND | DATA |
|---|---|---|
| | — — — — | ONLY TRIGGER |

| MAIN LIGHT EMISSION AMOUNT DATA (RELEASE COMMAND) | COMMAND | DATA |
|---|---|---|
| | 0 1 0 1 | * * * * * * * * |

| LIGHT EMISSION INDICATING SIGNAL (MAIN LIGHT EMISSION COMMAND) IN SECOND LIGHT EMISSION MODE | COMMAND | DATA |
|---|---|---|
| | 0 0 1 0 | ONLY TRIGGER |

FIG. 34(a)
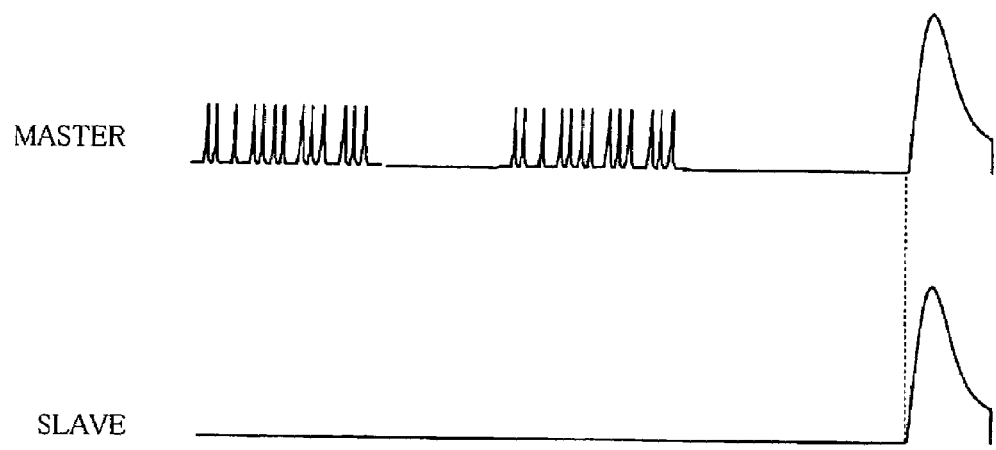
FIG. 34(b)
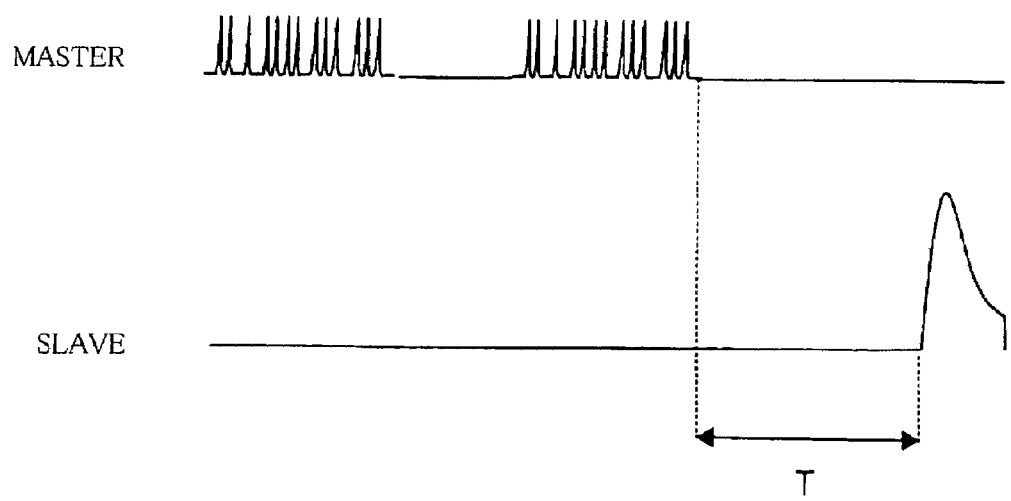
Fig.34

[TABLE 1]

| SETTING ITEM | SELECTABLE OPERATION |
|---|---|
| 1. PRELIMINARY PHOTOMETRY | 1-1 BY ONLY FINDER PHOTOMETRY PART 32 |
| | 1-2 AUTOMATIC SETTING : BY DIRECT PHOTOMETRY PART 33 IN SINGLE-FLASH NON-FV LOCK MODE, AND BY FINDER PHOTOMETRY PART 32 IN OTHER MODES |
| 2. LIGHT EMISSION MODE IN MULTIPLE-FLASH MODE | 2-1 ALWAYS FIRST LIGHT EMISSION MODE |
| | 2-2 AUTOMATIC SETTING: SEE TABLE 2 |
| | 2-3 ALWAYS SECOND LIGHT EMISSION MODE |

*Fig.35*

[TABLE 2]

| SINGLE-FLASH CONTROL | MULTIPLE-FLASH CONTROL | | | |
|---|---|---|---|---|
| | FRONT CURTAIN SYNCHRO. | REAR SYNCHRONOUS PHOTOGRAPHY | | |
| | | SHUTTER VALUE : 1/2 SECONDS OR SHORTER | SHUTTER VALUE : 1/2 SECONDS OR LONGER | BULB |
| | FIRST LIGHT EMISSION MODE | | SECOND LIGHT EMISSION MODE | |

*Fig.36*

FLASH CONTROL DEVICE, FLASH CONTROL SYSTEM, MASTER FLASH DEVICE, AND REMOTE FLASH DEVICE

CROSS-REFERENCE TO RELATED APPLICATIONS

This application is based upon and claims the benefit of priority from the prior Japanese Patent Application No. 2003-154774, filed on May 30, 2003, the entire contents of which are incorporated herein by reference.

BACKGROUND OF THE INVENTION

1. Field of the Invention

The present invention relates to a flash control device that controls a plurality of flash devices in synchronization with a photographing operation of a camera.

In addition, the present invention relates to a flash control system that performs a multiple-flash operation with a plurality of flash devices.

Moreover, the present invention relates to a master flash device that gives light emission indication to a remote flash device.

Furthermore, the present invention relates to a remote flash device that receives the light emission indication from the master flash device.

2. Description of the Related Art

As a device that controls a plurality of flash devices (hereinafter referred to as SB), for example, Japanese Unexamined Patent Application Publication No. 2000-89306 (hereinafter referred to as patent document 1) is known.

In addition, a system disclosed in Japanese Patent No. 3262874 (hereinafter referred to as patent document 2) is known.

FIG. 34(a) and FIG. 34(b) are schematic diagrams describing timings of light emissions of those conventional examples.

In the patent document 1, as shown in FIG. 34(a), a pulse light emission of a master SB causes a slave SB to prepare to emit light. Thereafter, when the slave SB detects a main light emission of the master SB, the slave SB performs a light emission in synchronization with the main light emission.

In this case, since the master SB communicates with the slave SB using pulse light emitted by a xenon lamp, the communication is performed before the shutter of the camera is released, to prevent a photographing operation of the camera from being adversely affected by the pulse light.

In contrast, in the patent document 2, as shown in FIG. 34(b), with a pulse light emission performed by a camera (master SB), a timing T of the light emission is sent to a slave SB. The slave SB counts the timing T of the light emission with its timer and performs a main light emission by its own decision.

As a photographing technology of a camera, multiple flashing is known. In the multiple flashing, to adjust the shadow of a subject and to increase the light amount, a plurality of flash devices emits light. In this case, it is preferable that the plurality of flash devices emits light at the same time. If flashing timings of the flash devices are different, the photographed image will blur when a moving subject is photographed.

In the system described in the patent document 1 (see FIG. 34(a)), immediately after the slave SB receives a light emission from the master SB, it performs a light emission. Thus, the patent document 1 is superior to the other in simultaneity.

In addition, as a photographing technique of a camera, rear synchronous photography (rear curtain synchronous photography) is known. In this technique, a main light emission is performed immediately before the shutter is closed. In the rear synchronous photography, the trace of a subject that has not been flashed overlaps with the subject that has been clearly flashed. Thus, the trace of the moving subject can be photographed as a tail.

In the rear synchronous photography, to photograph a long trace of a moving subject, the time period until a light emission is performed after the shutter is released may become long. In this case, in the patent document 1, since the slave SB prepares to perform a light emission by a communication from the master SB before the shutter is released, the waiting time of the slave SB becomes long. Consequently, the slave SB on standby tends to react with light emitted by other source than the master SB and malfunction.

When a subject is photographed with a background of fireworks by the rear synchronous photography, in a moment that the fireworks light, the slave SB reacts thereto and emits light. In this case, the slave SB cannot emit light at the expected timing of the rear synchronous photography. Furthermore, the slave SB fails to emit light in synchronization with the master SB.

To prevent such problems, if pulse communication is tried to perform immediately before light is emitted by the rear synchronous photography, the pulse light is photographed by the camera. As a result, a proper exposure cannot be obtained.

In such a case, the technology in the patent document 2 (see FIG. 34(b)) is effective. In this system, the timing of a light emission to be performed by the slave SB can be indicated in advance. Thus, even in a case where it takes time until the slave SB actually emits light after it receives a communication, the timing of the light emission that the slave SB performs can be indicated with its own timer.

However, in such a system, if there is a difference between the timer of the camera side and that of the slave SB side, the timings of the light emissions of the camera side and the slave SB side deviate. In particular, when the rear synchronous photography is performed, the time period until the slave SB actually emits light after it receives a communication may become endlessly long. For example, even if the error of the timer is 1%, a shutter time of 100 seconds results in a deviation of one second in the timing of a light emission.

SUMMARY OF THE INVENTION

An object of the present invention is to provide a flash control method that allows a plurality of flash devices to synchronize in timings of light emissions even in the rear synchronous photography and that hardly malfunctions.

Hereinafter, the present invention will be described.

According to an aspect of the present invention, a flash control device controls a flash in synchronization with photographing operation of a camera, and has a master flash part and a controlling part for controlling a light emission of the master flash part.

The controlling part has a first light emission mode and a second light emission mode, which are selectable.

In the first light emission mode, the controlling part gives the remote flash part indication to perform a light emission by a light emission indicating signal using a main light emission of the master flash part.

In the second light emission mode, the controlling part performs a communication light emission to the remote flash part using a pulse light emission of the master flash part, and gives the remote flash part indication to perform a light emission by a light emission indicating signal using the communication light emission.

Preferably, when the second light emission mode is executed, the controlling part operates at the following timing. First of all, the controlling part decides a timing at which the master flash part and/or the remote flash part performs the main light emission. Thereafter, the controlling part obtains a timing preceding the main light emission by a predetermined wait time period. The controlling part transmits a light emission indicating signal at the preceding timing.

Preferably, the predetermined wait time period is a period necessary until the master flash part and/or the remote flash part starts to perform the main light emission after receiving the light emission indicating signal.

More preferably, the predetermined wait time period is such a short time period that it can be omitted against an expected range of movement of the subject.

Preferably, when the controlling part executes the second light emission mode, the controlling part transmits the light emission indicating signal of the communication light emission immediately before a shutter closing operation of the camera.

Preferably, the controlling part selects the first light emission mode when the main light emission is performed within a predetermined light-emission start time period after the shutter of the camera is released, and selects the second light emission mode otherwise.

Preferably, the controlling part is capable of fixing its light emission modes to either one of the first light emission mode and the second light emission mode in advance.

According to another aspect of the present invention, a flash control system controls a flash in synchronization with photographing operation of a camera, and has a master flash part, a remote flash part, and a controlling part for controlling a light emission of the master flash part.

The controlling part has a first light emission mode and a second light emission mode, which are selectable.

In the first light emission mode, the controlling part gives the remote flash part indication to perform a light emission by a light emission indicating signal using a main light emission of the master flash part.

In the second light emission mode, the controlling part performs a communication light emission to the remote flash part using a pulse light emission of the master flash part, and gives the remote flash part indication to perform a light emission by a light emission indicating signal using the communication light emission.

Preferably, in the flash control system, when the controlling part executes the second light emission mode, the controlling part operates at the following timing. First of all, the controlling part decides a timing at which the master flash part and/or the remote flash part performs a main light emission. Thereafter, the controlling part obtains a timing preceding the main light emission by a predetermined wait time period. The controlling part transmits a light emission indicating signal of a communication light emission at the preceding timing.

The controlling part causes the master flash part to perform the main light emission after the predetermined wait time period has elapsed since the transmission of the light emission indicating signal of the communication light emission.

On the other hand, the remote flash part performs the main light emission after the predetermined wait time period has elapsed since the transmission of the light emission indicating signal of the communication light emission.

Preferably, the predetermined wait time period is a period necessary until the master flash part and/or the remote flash part starts to perform the main light emission after receiving the light emission indicating signal.

More preferably, the predetermined time period is such a short time period that it can be omitted against an expected range of movement of the subject.

Preferably, when the controlling part executes the second light emission mode, the controlling part transmits the light emission indicating signal of the communication light emission immediately before a shutter closing operation of the camera.

Preferably, the controlling part selects the first light emission mode when the main light emission is performed within a predetermined light-emission start time period after the shutter of the camera is released, and selects the second light emission mode otherwise.

Preferably, the controlling part informs the remote flash part of the first light emission mode using the communication light emission.

On the other hand, when the remote flash part is informed of the first light emission mode using the communication light emission, the remote flash part accepts the light emission indicating signal using the main light emission of the master flash part only within a predetermined reception time period.

Preferably, the controlling part selects the first light emission mode when the main light emission is performed within a predetermined light-emission start time period after the shutter of the camera is released, and selects the second light emission mode otherwise.

In addition, the controlling part informs the remote flash part of the first light emission mode using the communication light emission when the controlling part has selected the first light emission mode.

On the other hand, when the remote flash part is informed of the first light emission mode using the communication light emission, the remote flash part accepts the light emission indicating signal using the main light emission of the master flash part only within a predetermined reception time period. The predetermined reception time period is longer than the predetermined light-emission start time period.

Preferably, the controlling part is capable of fixing its light emission mode to either one of the first light emission mode and the second light emission mode in advance.

According to another aspect of the present invention, a master flash device controls a flash in synchronization with photographing operation of a camera, and has a master flash part, a controlling part for controlling a light emission of the master flash part, and an input part for accepting light emission indication from the camera.

The controlling part has a first light emission mode and a second light emission mode, which are selectable.

In the first light emission mode, the controlling part transmits the light emission indication accepted from the camera to the remote flash part using a main light emission of the master flash part.

In the second light emission mode, the controlling part transmits the light emission indication accepted from the camera to the remote flash part using a communication light emission by a pulse light emission of the master flash part.

Preferably, when the controlling part executes the second light emission mode, the controlling part operates at the following timing. First of all, the controlling part decides a timing at which the master flash part and/or the remote flash part performs the main light emission. Next, the controlling part obtains a timing preceding the main light emission by a predetermined wait time period. The controlling part transmits a light emission indicating signal of a communication light emission at the preceding timing.

Preferably, the predetermined wait time period is such a short time period that it can be omitted against an expected range of movement of the subject.

Preferably, the controlling part selects the first light emission mode when the main light emission is performed within a predetermined light-emission start time period after the shutter of the camera is released, and selects the second light emission mode otherwise.

According to another aspect of the present invention, a remote flash device has a remote flash part and a multiple-flash controlling part for controlling a light emission of the remote flash part.

The multiple-flash controlling part has a first light emission mode and a second light emission mode, which are selectable.

In the first light emission mode, the multiple-flash controlling part detects a main light emission of the master flash part and causes the remote flash part to perform a main light emission.

In the second light emission mode, the multiple-flash controlling part receives a pulse light emission of the master flash part as a communication light emission and causes the remote flash part to perform the main light emission in accordance with the communication light emission.

Preferably, the multiple-flash controlling part performs the main light emission after a predetermined wait time period has elapsed since the transmission of a light emission indicating signal using the communication light emission.

Preferably, the multiple-flash controlling part accepts selection indication of the first light emission mode by a communication light emission from the master flash part.

The multiple-flash controlling part accepts light emission indication using the main light emission of the master flash part within a predetermined reception time period when the multiple-flash controlling part receives the selection indication of the first light emission mode.

BRIEF DESCRIPTION OF DRAWINGS

The nature, principle, and utility of the invention will become more apparent from the following detailed description when read in conjunction with the accompanying drawings in which like parts are indicated by identical reference numbers, in which:

FIG. 1 is a schematic diagram showing an optical system according to an embodiment of the present invention;

FIG. 3(a), FIG. 3(b), and FIG. 3(c) are schematic diagrams describing a photometry region of a photometry sensor 9;

FIG. 4(a), FIG. 4(b), and FIG. 4(c) are schematic diagrams describing an operation of the photometry sensor 9;

FIG. 5(a) and FIG. 5(b) are schematic diagrams describing a focal point detecting part 16;

FIG. 7(a), FIG. 7(b), and FIG. 7(c) are schematic diagrams describing a light adjusting sensor 15;

FIG. 22(a), FIG. 22(b), FIG. 22(c), and FIG. 22(d) are schematic diagrams describing various parameters of the flash control device according to the embodiment of the present invention;

FIG. 24(a) and FIG. 24(b) are schematic diagrams describing RefG[i] and deltaY;

FIG. 25(a) and FIG. 25(b) are schematic diagrams showing an example of a photographing state and a photographing layout;

FIG. 34(a) and FIG. 34(b) are schematic diagrams describing a conventional art.

FIG. 35 is a table showing setup items for a flash light emission; and

FIG. 36 is a table showing a rule for switching light emission modes.

DESCRIPTION OF THE PREFERRED EMBODIMENT

Figure 2:
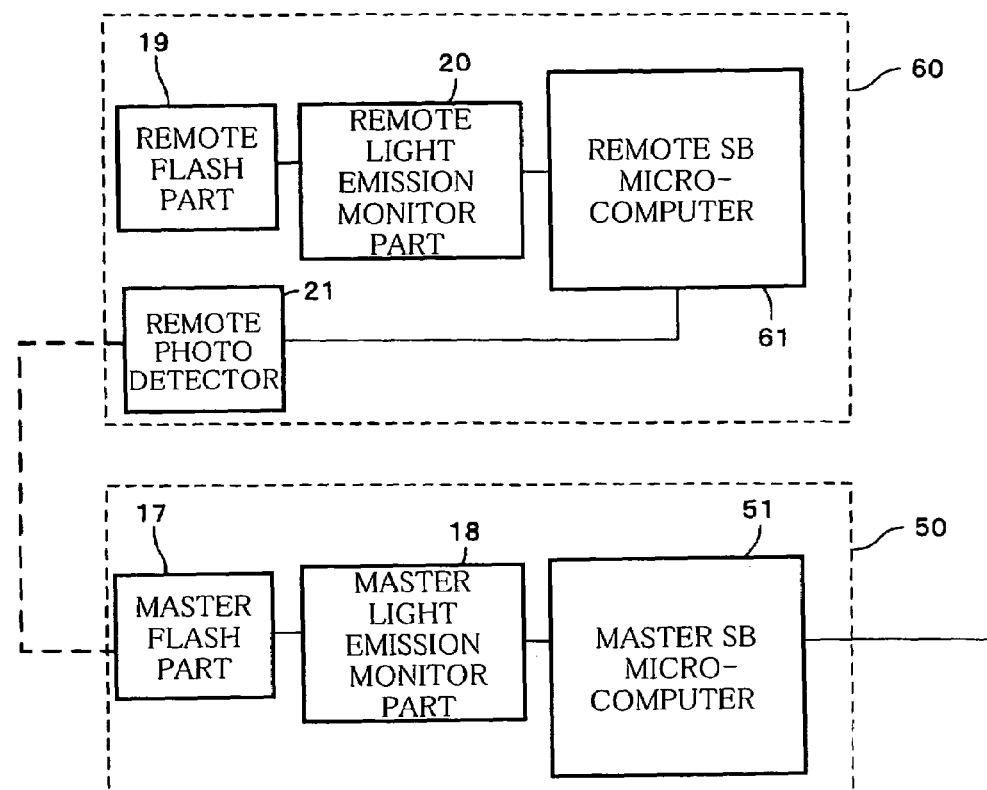
FIG. 2 is a block diagram showing structures of a camera 30, a lens 40, a master SB 50, and a remote SB 60 according to the embodiment of the present invention.
Figure 2:
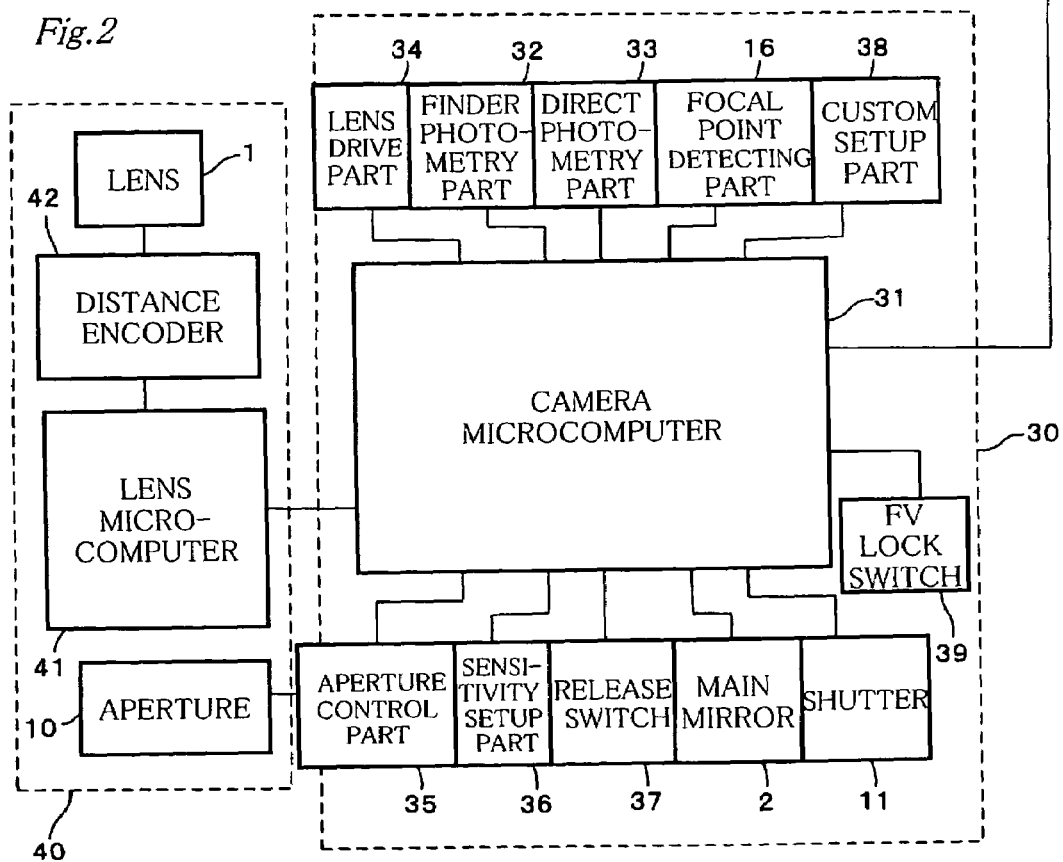

Next, with reference to the accompanying drawings, an embodiment of the present invention will be described.

FIG. 1 is a schematic diagram showing an optical system according to an embodiment of the present invention.

A flash control system according to the embodiment of the present invention includes a flash control device and a remote SB 60. The flash control device is composed of a camera 30 and a master SB 50. The camera 30 has an interchangeable photographing lens 40.

When a photographing operation is not performed and a main mirror 2 is lowered, light in a photographic field passes through a photographing lens 1. Thereafter, the light is reflected upward by a main mirror 2. The reflected light is temporarily focused on a diffusion screen 3. Thereafter, the light reaches an eye of the photographer through a condenser lens 4, a penta-prism 5, and an ocular 6. On the other hand, light fluxes diffused by the diffusion screen 3 are partly re-focused on a photometry sensor 9 for finder photometry through the condenser lens 4, the penta-prism 5, a photometry prism 7, and a photometry lens 8. The photometry sensor 9 is for example a photo sensor such as a charge coupled device (CCD). As shown in FIG. 3(a) or 3(c), the photometry sensor 9 divides the photographic field into 240 regions of 20×12 to measure photometry values thereof, and is capable of outputting respective photometry values. Each region has three photometry cells of three colors R (red), G (green), and B (blue) that can measure divided colors.

When the luminance of surrounding light is measured, FV lock (that is a flash control method for deciding the amount of a main light emission by performing a preliminary light emission in advance, storing the decided amount, and controlling the SB with the stored amount of the main light emission even when framing is changed afterward) is performed even when performing SB photographing, or preliminary photometry (monitor photometry) is performed under the multiple flash setting, the photometry is performed through the foregoing path using the photometry sensor 9. In this case, in the state that the aperture 10 is opened and the main mirror 2 is lowered, a master flash part 17 performs a preliminary light emission (a monitor light emission). Reflected light of the SB is measured by the photometry sensor 9. The timing at which the reflected light is measured is synchronized with the preliminary light emission. Thereafter, when a photographing operation is performed and the aperture 10 stops down to a predetermined value, the main mirror 2 is raised. When a shutter 11 is fully released, the main light emission is performed with a pre-calculated light amount. The photographing operation is performed by an imaging sensor 12 composed of for example a charge coupled device (CCD).

When a preliminary photometry is performed with the light adjusting sensor 15, the aperture 10 stops down to a predetermined value and the main mirror 2 is raised. Thereafter, light fluxes emitted from the master flash part 17 as the preliminary light emission are reflected by the subject and focused on the shutter 11 by the photographing lens 1. Light fluxes that are reflected and diffused by the shutter 11 are partly re-focused on the light adjusting sensor 15 through a light adjusting lens 14 so as to perform a flash photometry (preliminary photometry).

Figure 6:
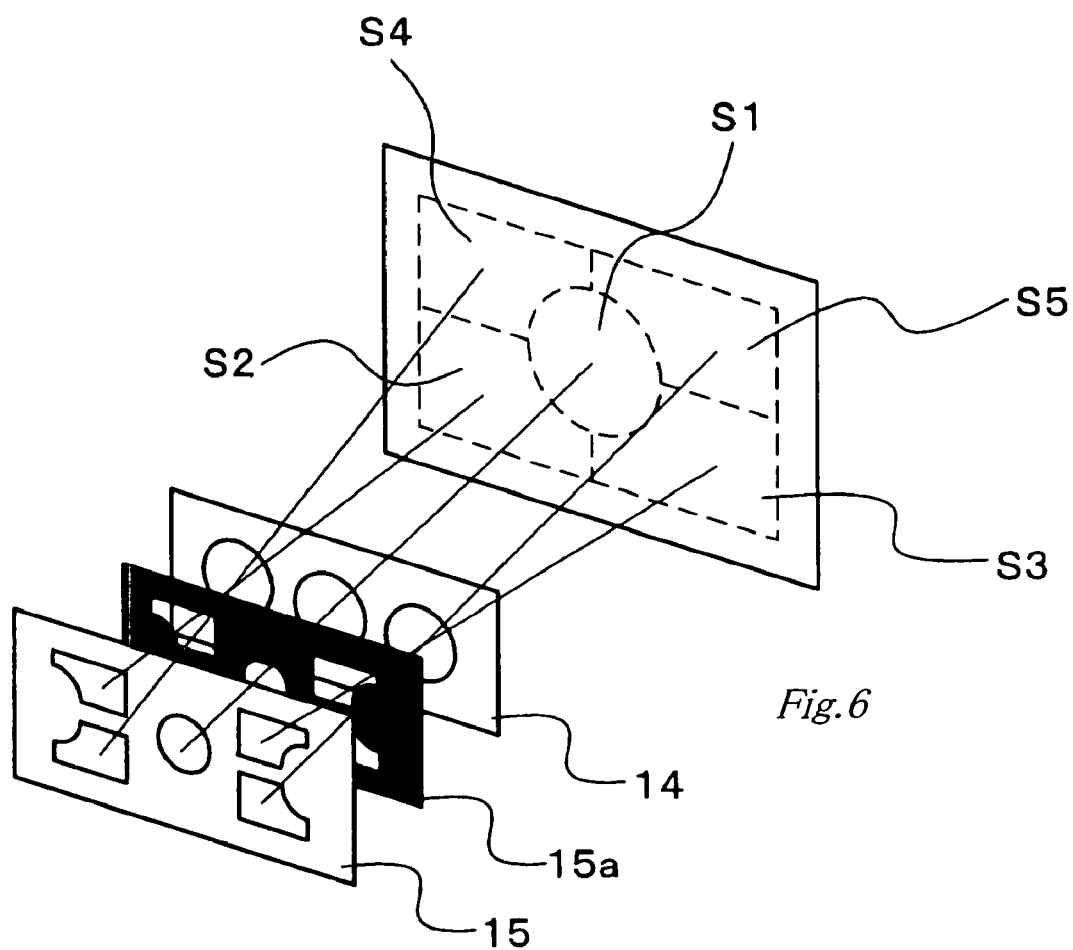
FIG. 6 is a schematic diagram showing an optical system and a divided shape of a photometry region of a direct photometry part 33.

When a main light emission is performed, the shutter 11 is opened and the photographing operation is performed with the imaging sensor 12. The light adjusting sensor 15 is composed of a photo diode, a capacitor, an amplifier, and so forth. The capacitor stores a photocurrent received from the photo diode. As shown in FIG. 6, the light adjusting sensor 15 is divided into five regions S1 to S5 that correspond to B1 to B5 shown in FIG. 3(c).

The main mirror 2 is a half mirror that transmits part of light. A part of transmitted light fluxes is bent downward by a sub mirror 13, and is guided to a focal point detecting part 16 composed of for example a CCD or the like. The focal point detecting part 16 detects in-focus states of the focus detecting regions F1 to F5 of the photographic field shown in FIG. 5 and drives the photographing lens 1 until one of these regions becomes the in-focus state. One of the focus detecting regions F1 to F5 may be manually selected by the photographer. Alternatively, the closest focus detecting region may be automatically selected.

The master SB 50 has a master flash part 17 and a master light emission monitor part 18 that monitors the amount of the light emission of the master SB 50.

The remote SB 60 has a remote flash part 19, a remote light emission monitor part 20, and a remote photo detector 21. The remote light emission monitor part 20 monitors the amount of the light emission of the remote SB 60. The remote photo detector 21 receives a pulse light emission from the master SB 50.

FIG. 2 is a block diagram showing structures of the camera 30, the photographing lens 40, the master SB 50, and the remote SB 60 according to the embodiment of the present invention.

All components in the camera 30 are controlled by the camera microcomputer 31, which is a microprocessor. Likewise, all components in the photographing lens 40 are controlled by a lens microcomputer 41. All components in the master SB 50 are controlled by a master SB microcomputer 51. All components in the remote SB 60 are controlled by a remote SB microcomputer 61.

(Finder Photometry and Exposure)

The finder photometry part 32 is a circuit that divides the photographic field into 240 regions of 20×12 as shown in FIG. 3(a) or FIG. 3(c) and measures the amount of light thereof. The finder photometry part 32 includes the photometry prism 7, the photometry lens 8, the photometry sensor 9 and the like. A photometric output of the finder photometry part 32 is sent to the camera microcomputer 31. The camera microcomputer 31 calculates a proper exposure value for fixed light exposure in accordance with an output of a fixed light photometry part 32', lens information such as an open F number of the photographing lens, focal distance, exit pupil position, and distance information, which are stored in lens microcomputer 41 included in the photographing lens 40, sensitivity information of the imaging sensor 12 received from a sensitivity setup part 36, and so forth. The camera microcomputer 31 divides the calculated exposure value into an aperture value and a shutter value and outputs them to an aperture control part 35 and the shutter 11, respectively. The aperture control part 35 controls stopping-down/restoring of the aperture 10 in accordance with a release signal received from a release switch 37.

(Auto Focus)

The focal point detecting part 16 detects in-focus states of the five regions of the photographic field as shown in FIG. 5. The detected information is processed by the camera microcomputer 31 and output as a lens drive amount to a lens drive part 34. In addition, the focal point detecting part 16 drives the photographing lens 1 of the photographing lens 40 so that the photographing lens 1 becomes in-focus state.

(FV Lock)

When the camera microcomputer 31 has detected that an FV lock switch 39 has been pressed, the camera microcomputer 31 causes the master flash part 17 to perform a preliminary light emission through the master SB microcomputer 51. In addition, the finder photometry part 32 measures the reflected light in synchronization with the preliminary light emission. The camera microcomputer 31 calculates a main light emission amount indication value in accordance with the measured result and stores the calculated value to its internal memory. Thereafter, when the camera microcomputer 31 detects a fully pressed state of the release switch 37, the camera microcomputer 31 transmits the main light emission amount indication value stored in the memory to the master SB 50 and then performs a photographing operation. The master SB microcomputer 51 calculates the main light emission amount in accordance with the main light emission amount indication value and the preliminary light emission value measured by the master light emission monitor part 18, and performs a light emission by a light emission trigger signal (X signal) which is generated at the time of the photographing operation while controlling the main light emission amount to a proper value.

(SB Control by Direct Photometry Part 33)

The camera microcomputer 31 calculates a setup gain of the direct photometry part 33 (the light adjusting lens 14 and the light adjusting sensor 15) in accordance with the photometry value, aperture value, sensitivity value, distance value, and bounce state of the flash light emission part, and sets up the gain. Thereafter, the camera microcomputer 31 causes the master flash part 17 to perform a preliminary light emission through the master SB microcomputer 51. The direct photometry part 33 integrates a photo current corresponding to the amount of reflected light of the subject. The direct photometry part 33 calculates a main light emission amount indication value based on the integrated value and outputs the main light emission amount indication value to the master SB microcomputer 51. The master SB microcomputer 51 calculates the main light emission amount in accordance with the main light emission amount indication value and the preliminary light emission value measured by the master light emission monitor part 18, and performs a light emission by a light emission trigger signal (X signal) which is generated at the time of the photographing operation while controlling the main light emission amount to a proper value. The SB control using the direct photometry part 33 is performed only-when a single flash is used and the FV is not locked that will be described later with reference to FIG. 8. In that case, which to use the direct photometry part or the finder photometry part can be selected via a custom setup part 38. When the custom setup part 38 has selected the finder photometry part, all the preliminary photometry is performed by the finder photometry part 32, not the direct photometry part 33.

(SB Control by Finder Photometry Part 32)

The camera microcomputer 31 causes the master flash part 17 to perform a preliminary light emission through the master SB microcomputer 51. The finder photometry part 32 integrates a photocurrent corresponding to a reflected light amount of the subject. The camera microcomputer 31 calculates the main light emission amount indication value based on the integrated value and outputs the light emission amount indication value to the master SB microcomputer 51. The camera microcomputer 31 calculates a main light emission amount indication value with the integrated value and outputs the main light emission amount indication value to the master SB microcomputer 51. The master SB microcomputer 51 calculates the main light emission amount in accordance with the main light emission amount indication value and a preliminary light emission amount measured by the master light emission monitor part 18, and performs a light emission by a light emission trigger signal (X signal) which is generated at the time of photographing operation while controlling the light emission amount to a proper value. Whether or not to perform the SB control using the photometry sensor 9 is selectable by the custom setup part 38.

(Custom Setup)

The custom setup part 38 allows the photographer to change settings for various operations of the camera. The custom setup part 38 can set up flash light emission items shown in FIGS. 35 and 36.

In FIG. 35, in the first light emission mode, immediately after the remote flash part 19 receives a main light emission of the master flash part 17, the remote flash part 19 performs a main light emission (the main light emission of the master flash part 17 serves as a light emission indicating signal) (see FIG. 10 to FIG. 15). In the second light emission mode, the remote flash part 19 performs a main light emission by a light emission indicating signal using a communication light emission of the master flash part 17 (see FIGS. 16 and 17).

According to the present embodiment, in the case that the multiple-flash light emission mode is automatically set (see FIG. 35 2-1 and FIG. 36), only when multiple-flash control and rear synchronous photography are performed and shutter value is ½ second or longer or bulb photographing operation is performed, the second light emission mode is executed. This is because when the main light emission is performed within a predetermined light-emission start time period (½ second) after the shutter is released, the first light emission mode is executed. In other words, when a main light emission is preformed in a very short time period (½ second or shorter) after the shutter is released, the remote flash part 19 hardly performs a main light emission erroneously by mistaking another cause (another SB, fireworks, and so forth) as a main light emission of the master flash part 17. The value of ½ second can be changed. Alternatively, by custom settings, the photographer can change the shutter value of ½ second to another value.

(Remote SB)

The remote photo detector 21 receives a communication light emission using a pulse light emission from the master flash part 17 and outputs a corresponding signal to the remote SB microcomputer 61.

Figure 33:
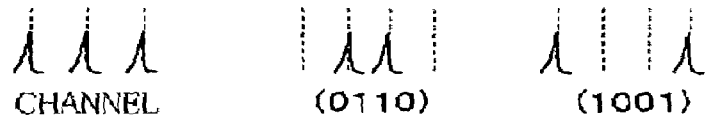
FIG. 33 is a schematic diagram showing an example of a communication light emission using a pulse light emission performed between the master SB 50 and the remote SB 60.
Figure 33:
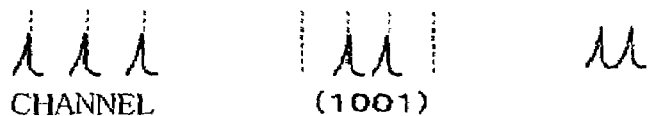
Figure 33:
Figure 33:
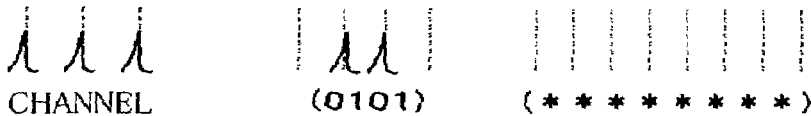
Figure 33:

FIG. 33 shows an example of a communication light emission of a pulse light emission performed between the master SB 50 and the remote SB 60.

A communication light emission according to the present embodiment is performed by controlling on and off of a weak light emission at predetermined intervals as a code. With the code, desired information is transmitted.

The remote SB microcomputer 61 decodes a pulse communication received from the master flash part 17, sets up a light adjusting mode, and controls operations for a preliminary light emission and a main light emission.

The light emission amounts of the preliminary light emission and main light emission of the remote flash part 19 are indicated in advance by a communication light emission performed by the master flash part 17. The remote light emission monitor part 20 monitors and controls the light emission amounts of the remote flash part 19 so that they match the light emission amounts indicated by the master flash part 17.

FIG. 3(*a*), FIG. 3(*b*), and FIG. 3(*c*) are schematic diagrams describing a photometry region of the photometry sensor 9.

FIG. 3(*a*) and FIG. 3(*c*) are schematic diagrams showing the relation of divided regions of the photometry sensor 9 and a photographic field. The photometry sensor 9 divides almost the entire photographic field into 240 regions, measures light amounts thereof, and outputs photometry values.

FIG. 3(*a*) shows a divided shape of which the 240 photometry regions are grouped into 25 regions B(1, 1) to B(5, 5).

FIG. 3(*c*) shows a shape of which the photometry regions are grouped into five regions B1 to B5 so that the photometry regions are averaged in accordance with the shape of divided regions of the direct photometry part 33.

FIG. 3(*b*) shows three color photometry regions RGB into which each photometry region is divided.

FIG. 4(*a*), FIG. 4(*b*), and FIG. 4(*c*) are schematic diagrams describing an operation of the photometry sensor 9.

FIG. 4(*a*) shows an arrangement and functions of terminals of the photometry sensor 9. φMCK is an input terminal of a master clock with which the photometry sensor 9 is operated. φint is an input terminal with which storage of electric charges is started and stopped. VCscin is a switching input terminal from which unnecessary electric charges are input when the power is turned on. GSW is a switching input terminal with which sensitivity is switched between two levels H and L. RSW is a switching input terminal with which an output clock frequency of a photometry value is switched between two levels (normally, the input is fixed to one level). SYNC is an output terminal from which a photometry value read synchronous clock is output. Vout is an output terminal from which a photometry value is output.

FIG. 4(*b*) is a schematic diagram showing an arrangement of a photo-electric converting part of the photometry sensor 9. In the horizontal direction (H direction), 20 sets of B, G, and R pixels, a total of 60 pixels, are arranged. In the vertical direction (V direction), 20 pixels of B, G, and R are arranged. When outputting data, the array of the photo-electric converting part is shifted and scanned for one pixel in the H direction. Data for one row is transferred to a V register. Thereafter, the array is shifted and scanned for one row in the V direction. In other words, data for 20 pixels is output. Thereafter, the array is shifted and scanned again for one pixel in the H direction. Data for one row is output in the V direction. The array is shifted and scanned until data of the last row R is output.

FIG. 4(*c*) is a schematic diagram showing a data output of the photometry sensor 9. When the signal level of φint becomes low, electric charges are stored. When the signal level of φint becomes H, charging is stopped. Thereafter, photometry data is output for each row in synchronization with a SYNC pulse.

FIG. 5(*a*) and FIG. 5(*b*) are schematic diagrams describing the focal point detecting part 16.

FIG. 5(*a*) is a schematic diagram showing the relation of detection regions of the focal point detecting part 16 and a photographic field. In-focus states of five regions F1 to F5 of the focal point detecting part 16 can be detected.

FIG. 5(*b*) is a schematic diagram showing an optical system of the focal point detecting part 16. The focal point detecting part 16 includes the photographing lens 1, a field mask 16*a*, a field lens 16*b*, a separator lens 16*c*, an AF sensor 16*d*, and the like.

FIG. 6 is an exploded view showing the optical system and divided photometry regions of the direct photometry part 33.

A subject image is entered and focused on the shutter plane and re-focused on the light adjusting sensor 15 by the three-element light adjusting lens 14. The re-focused subject image is divided into five regions S1 to S5 and converted into electric charges to be stored. The regions S1 to S5 shown in FIG. 6 correspond to the photometry regions B1 to B5 shown in FIG. 3(*c*), respectively. An aperture mask 15*a* prevents incident light as stray light of an adjacent lens from entering the sensor.

FIG. 7(*a*), FIG. 7(*b*), and FIG. 7(*c*) are schematic diagrams describing the light adjusting sensor 15.

FIG. 7(*a*) is a schematic diagram describing a layout and functions of terminals of the light adjusting sensor 15. C1 to C5 are external capacitors that charge photocurrents of the regions S1 to S5, respectively. SC is an external capacitor that sums up photocurrents of the regions S1 to S5 and charges the summed photocurrent to output a stop signal. Vref is an output terminal from which a voltage proportional to temperature is output. STOP is an output terminal from which a stop signal is output. CSR, CSG, and CLK are terminals with which settings of amplifier gain and read channel are changed. The setting methods for amplifier gain and read channel will be described with reference to FIG. 7(*b*) and FIG. 7(*c*). IS is a terminal with which charging is started and stopped. DA is an input terminal from which an amplifier gain of each region is input. AD is an output terminal from which an integrated photometry value of each region is output.

FIG. 7(*b*) is a schematic diagram showing a setting method for an amplifier gain of each region of the light adjusting sensor 15. While the signal level of the CSG terminal is kept in the H level, when the signal level of the CSR terminal is lowered to the L level and then the clock signal is input to the CLK terminal, the channel is changed in synchronization with the lowering to the L level. While the signal level of the CLK terminal is in the L level, when the signal level of the DA terminal is changed in accordance with the setting gain, the gain of the channel is set. Ch1 to Ch5 shown in FIG. 7(*b*) correspond to S1 to S5, respectively.

FIG. 7(*c*) is a schematic diagram showing a method for reading an integrated photometry value of each region of the light adjusting sensor 15. After the signal levels of the CSR and CSG terminals are lowered to the L level, when the clock signal is input to the CLK terminal, the channel is changed in synchronization with the lowering to the L level. An integrated photometry value of each region is output as a voltage level corresponding to the photometry value to the AD terminal.

Figure 8:
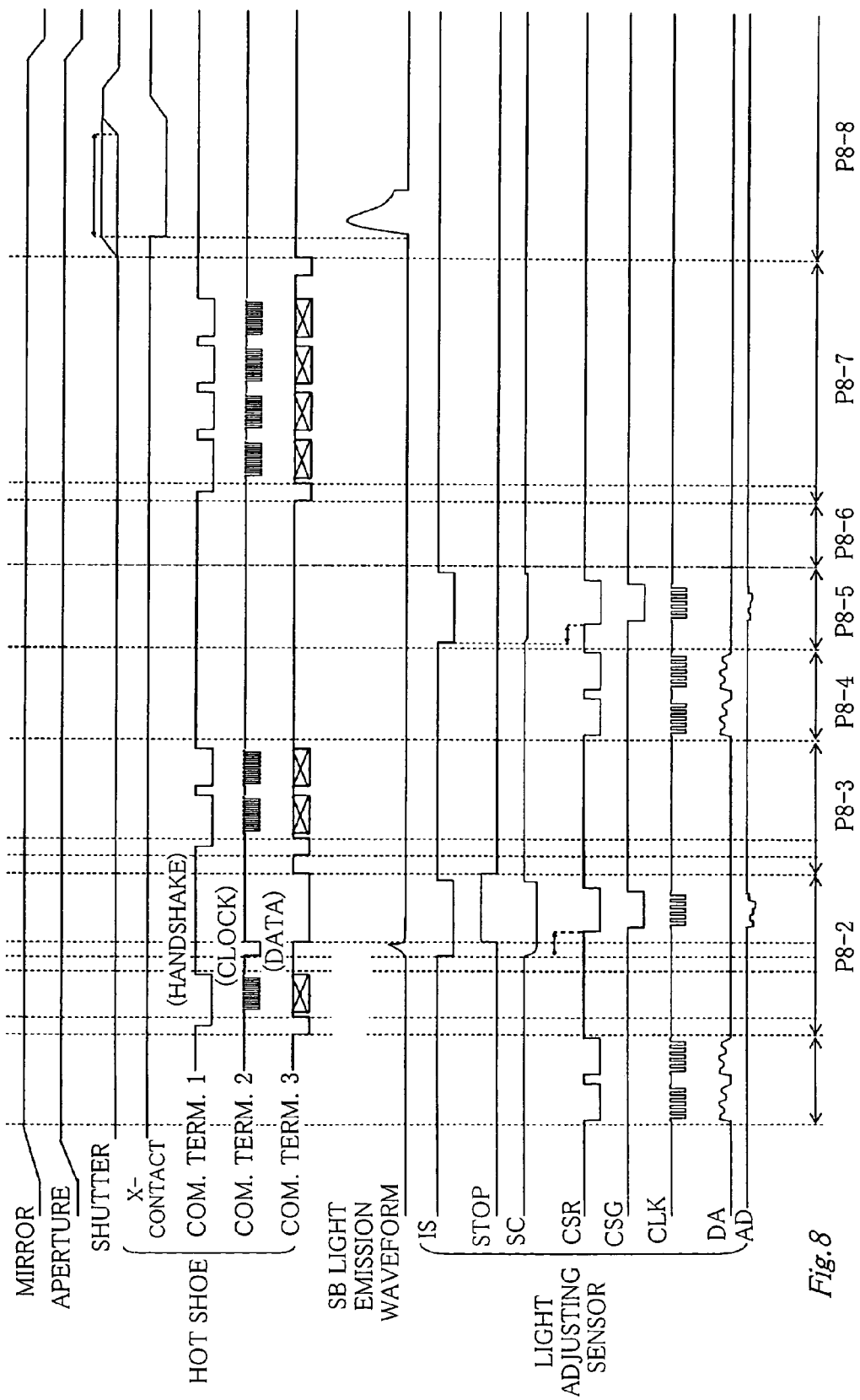
FIG. 8 is a timing chart showing an operation of a TTL light adjustment of a single-flash direct photometry using the direct photometry part 33.

FIG. 8 is a timing chart showing an operation of TTL light adjustment by single-flash direct photometry using the direct photometry part 33.

When the release signal is input and the mirror-up operation and the stop-down operation are completed, in phase 8-1 (hereinafter abbreviated as P8-1), the gain of the light adjusting sensor 15 is set (gain setting 1). The method for calculating the gain will be described later.

Next, in P8-2, the camera outputs a preliminary light emission command to the SB through the communication terminals 1 to 3. The SB performs a preliminary light emission. When the integrated photometry value reaches a proper level or the light emission amount becomes a predetermined maximum value (around GN 8), the SB stops the preliminary light emission. After the integrated value is read (readout 1), the signal level of the IS terminal is raised so as to reset the integrated value.

In P8-3, the camera reads from the SB a guide number at which it performs the preliminary light emission.

Since the integrated photometry value of the preliminary light emission contains a fixed light component as well as reflected light of the SB, only the fixed light is integrated after the SB has completed the preliminary light emission. In a later calculating process, the fixed light component is subtracted from the integrated value of the preliminary light emission.

In P8-4, a gain for integrating fixed light is set (gain setting 2).

In P8-5, like the preliminary light emission, the signal level of the IS terminal is lowered and fixed light is integrated (integration 2). The gain setting for integrating fixed light and integration time will be described later. After fixed light has been integrated, the integrated value is read out (readout 2). Thereafter, the signal level of the IS terminal is raised so as to reset the integrated value.

In P8-6, a light adjustment region and a compensation amount are calculated using algorithm that will be described later. In addition, the main light emission amount is calculated by a method that will be described later.

In P8-7, the camera side informs the SB side of the calculated main light emission amount as a main light emission amount transmission command and light emission multiple data.

In P8-8, when the photography is started and the shutter is fully opened, the camera side outputs a synchronous signal (X signal) to the SB side so as to cause the SB side to emit light. The light emission amount is controlled by the SB side in accordance with the latest data that has been received thereby. Thereafter, the photographing operation is completed.

Figure 9:
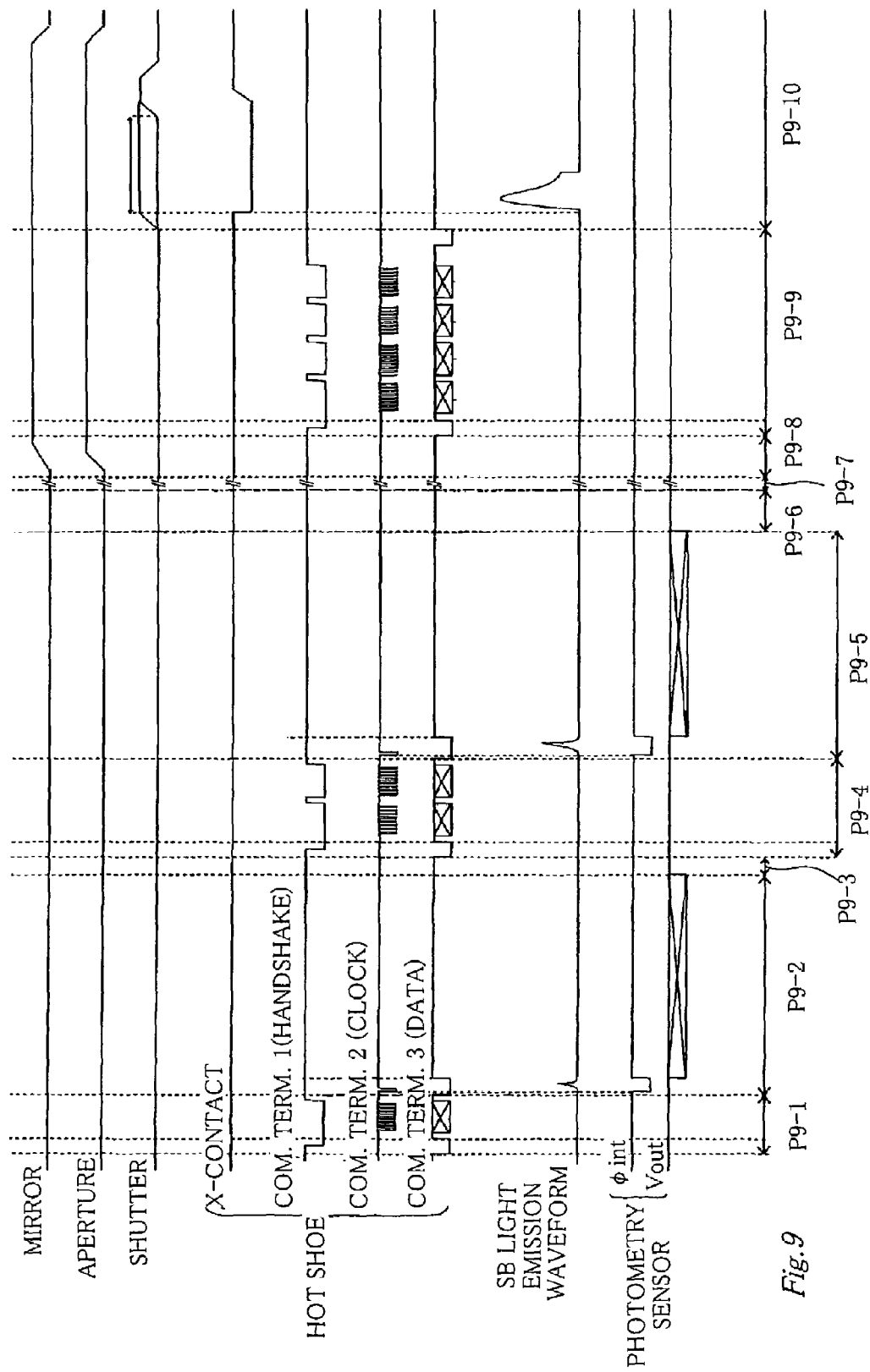
FIG. 9 is a timing chart showing an operation of the single-flash TTL light adjustment using a finder photometry part 32.

FIG. 9 is a timing chart showing an operation of single-flash TTL light adjustment using the finder photometry part 32.

When the release signal is input, before the mirror-up operation and the stop-down operation are performed, in phase P9-1, the camera side transmits a command that causes the SB side to perform a preliminary light emission (low) through the communication terminals 1 to 3.

In P9-2, while the signal level of the communication terminal is kept in the low level, the SB side performs the preliminary light emission for a predetermined light amount almost synchronously with the lowering of level of the communication terminal 2. The camera side causes the signal level of the ϕint terminal of the photometry sensor 9 to be lowered in synchronization with the low level of the communication terminal 2 as a light emission synchronous signal and stores data (integration 1). At timing that the SB side has completed the preliminary light emission, the camera side reads photometry data (readout 1).

In phase P9-3, the camera side determines whether or not the preliminary photometry value reaches a required level for the calculation (second yes/no determination).

When the determined result in phase P9-3 represents that the photometry value does not reach the required level, the flow advances to P9-4. In P9-4, the camera side sets the gain second time (gain setting 2: calculates an indicated GN for the SB). At that time, the camera side transmits a command that indicates a preliminary light emission (high) and a light emission amount (GN) to the SB side.

In phase P9-5, the camera side performs a preliminary light emission (high), stores data (integration 2), and reads data in the same manner as P9-2.

After P9-5 or when the determined result in P9-3 indicates that a second preliminary light emission is not required, the flow advances to P9-6. In P9-6, the camera side calculates a light adjustment region, a compensation amount, and a main light emission amount in accordance with algorithm that will be described later.

When the FV is locked, in P9-7, the camera side waits until the shutter is released. When the release signal is input, the flow advances to P9-8. When the FV is not locked, the camera side omits that phase. At that point, the flow advances to P9-8.

In P9-8, the mirror-up operation and the stop-down operation are performed.

In P9-9, the camera side transmits the calculated main light emission amount as a main light emission amount transmission command and light emission multiple data to the SB side.

Like the case shown in FIG. 8, in P9-10, when a photographing operation is performed, the SB side controls a main light emission and a proper light amount. Thereafter, the photographing operation is completed.

Figure 10:
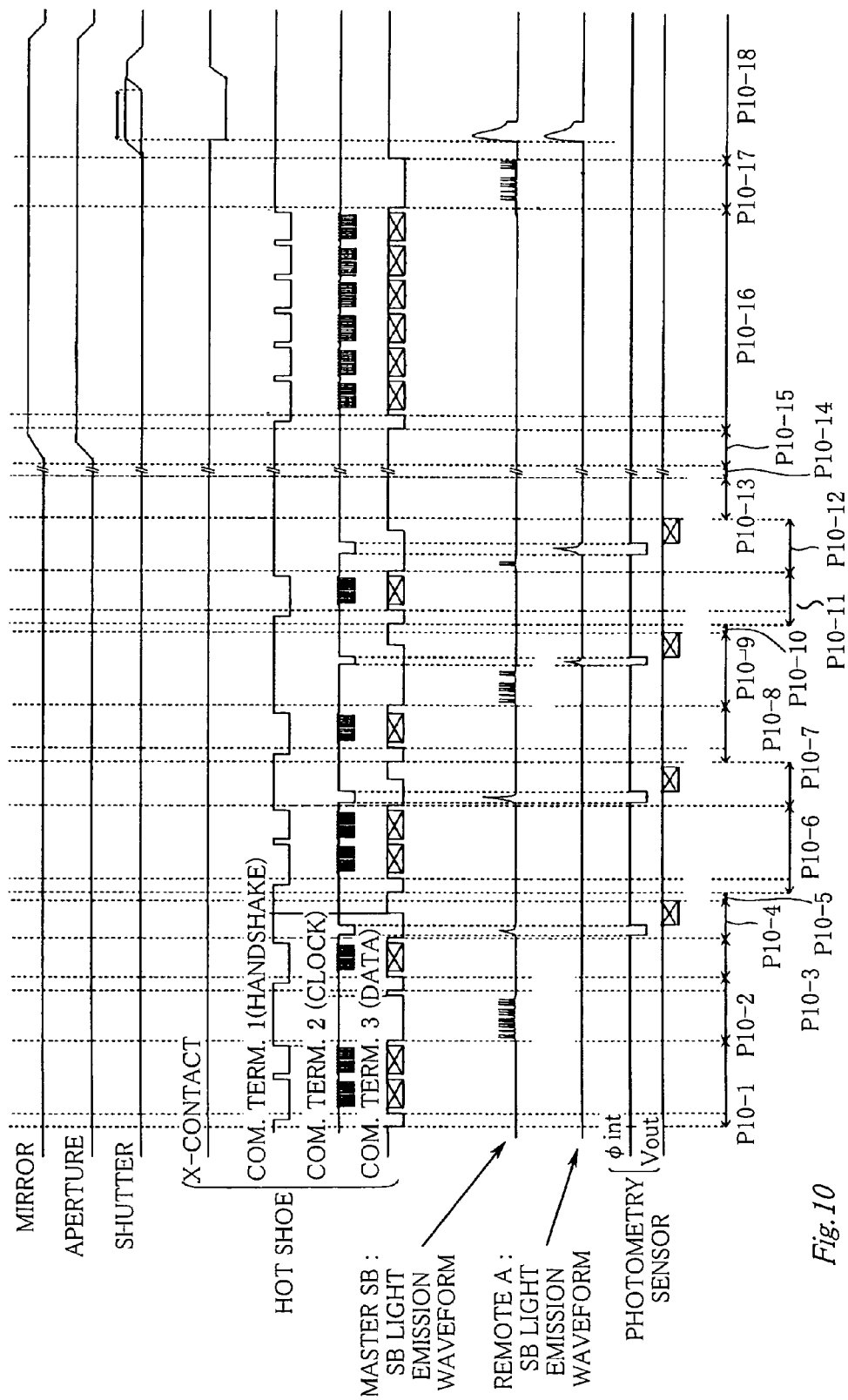
FIG. 10 is a timing chart showing an operation of a two-flash TTL light adjustment using the master SB 50 and the remote SB 60 in the case where a relatively high speed shutter operation and the front curtain synchronous photography are performed.

FIG. 10 is a timing chart showing an operation in the case that two-flash light emission TTL light adjustment using the master SB 50 and the remote SB 60, relatively high-speed shutter operation, and front curtain synchronous photographing operation are performed.

When the release signal is input, before the mirror-up operation and the stop-down operation are performed, in P10-1, the camera 30 transmits a command that causes a group to be set to the master SB 50.

In P10-2, the master SB 50 performs a pulse light emission as a communication light emission so as to transmit group setting information to the remote SB 60. The photographing system according to the present embodiment can independently control three groups A to C as remote SBs. The group setting information represents a group to be used. In FIG. 10 and FIG. 11 to FIG. 17 that will be described later, it is assumed that only the A group is used, not the B and C groups. Thus, in this example, a communication light emission that represents that the A group is set for the TTL light adjustment and the B and C groups are set OFF is performed.

In P10-3, the camera 30 transmits to the master SB 50 a command that causes it to perform a preliminary light emission (low) through the communication terminals 1 to 3.

In P10-4, the master flash part 17 performs the preliminary light emission (low). The photometry sensor 9 stores the reflected light and the camera 30 reads the corresponding data.

In P10-5, the camera 30 determines whether or not the preliminary photometry value reaches a required level for the calculation (second yes/no determination).

When the determined result in P10-5 represents that the photometry value does not reach the required level, the flow advances to P10-6. In P10-6, the camera 30 transmits a command that indicates the preliminary light emission (high) and the light emission amount (GN) to the master SB 50.

In P10-7, the preliminary light emission (high) is performed and data is stored and read in the same manner as P10-4.

In P10-8, the camera 30 transmits to the master SB 50 a command that causes remote SB 60 to perform a preliminary light emission (low) through the communication terminals 1 to 3.

In P10-9, the master flash part 17 performs a pulse light emission as a communication light emission so as to cause the remote SB 60 to perform a preliminary light emission and trigger the preliminary light emission (low). When the remote SB 60 receives the communication light emission, the remote flash part 19 performs the preliminary light emission (low). The photometry sensor 9 stores the reflected light and the camera 30 reads the data.

In P10-10, the camera 30 determines whether or not the preliminary photometry value reaches a required level for the calculation (second yes/no determination).

When the determined result in P10-10 represents that the photometry value does not reach the required level, the flow advances to P10-11. In P10-11, the camera transmits a command that indicates the preliminary light emission (high) and the light emission amount (GN) to the remote flash part 19.

In P10-12, the remote flash part 19 performs the preliminary light emission (high) in the same manner as in P10-9. The photometry sensor 9 stores the data and the camera 30 reads the data.

After P10-12 or when the determined result in P10-10 represents that the second preliminary light emission is not required, in P10-13, the camera 30 calculates the light adjustment region, the compensation amount, and the main light emission amounts of the master flash part 17 and the remote flash part 19 in accordance with the algorithm that will be described later.

When the FV is locked, in P10-14, the camera 30 waits until the shutter is released. When the release signal is input, the flow advances to P10-15. When the FV is not locked, the camera 30 omits this phase. Thereafter, the flow advances to P10-15.

In P10-15, the camera 30 performs the mirror-up operation and the stop-down operation.

In P10-16, the camera 30 transmits the calculated main light emission amounts of the master flash part 17 ad the remote flash part 19 as a main light emission amount transmission command to the master SB 50. When the groups B and C are also used, the camera 30 transmits the main light emission amounts of the groups B and C following the transmission of the main light emission amounts of the group A.

Figure 11:
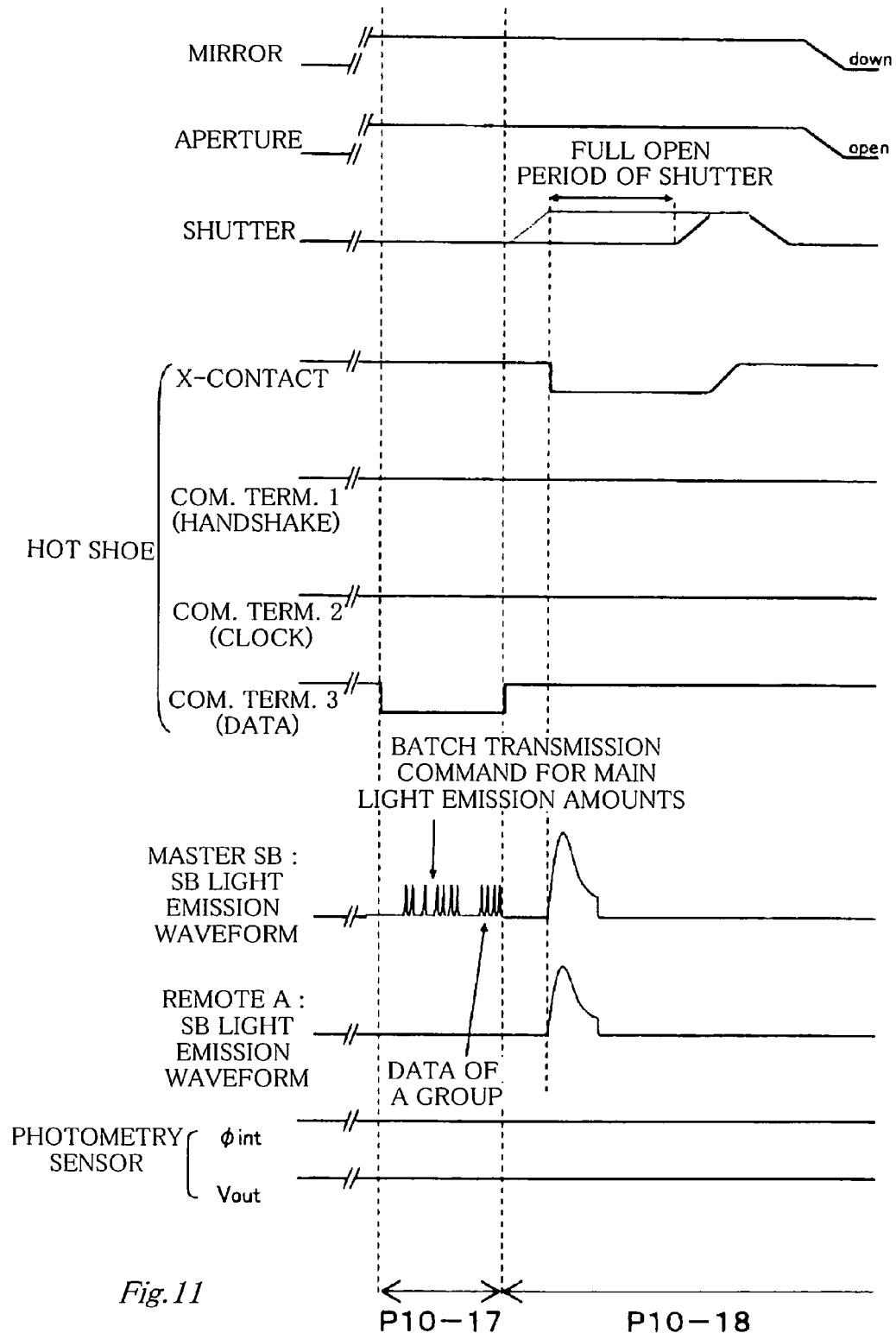
FIG. 11 is an enlarged timing chart showing the operation after P10-17 shown in FIG. 10.

FIG. 11 is an enlarged timing chart showing the operation after P10-17 shown in FIG. 10.

In P10-17, the master flash part 17 performs a pulse light emission as a communication light emission and transmits the main light emission amount obtained in phase P10-16 to the remote SB 60. Specifically, the master flash part 17 performs a light emission as a batch transmission command for the main light emission amounts and then emits data about the main light emission amount of the A group. When the groups B and C are also used, the master flash part 17 transmits the main light emission amounts of the groups B and C following the transmission of the main light transmission amounts of the group A.

In P10-18, when the front curtain of the shutter is fully opened, the master flash part 17 performs the main light emission. In synchronization with receiving the main light emission of the master flash part 17, the remote flash part 19 performs the main light emission (first light emission mode). Thereafter, the rear curtain of the shutter is closed, the mirror-down operation is performed, and the aperture is opened. Thereafter, the photographing operation is completed.

Figure 12:
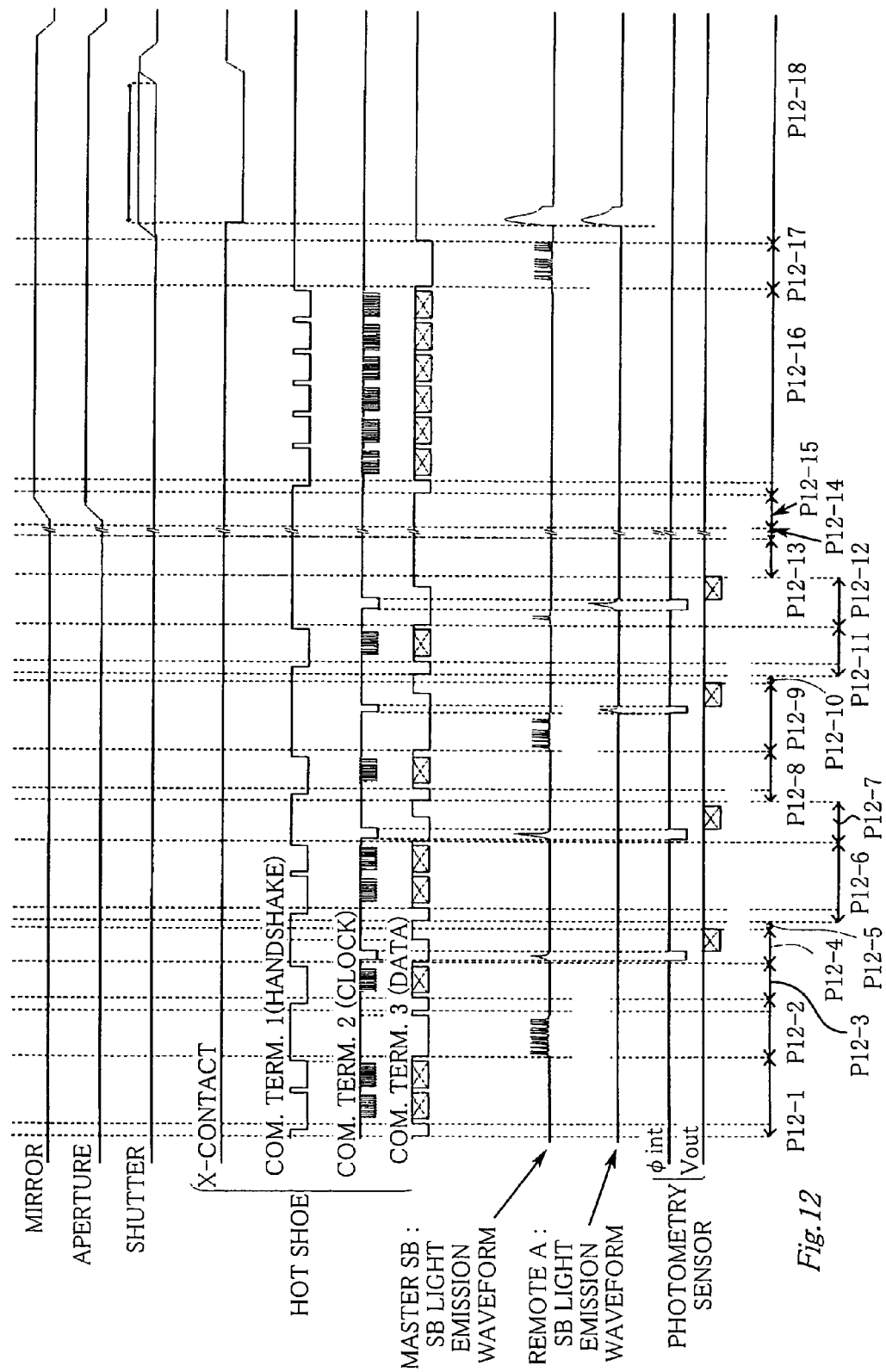
FIG. 12 is a timing chart showing an operation of the two-flash TTL light adjustment using the master SB 50 and the remote SB 60 in the case where a relatively slow shutter operation and the front curtain synchronous photography are performed.

FIG. 12 is a timing chart showing an operation in the case that two-flash light emission TTL light adjustment using the master SB 50 and the remote SB 60, relatively slow shutter speed operation, and front curtain synchronous photographing operation are performed.

Figure 13:
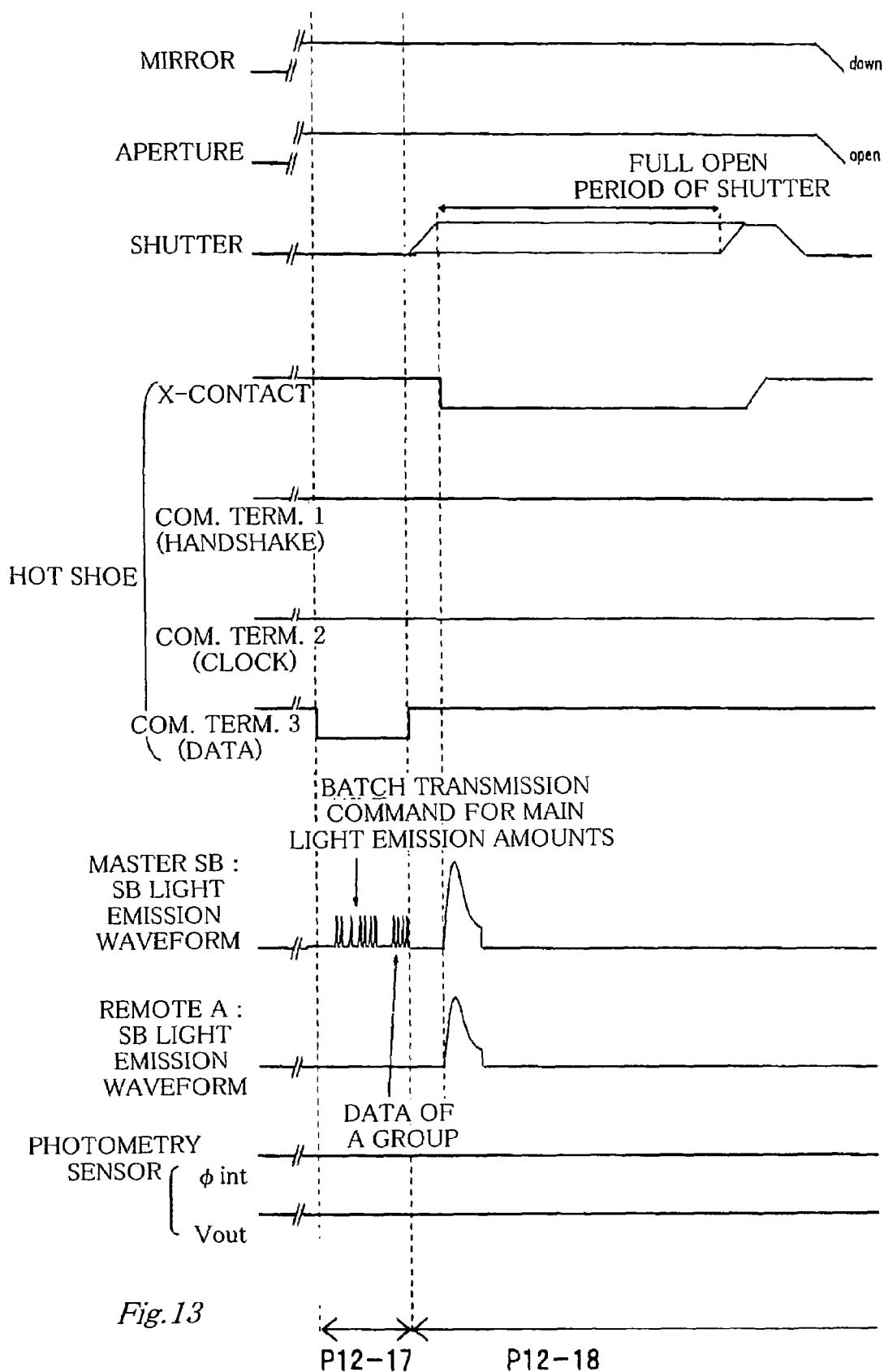
FIG. 13 is an enlarged timing chart showing the operation after P12-17 shown in FIG. 12.

FIG. 13 is an enlarged timing chart showing the operation after P12-17 shown in FIG. 12.

Since operations shown in FIG. 12 and FIG. 13 are the same as those shown in FIG. 10 and FIG. 11 except for the full open period of the timer, detailed description will be omitted.

Figure 14:
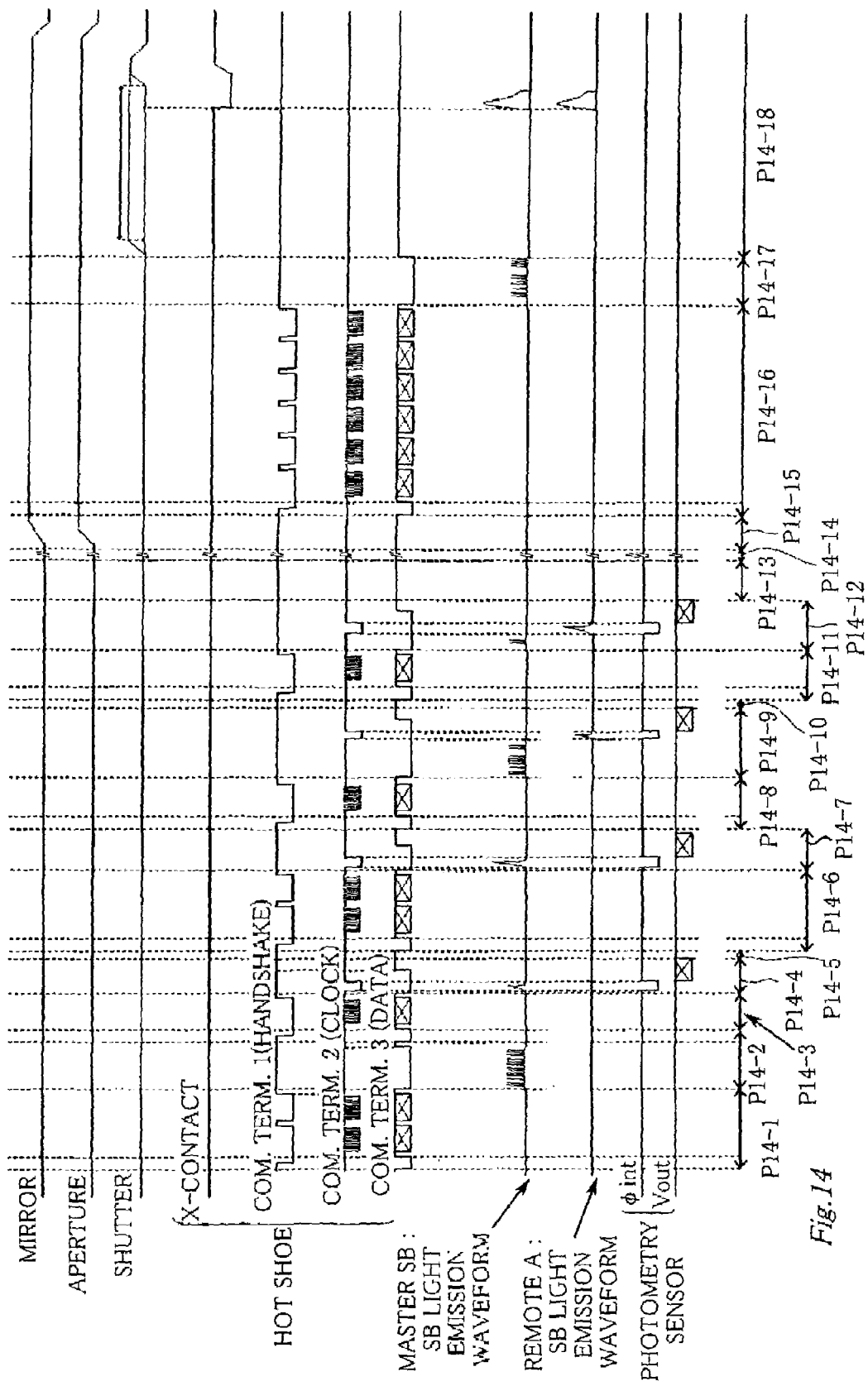
FIG. 14 is a timing chart showing an operation of the two-flash TTL light adjustment using the master SB 50 and the remote SB 60 in the case that the shutter value is ½ second or faster and a rear curtain synchronous photography is performed.

FIG. 14 is a timing chart showing an operation in the case that two-flash light emission TTL light adjustment using the master SB 50 and the remote SB 60, ½ second or faster shutter speed operation, and rear curtain synchronous photographing operation are performed.

Figure 15:
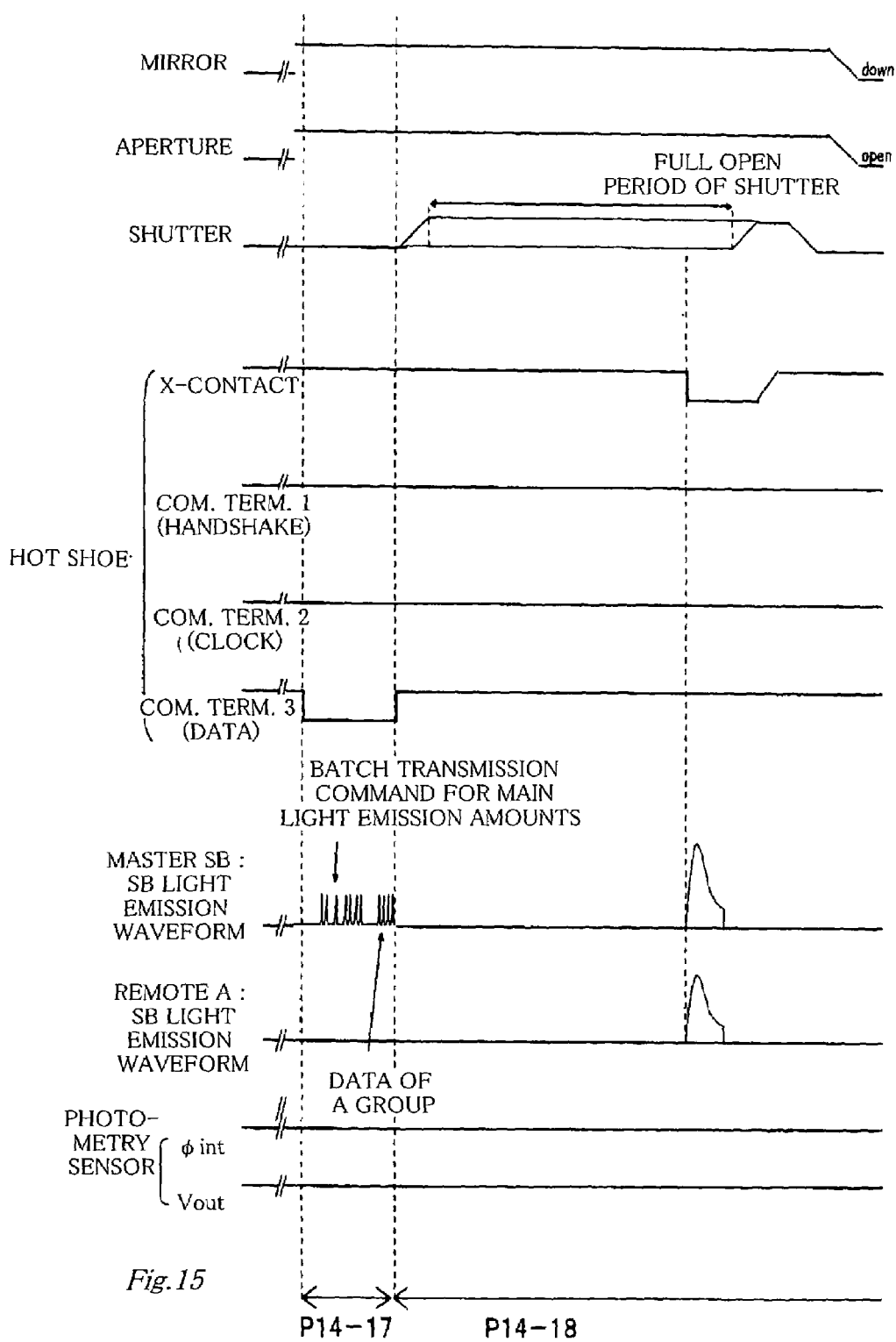
FIG. 15 is an enlarged timing chart showing the operation after P14-17 shown in FIG. 14.

FIG. 15 is an enlarged timing chart showing the operation after P12-17 shown in FIG. 14.

Since the operation until P14-17 shown in FIG. 14 and FIG. 15 is the same as the operation until P10-17 shown in FIG. 10 and FIG. 11, only the operation performed in P14-18 will be described.

In P14-18, immediately before indicated shutter full open time (immediately before the rear curtain of the shutter starts to close), the camera 30 transmits a light emission start signal to the X-contact so as to cause the master flash part 17 to perform a main light emission. When the remote flash part 19 receives the main light emission from the master flash part 17, the remote flash part 19 synchronously performs a main light emission. Thereafter, the rear curtain of the shutter starts to close, the mirror-down operation is performed, and the aperture is opened. The photographing operation is completed.

Figure 16:
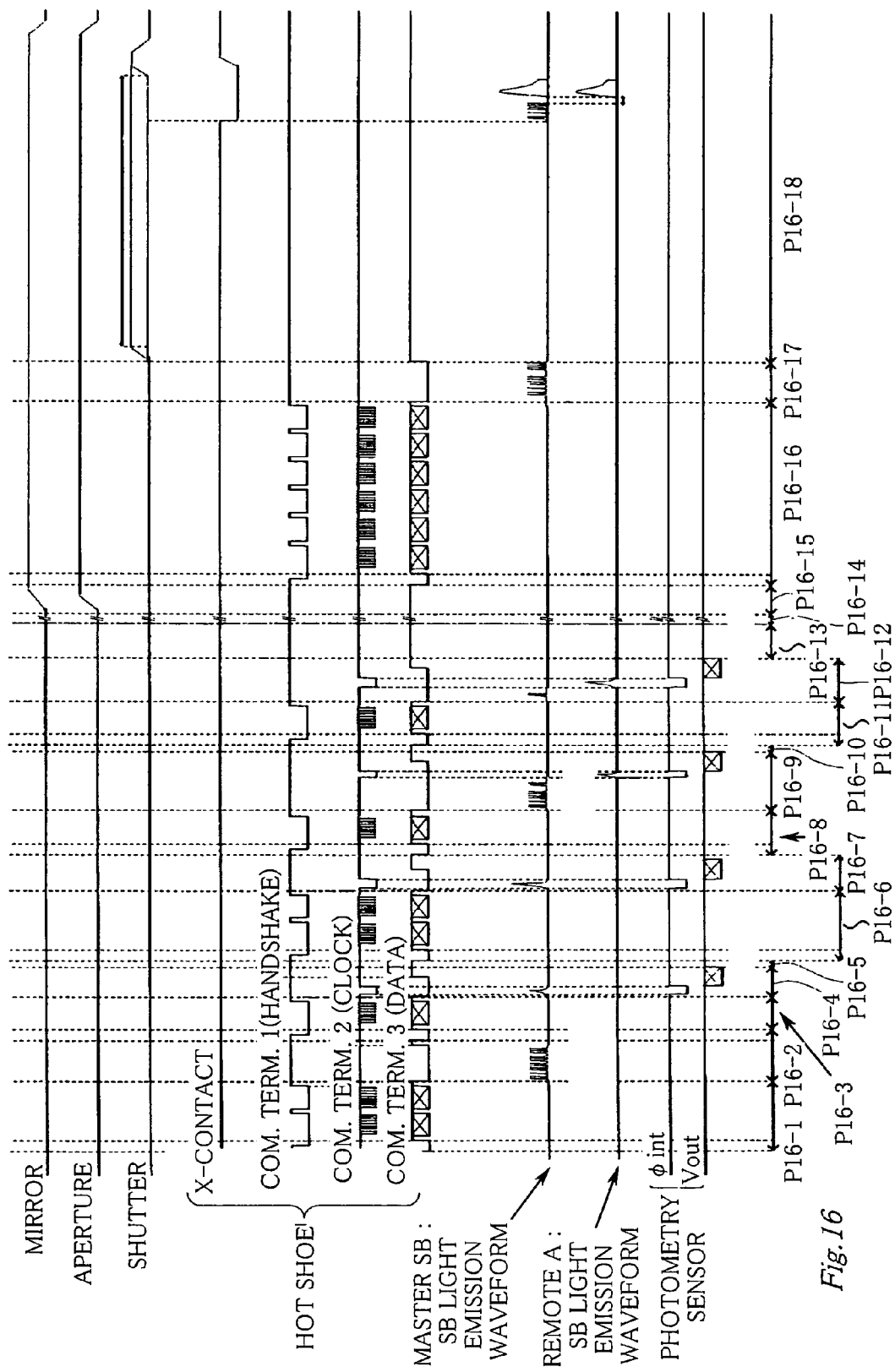
FIG. 16 is a timing chart showing an operation of the two-flash TTL light adjustment using the master SB 50 and the remote SB 60 in the case where the shutter value is ½ second or slower and the rear curtain synchronous photography is performed.

FIG. 16 is a timing chart showing an operation in the case that two-flash light emission TTL light adjustment using the master SB and the remote SB, a ½ second or slower shutter speed operation, and rear curtain synchronous photographing operation are performed.

Figure 17:
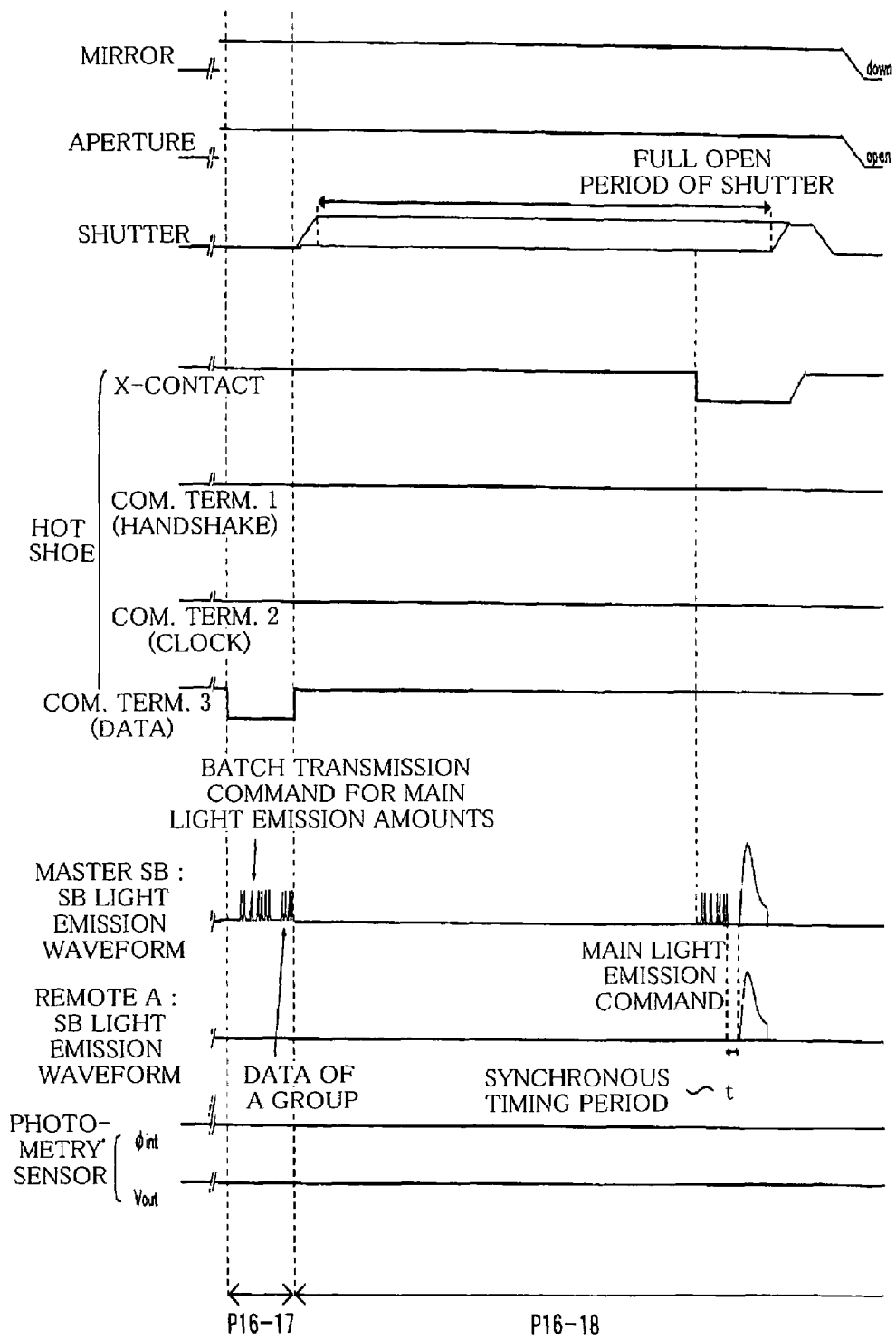
FIG. 17 is an enlarged timing chart showing the operation after P16-17 shown in FIG. 16.

FIG. 17 is an enlarged timing chart showing the operation after P12-17 shown in FIG. 14.

Since the operation until P16-17 shown in FIG. 16 and FIG. 17 is the same as the operation until P10-17 shown in FIG. 10 and FIG. 11, only the operation performed in P16-18 will be described.

In the case shown in FIG. 10 to FIG. 15, the light emission is performed in the first light emission mode. However, in the operation shown in FIG. 16 and FIG. 17, the shutter value is slower than ½ second and the rear curtain synchronous photographing operation is performed. Thus, it takes a time after the front curtain of the shutter is released until the rear curtain is closed. During that time, if another SB emits light or fireworks or the like light up, there is a possibility that the remote SB 60 erroneously emits light. To prevent that, in the case shown in FIG. 16 and FIG. 17, the master flash part 17 and the remote flash part 19 are synchronized in the second light emission mode.

Specifically, in P16-18, immediately before the predetermined shutter full open time (immediately before the rear curtain of the shutter starts to close), when the camera 30 transmits a light emission start signal to the master SB 50 through the X-contact, the master flash part 17 performs a pulse light emission as a communication light emission (main light emission command). After the master flash part 17 performs the light emission as the main light emission command and predetermined wait time period t (synchronous timing) elapses, the master SB 50 performs the main light emission. When the remote SB 60 receives the main light emission command and predetermined wait time period t elapses, the remote SB 60 performs the main light emission. Immediately after that, the rear curtain of the shutter starts to close, the mirror-down operation is performed, and the aperture is opened. The photographing operation is completed.

The predetermined wait time period t is as the shortest time as possible to the extent that time necessary until the master flash part 17 and the remote flash part 19 start the main light emissions is ensured. To make the predetermined wait time period t short, the remote SB 60 can be prevented from malfunctioning against another SB (flash light of another camera, fireworks, and so forth). In addition, since the communication light emission (main light emission command) and the main light emission are performed almost at the same time, the communication light emission (main light emission command) does not adversely affect the photographed result.

In the second light emission mode, a communication light emission for transmitting a main light emission amount and so forth is preformed before the shutter is released. Since the number of components of a communication light emission that is performed after the shutter is released as a main light emission command is very small, the communication light emission (main light emission command) does not adversely affect the photographed result.

Figure 18:
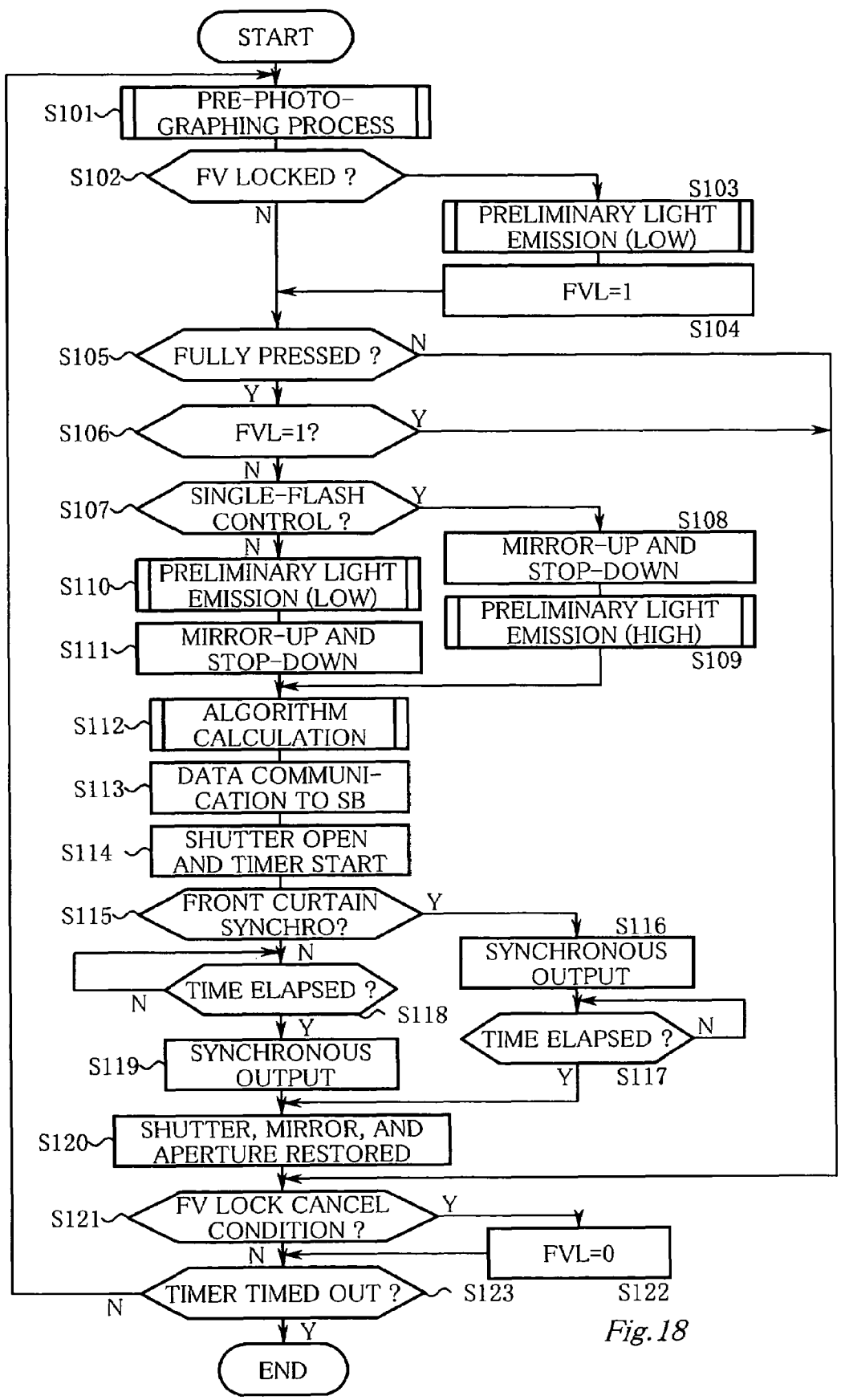
FIG. 18 is a flow chart showing a program of a camera microcomputer 31.

FIG. 18 is a flow chart showing a program of the camera microcomputer 31.

When the release switch 37 of the camera 30 is half-pressed, the power of the camera 30 is turned on and the program is executed. Next, each step (hereinafter abbreviated as S) will be described.

At S101, a pre-photographing subroutine (which will be described with reference to FIG. 19) is executed.

At S102, the camera microcomputer 31 determines whether or not an FV lock switch (not shown) has been pressed. When the FV lock switch has been pressed, the flow advances to S103. When the FV lock switch has not been pressed, the flow advances to S105.

At S103, a subroutine in the case that the FV lock switch has been pressed is executed (preliminary light emission 1, which will be described with reference to FIG. 20).

At S104, "1" is substituted for a flag FVL that represents that the FV lock is being performed.

At S105, the camera microcomputer 31 determines whether or not the release switch 37 has been fully pressed. When the release switch 37 has been fully pressed, the flow advances to S106. When the release switch 37 has not been fully pressed, the flow advances to S121.

At S106, the camera microcomputer 31 determines whether or not the relation of FVL=1 is satisfied. When the relation of FVL=1 is satisfied, the flow advances to S121. When the relation of FVL=1 is not satisfied, the flow advances to S107.

At S107, the camera microcomputer 31 determines whether or not a single-flash control is performed. When the single-flash control is performed, the flow advances to S108. When a multiple-flash control is performed, the flow advances to S110.

At S108, the camera microcomputer 31 causes the mirror-up operation and the stop-down operation to be performed.

At S109, the camera microcomputer 31 executes a subroutine process (preliminary light emission 2, which will be described with reference to FIG. 21).

At S110, the camera microcomputer 31 executes a subroutine process (preliminary light emission 1, which will be described with reference to FIG. 20).

At S111, the camera microcomputer 31 causes the mirror-up operation and the stop-down operation to be performed.

At S112, the camera microcomputer 31 executes a subroutine for an algorithm calculation (which will be described with reference to FIG. 23).

At S113, the camera 30 transmits main light emission amount data (main light emission amount multiple KgnM of the master SB and main light emission amount multiple KgnR of remote SB) to SB.

At S114, the camera microcomputer 31 causes the shutter to be released and starts to count time (photographing exposure start).

At S115, the camera microcomputer 31 determines whether or not the front curtain synchronous photographing operation is performed. When the front curtain synchronous photographing operation is performed, the flow advances to S116. When the front curtain synchronous photographing operation is not performed, the flow advances to S118.

At S116, the camera microcomputer 31 causes a synchronous output to be performed. The synchronous output is a light emission indicating signal. In the first light emission mode, the synchronous output is a main light emission of the master flash part 17. In the second light emission mode, the synchronous output is a communication light emission using a pulse light emission of the master flash part 17.

At S117, the camera microcomputer 31 determines whether or not predetermined shutter release time has elapsed. When the predetermined shutter release time has elapsed, the flow advances to S120. When the predetermined shutter release time has not elapsed, the camera microcomputer 31 repeats S117 until the predetermined shutter release time elapses.

S118 is the same as S117. At S118, the camera microcomputer 31 determines whether or not predetermined shutter release time has elapsed. When the predetermined shutter release time has elapsed, the flow advances to S119. When the predetermined shutter release time has not elapsed, the camera microcomputer 31 repeats S118 until the predetermined shutter release time elapses.

At S119, the camera microcomputer 31 causes a synchronous output to be performed. The synchronous output at S119 is the same as that at S116.

At S120, the camera microcomputer 31 causes the shutter to be closed (photographing exposure completion) and the mirror and the aperture to be restored.

At S121, the camera microcomputer 31 determines whether or not an FV lock cancel condition is satisfied (the FV lock switch 39 is pressed again while the FV is locked). When the FV lock cancel condition is satisfied, the flow advances to S122. When the FV lock cancel condition is not satisfied, the flow advances to S123.

At S122, the camera microcomputer 31 causes the flag FVL that identifies the state of the FV lock to be cleared to 0 (non-FV lock state).

At S123, the camera microcomputer 31 determines whether or not a predetermined time period has elapsed since the half-press timer has started counting. When the predetermined time period has not elapsed; the flow returns to S101. At S101, the camera microcomputer 31 repeats the process. When the predetermined time period has elapsed, the camera microcomputer 31 completes the process.

Figure 19:
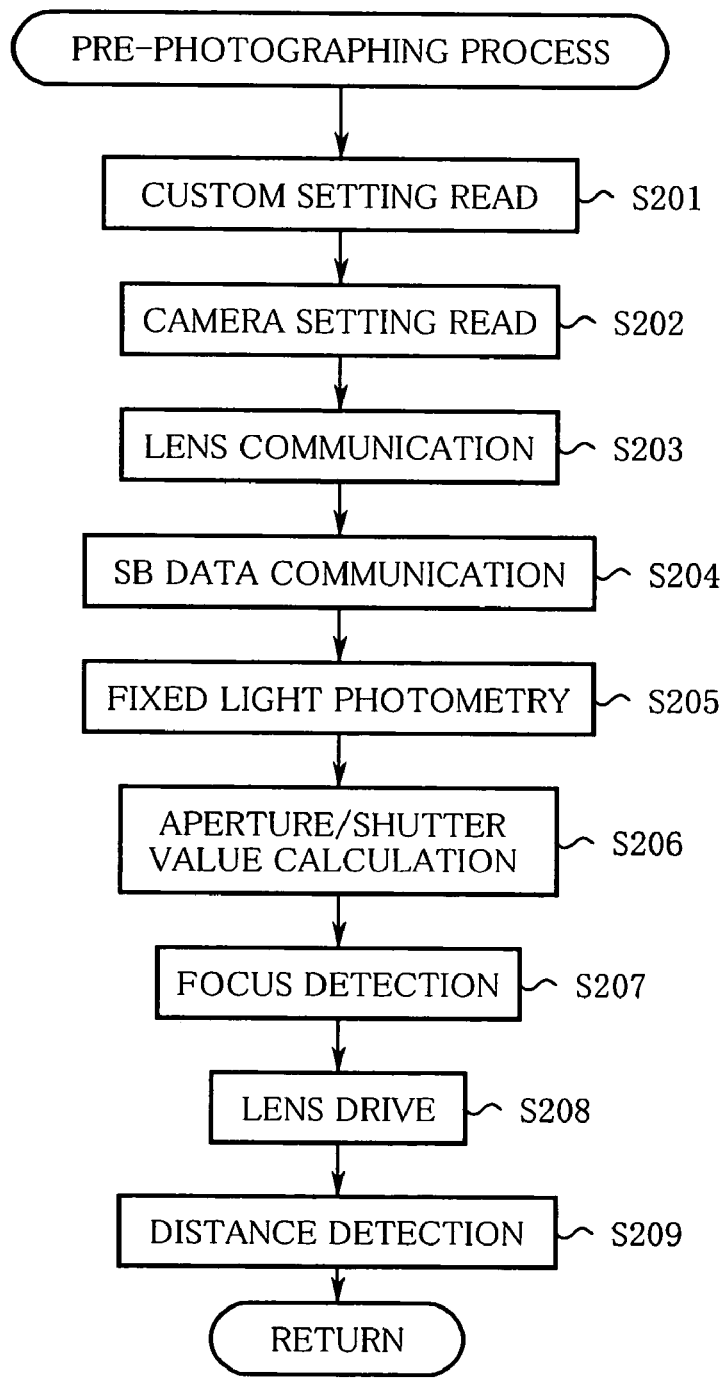
FIG. 19 is a flow chart showing a subroutine for a pre-photographing process.

FIG. 19 is a flow chart showing the subroutine for the pre-photographing process. When S102 shown in FIG. 18 is executed, the camera microcomputer 31 calls and executes this subroutine.

Next, each step of the subroutine will be described.

At S201, the camera microcomputer 31 reads custom settings of the camera (selection of photometry part and selection of remote trigger system: first light emission mode or second light emission mode).

At S202, the camera microcomputer 31 reads various settings of the camera (sensitivity, photometry mode, exposure mode, and so forth).

At S203, the camera microcomputer 31 reads focal distance of the photographing lens, open F-number, exit pupil distance, distance data, and so forth through a lens communication.

At S204, the camera microcomputer 31 reads light emission time period of preliminary light emission (low and high), light amount for one shot of chop light emission, maximum main light emission amount, states of SBs (bounce state or not), and so forth through a SB communication.

At S205, the camera microcomputer 31 causes fixed light to be measured and calculates photometry values and the like of B(1, 1) to B(5, 5) and B1 to B5.

At S206, the camera microcomputer 31 calculates an appropriate exposure value in accordance with the photometry values by a known method and obtains an aperture value and a shutter value in accordance with the exposure mode.

At S207, the camera microcomputer 31 detects a focal point.

At S208, the camera microcomputer 31 causes the lens to be driven and focused until the defocus amount becomes 0 in accordance with the focus detection state.

At S209, assuming that the focal distance of the photographing lens at the in-focus position is the distance of the subject, the camera microcomputer 31 reads the value of the focal distance from the lens microcomputer 41.

Figure 20:
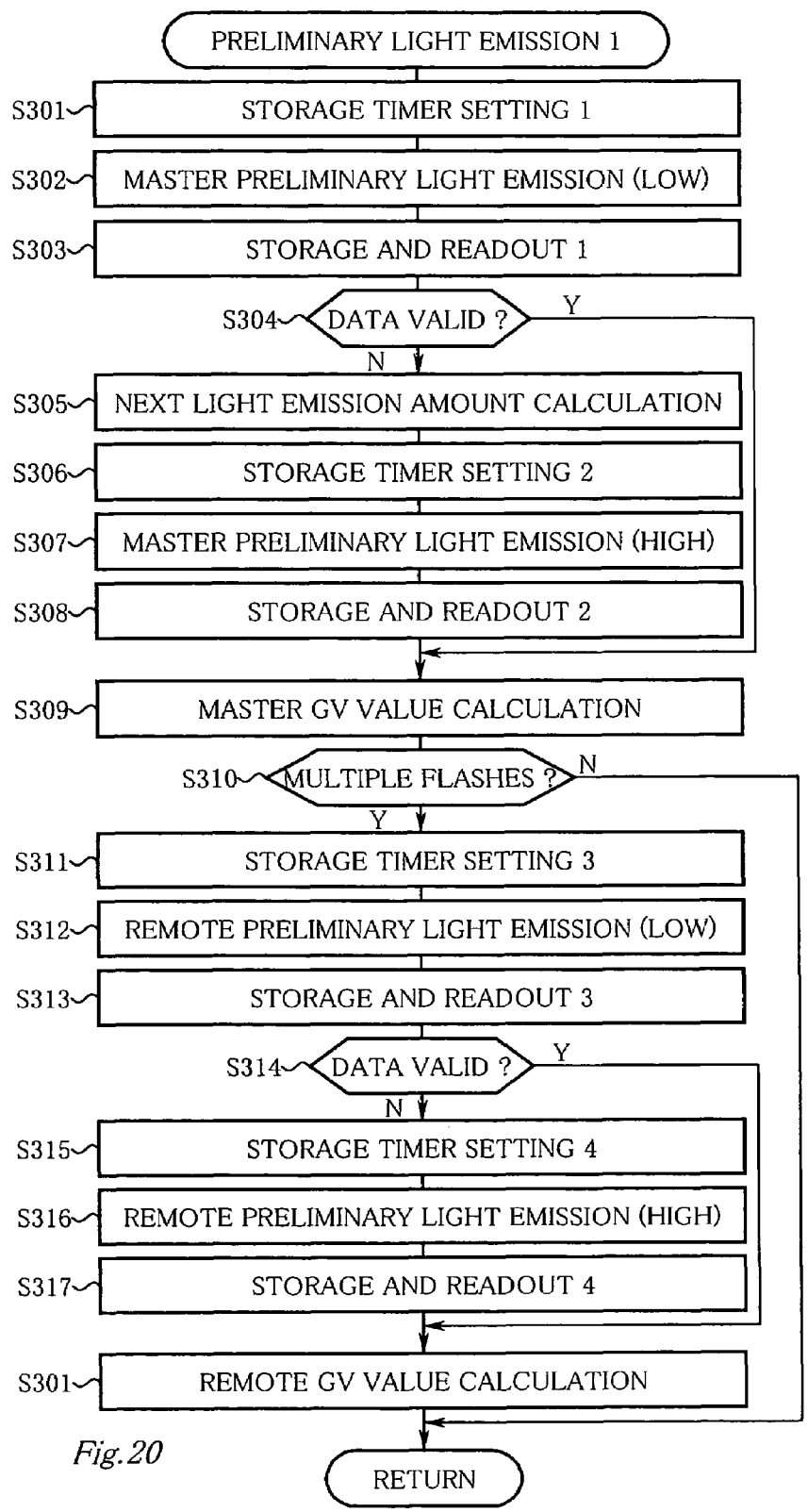
FIG. 20 is a flow chart showing a subroutine for a preliminary light emission 1.

FIG. 20 is a flow chart showing the subroutine for the preliminary light emission 1. When S103 or S110 shown in FIG. 18 is executed, the camera microcomputer 31 calls and executes the subroutine.

Next, each step of the subroutine will be described.

At S301, the camera microcomputer 31 sets the timer of the storage time of the photometry sensor 9 to the light emission time of the master preliminary light emission (low) that has been read through the SB communication at S204 (storage timer setting 1).

At S302, the camera microcomputer 31 transmits to the master flash part 17 a command that causes it to perform a master preliminary light emission (low). Then, the master flash part 17 performs the master preliminary light emission (low). The light amount of the first master preliminary light emission (low) is predetermined in accordance with a relevant standard (for example, guide number 2 of ISO 100). Thus, the SB side does not need to indicate the light amount of the first master preliminary light emission (low).

At S303, the camera microcomputer 31 causes the photometry sensor 9 to start storing the data in synchronization with the master preliminary light emission (low) of the master SB 50 and stop storing the data at the time period that has been set at S302, and reads the photometry data.

At S304, the camera microcomputer 31 determines whether or not the photometry data can be used for a required calculation. Specifically, the camera microcomputer 31 determines whether or not the maximum value (Vomax) of each data of B, G, and R of the 240 regions exceeds a predetermined level (Vn). When the maximum value exceeds the predetermined level, the camera microcomputer 31 considers that the photometry data can be used. When the photometry data can be used, the flow advances to S309 without performing the second preliminary light emission. Normally, the camera microcomputer 31 needs to determine whether or not the maximum value (Vomax) exceeds a saturation level. However, in this example, this determination is not necessary since the light amount of the preliminary light emission is indicated so that the photometry value does not saturate in the real use range corresponding to the sensitivity of the photometry sensor 9. When the photometry sensor has an output range of 0 to 4 V, the predetermined level Vn is around 0.5 V.

At S305, when the maximum value (Vomax) does not reach the predetermined level, the camera microcomputer 31 calculates the next light emission amount in accordance with the following formula 1.

$$GN2 = GN1 + \{2 * \log 2 \, (Vagc/Vomax)\} \quad \text{(Formula 1)}$$

where each variable represents:

GN2: Next light emission amount (unit: guide number)
GN1: Preceding light emission amount (unit: guide number)
Vagc: Target level of preliminary photometry value (unit: V or A/D value)
Vomax: Maximum value of preceding preliminary photometry value (unit: V or A/D value)

At S306, the camera microcomputer 31 sets the timer of the storage time of the photometry sensor 9 to the light emission time of the master preliminary light emission (high) that has been read through the SB communication at S204 (storage timer setting 2).

At S307, the camera microcomputer 31 transmits to the SB a command that causes it to perform the preliminary light emission (high) and data that indicates the light amount. The light amount can be indicated by guide number, a relative value to the preceding light amount, a most appropriate light amount for the camera side obtained from several light emission patterns transmitted through the SB communication. Whichever method is selected, the light amount may be pre-indicated in accordance with a communication standard.

At S308, the camera microcomputer 31 causes the photometry sensor 9 to start storing the data in synchronization with the preliminary light emission of the SB and stop storing the data at the time that has been set at S306, and reads the photometry data.

At S309, the camera microcomputer 31 calculates GV[i, j] (i=1 to 5; j=1 to 5) with the result of the preliminary photometry in accordance with the following formula 2. GV[i, j] represents a unit EV into which a guide number of the reference exposure amount to the standard reflectance subject is converted. GV[i, j] (i=1 to 5; j=1 to 5) corresponds to B(1, 1) to B(5, 5) shown in FIG. 3(a), respectively.

$$GV[i, j] = \log 2 \, (GN\text{pre}^2) + \log 2 \, (AD0[i, j]/AD[i, j]) + (AV - AV0) \quad \text{(Formula 2)}$$

where each variable represents:

GNpre: Guide number of preliminary light emission (first time or second time)

AD0[i, j]: Photometry value of each region B[i, j] (i=1 to 5; j=1 to 5) of appropriate light amount (average value in each region)

AD[i, j]: Photometry value of each region B[i, j] (i=1 to 5; j=1 to 5) of preliminary light emission (average value in each region)

AV: Control aperture value (APEX value)

AV0 : Open F value (APEX value)

where the preceding formula 2 is used to calculate GV[i, j] of all the regions. However, when the FV is locked, in consideration of only a part of photometric field (for example, a region (3, 3) at the center of the screen), the appropriate light amount may be calculated. In such a case, it is not necessary to calculate all GV[i, j]. In other words, when GV[i, j] are calculated for only required regions (center of the screen and a region corresponding to AF region), the calculation time and memory consumption can be reduced.

At S310, the camera microcomputer 31 determines whether or not a multiple-flash photographing operation is performed. When the multiple-flash photographing operation is performed, the flow advances to S311. When the single-flash photographing operation is performed, the flow returns to the main program.

At S311, the camera microcomputer 31 sets the timer of the storage time of the photometry sensor 9 to the light emission time of the remote preliminary light emission (low) that has been read through the SB communication at S204 (storage timer setting 3). At S312, the camera microcomputer 31 transmits to the master flash part 17 a command that causes it to perform the remote preliminary light emission (low). The master flash part 17 performs a communication light emission that indicates a remote preliminary light emission (low) to be performed. The remote flash part 19 receives the communication light emission and performs the remote preliminary light emission (low). The light amount of the first remote preliminary light emission is pre-indicated in accordance with a relevant standard (for example, guide number 2 of ISO 100). Thus, it is not necessary to indicate the light amount to the SB side.

At S313, the camera microcomputer 31 causes the photometry sensor 9 to start storing the data in synchronization with the remote preliminary light emission (low) of the remote SB 60 and stop storing the data at the time that has been set at S311, and reads the photometry data.

At S314, the camera microcomputer 31 determines whether or not the photometry, data can be used for the calculation in the same manner as at S304. When the photometry data can be used, the flow advances to S318 without performing the second preliminary light emission.

At S315, the camera microcomputer 31 sets the timer of the storage time of the photometry sensor 9 to the light emission time of the remote preliminary light emission (high) that has been read through the SB at S204 (storage timer setting 4).

At S316, the camera microcomputer 31 transmits to the master flash part 17 a command that causes it to perform the remote preliminary light emission (high). The master flash part 17 receives the command and performs a communication light emission that causes the remote SB to perform the remote preliminary light emission (high). The remote flash part 19 receives the communication light emission and performs the remote preliminary light emission (high). The light amount of the first remote preliminary light emission is pre-indicated in accordance with a relevant standard (for example, guide number 2 of ISO 100). Thus, it is not necessary to indicate the light amount of the first remote preliminary light emission to the SB.

At S317, the camera microcomputer 31 causes the photometry sensor 9 to start storing the data in synchronization with the remote preliminary light emission (high) of the remote SB 60 and stop storing the data at the time that has been set at S315, and reads the photometry data.

At S318, the camera microcomputer 31 calculates a guide number for which the remote flash part 19 performs the main light emission. Thereafter, the flow returns to the main program.

Figure 21:
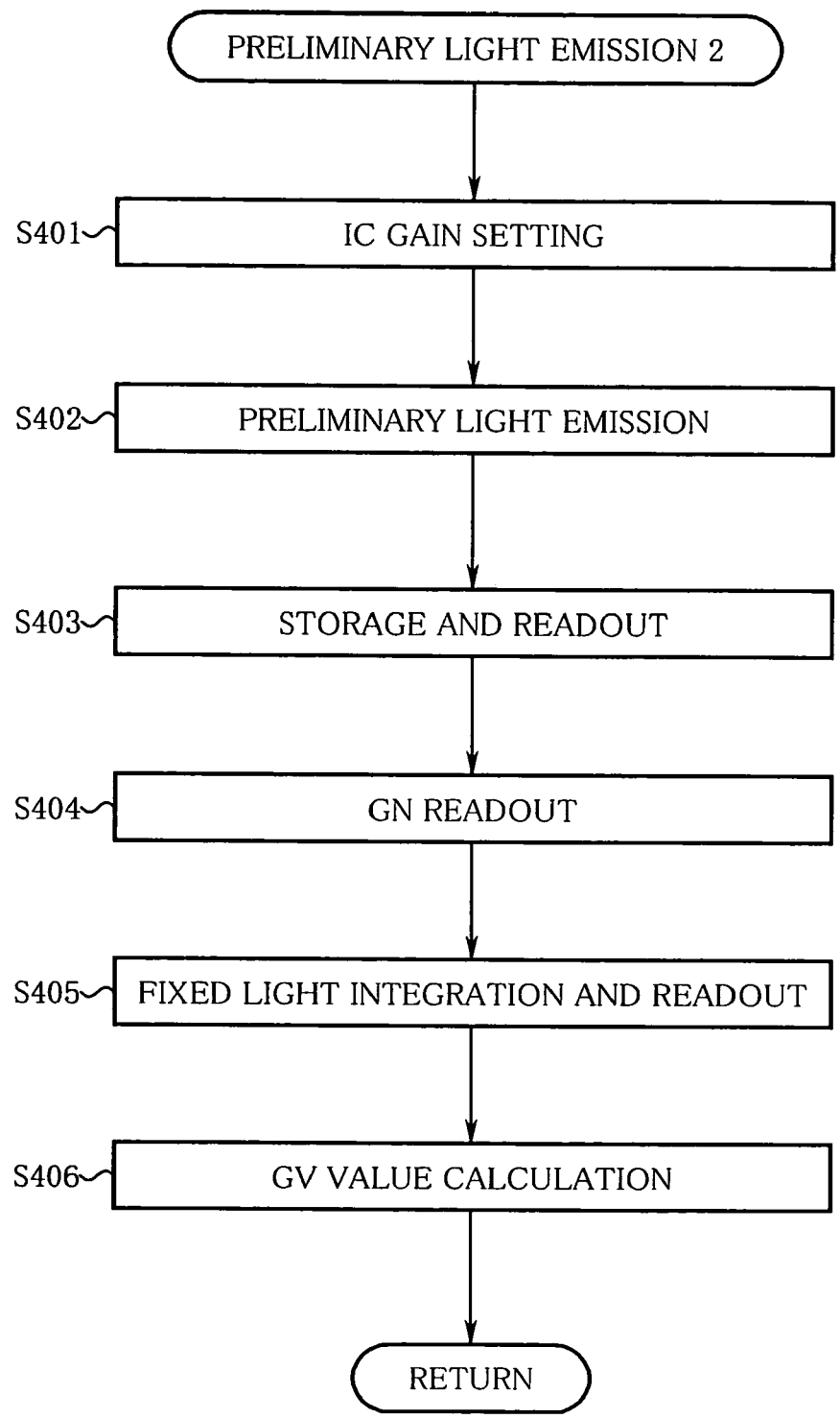
FIG. 21 is a flow chart showing a subroutine for a preliminary light emission 2.

FIG. 21 is a flow chart showing the subroutine for the preliminary light emission 2. When S109 shown in FIG. 18 is executed, the camera microcomputer 31 calls and executes this subroutine. As shown in FIG. 18, the camera microcomputer 31 executes this subroutine when the preliminary light emission is performed after the mirror-up operation. The flow chart shown in FIG. 21 corresponds to the timing chart shown in FIG. 8.

Next, each step of the subroutine will be described.

At S401, the camera microcomputer 31 sets an IC gain of the light adjusting sensor 15. The IC gain is set for each of the regions S1 to S5 shown in FIG. 6. First of all, the camera microcomputer 31 calculates a gain setting parameter GaV[i] (i=1 to 5) in accordance with the following formula 3.

$$GaV[i]=SvV+GnV+XmV+AvV+BvV[i]+BoV+ReV-Sa[i] \ (i=1 \text{ to } 5) \quad \text{(Formula 3)}$$

The unit of GaV[i] is Ev, and the value of i corresponds to the number of each region S.

The gain is proportional to the increase of the value of GaV[i]. Next, each term of the right side of the formula 3 will be described.

SvV represents a change amount of setting sensitivity of the imaging sensor. As shown in FIG. 22(a), SvV is proportional to the increase of the sensitivity (SV), and the gain increases accordingly. This is because as the sensitivity increases, the distance for proper exposure extends to the far side. Thus, the preliminary light emission should be measured for a long distance. However, since a photographing operation may be performed in a short distance with high sensitivity, the increase of SvV is limited to 1 or less when sensitivity varies by 1 EV, to prevent sensitivity from excessively increasing.

GnV represents a change amount of light amount (GNp1) for one shot of a preliminary light emission. GNp1 changes in accordance with an attached SB and the light distribution angle thereof. To absorb the variation of GNp1 and obtain a constant photometry value regardless of the state of the SB, when GNp1 is increased by 1 EV, Gnv is decreased by 1 EV as shown in FIG. 22(b).

XmV represents a change amount of the distance. To obtain a constant photometry value regardless of the distance, when the distance is increased by 1 EV (distance is increased √2 times), XmV is increased by 1 EV as shown in FIG. 22(c).

AvV represents a change amount of an aperture value. To obtain a constant photometry value regardless of the aperture value, when the aperture value is increased by 1 EV (becomes dirk), AvV is increased by 1 EV as shown in FIG. 22(d).

BvV[i] represents a change amount of the luminance value. When the luminance of surrounding light increases, it enters the light adjusting sensor 15 even while performing a preliminary light emission. This leads to a condition that before an integrated value of reflected light of the SB is sufficiently stored, a stop signal is generated and the integration of the reflected light is stopped. Thus, when the luminance of surrounding light is high, the gain of the region is lowered in accordance with the luminance. When the luminance exceeds BVofset, whenever the luminance increases by 1 EV, the gain is decreased by 1 EV. When the decreased gain reaches BvVmax, BvV is clipped.

BoV represents a value that changes depending on whether or not the SB is in the bounce state. When the SB is not in the bounce state (normal state), the value of BoV is 0. When the master SB is in the bounce state, the value of BoV is +2 EV. This is because when the SB is in the bounce state, since the subject is illuminated by the SB through a ceiling or the like, the amount of reflected light becomes small.

Rev represents a value that varies depending on whether or not a preliminary light emission has been repeated. When the first preliminary light emission is performed, the value of Rev is 0. When the photometry value is saturated by the first preliminary light emission, −3 EV is set for the value of ReV so as to decrease the gain. With the decreased gain, the second preliminary light emission is performed.

Sa[i] represents a compensation value calculated in accordance with the type of the photographing lens and the aperture value that has been set. The compensation value is obtained for each region (a calculation formula is predetermined through experiments).

Next, the camera microcomputer 31 calculates a gain DApre[i] that is actually set for the light adjusting sensor 15 in accordance with the following formula 4.

$$DApre[i]=(pre\_level[i]-GaV[i]*pre\_gamma)* T/Tref (i=1 \text{ to } 5) \quad \text{(Formula 4)}$$

where each variable represents:
pre_level[i]: Reference value of light adjusting level of preliminary light emission
pre_gamma: Gamma adjustment value
T: Current temperature
Tref: Temperature upon adjustment The reason why GaV[i] is minus is that when the DA terminal voltage of the light adjusting sensor 15 shown in FIG. 7 is lowered, the gain is increased.

At S420, the camera microcomputer 31 transmits a command for a stop light adjustment preliminary light emission. The maximum value of the preliminary light emission amount is pre-indicated in accordance with a relevant standard (for example, guide number 8 of ISO 100). Thus, the maximum value of the preliminary light emission amount does not need to indicate for the SB side.

At S403, the camera microcomputer 31 starts integrating the output of the light adjusting sensor 15 in synchronization with the preliminary light emission of the SB. When the integrated value of the light adjusting sensor 15 reaches the predetermined amount before the light emission reaches the maximum preliminary light emission amount, the light adjusting sensor 15 outputs a stop signal to stop the preliminary light emission. Thereafter, the camera microcomputer 31 reads photometry data AD[i] (i=1 to 5).

At S404, the camera microcomputer 31 reads a guide number at which the SB has actually performed the preliminary light emission through the SB data communication.

At S405, the camera microcomputer 31 integrates fixed light. The camera microcomputer 31 integrates fixed light with the same gain as that at S401 and for the same time period as that of the preliminary light emission, and reads the integrated value IGtei[i].

At S406, the camera microcomputer 31 calculates GV[i] (i=1 to 5) with the result of the preliminary light emission in accordance with the following formula 5.

$$GV[i]=\log 2\ (GNp1)+\log 2\ (Qpre)+GaV[i]+ \log 2\ (IGstop/IG[i])+Gofset \quad \text{(Formula 5)}$$

where log 2( ) represents a logarithm that takes 2 as a base. IGstop represents a logical value of IG[i] when a stop signal is output. The relation of IG[i]=IGpre[i]−IGtei[i] (IG[i] >0) is satisfied.

Figure 23:
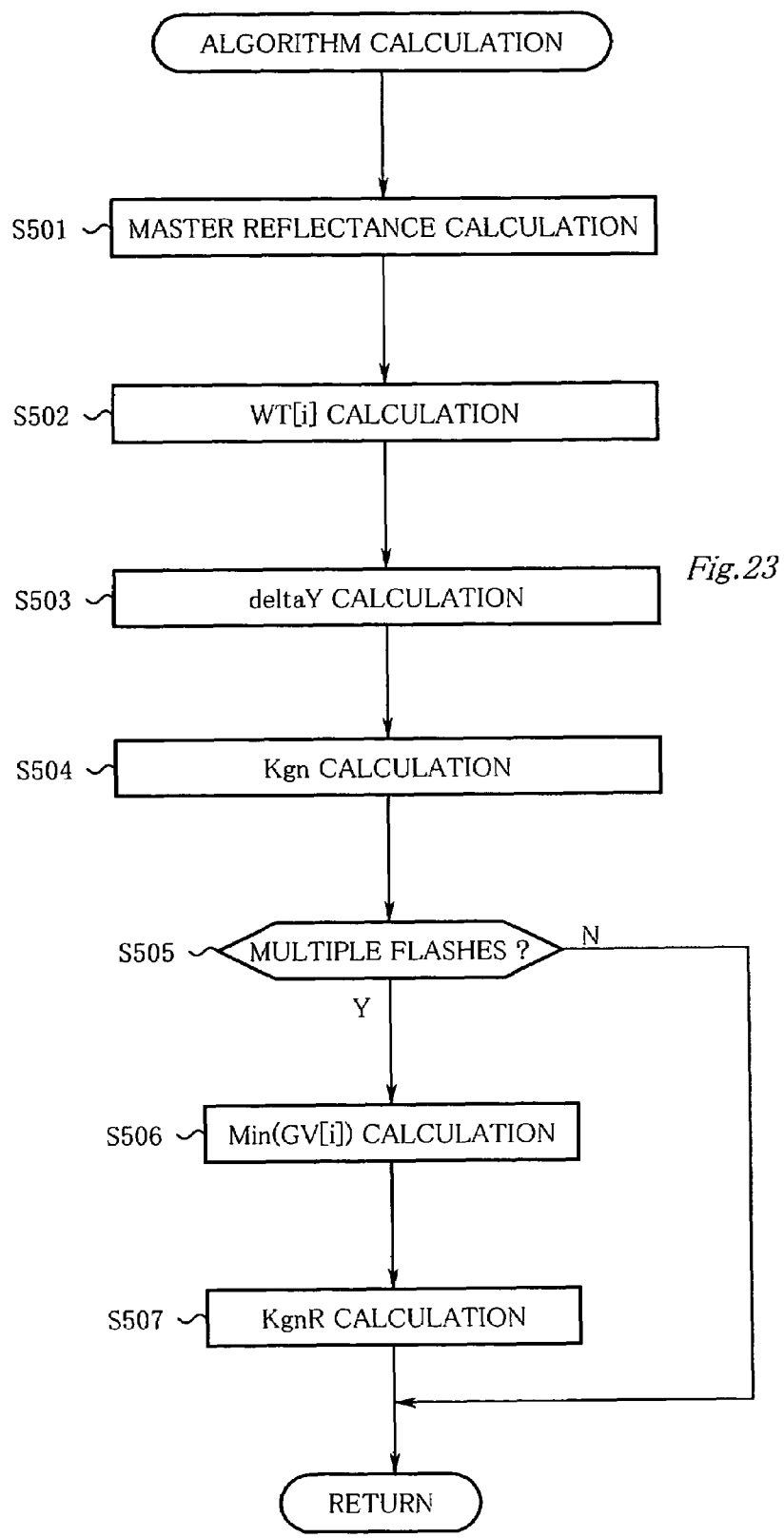
FIG. 23 is a flow chart showing a subroutine for an algorithm calculation.

FIG. 23 is a flow chart showing the subroutine for the algorithm calculation. When S112 shown in FIG. 18 is executed, the camera microcomputer 31 calls and executes the subroutine.

At S501, the camera microcomputer 31 obtains reflectance RefG[i] of the subject with GVm[i] that is a GV value obtained from a preliminary light emission of the master SB in accordance with the following formula 6 and formula 7.

$$ReSEV[i]=2*X+AV-GV[i] (i=1 \text{ to } 5) \quad \text{(Formula 6)}$$

where each variable represents:
X: Photographing distance (unit: m)
AV: Photographing aperture value (unit: AV)

ReSEV[i] represents a variable that is 0 when the reflectance is a standard value. When the reflectance is higher than the standard value by +1, the value of ReSEV[i] is +1. When the reflectance is lower than the standard value by −1, the value of ReSEV[i] is −1.

Next, the camera microcomputer 31 calculates a weighting value RefG[i] for each region corresponding to the reflectance with ReSEV[i] in accordance with the following formula 7.

$$RefG[i]=1/(2\ \hat{}(Abs\ (RefG[i]))) (i=1 \text{ to } 5) \quad \text{(Formula 7)}$$

where Abs( ) represents a function for obtaining the absolute value in ( ). RefG[i] represents a variable that is 1 when the reflectance of the subject is a standard value and that decreases as the difference between the reflectance and the standard value becomes large as shown in FIG. 24(a).

At S502, the camera microcomputer 31 standardizes RefG[i] in accordance with the following formula 8 and calculates a weight wt[i] for each region.

$$wt[i]=RefG[i]/\Sigma(RefG[i]) (i=1 \text{ to } 5) \quad \text{(Formula 8)}$$

where Σ( ) represents a function for obtaining the sum of the variable RefG[i] (i=1 to 5) in ( ).

At S503, the camera microcomputer 31 obtains the compensation value deltaY of the main light emission amount.

First of all, the camera microcomputer 31 calculates the compensation value RefMain of reflectance of all the photographic field with ReSEV[i] obtained by the formula 6, in accordance with the following formula 9.

$$RefMain=\log 2(\Sigma(wt[i]*2\ \hat{}ReSEV[i])) (i=1 \text{ to } 5) \quad \text{(Formula 9)}$$

where Σ( ) represents a function that is the same as in the formula 16. log 2 is a function that represents a logarithm to base 2.

The camera microcomputer 31 calculates the compensation value deltaY of the main light emission amount with RefMain in accordance with the following formula 10.

$$deltaY=krm*RefMain \quad \text{(Formula 10)}$$

FIG. 24(b) shows the relation between the reflectance and deltaY. krm represents a constant that adjusts the level of compensation of the reflectance. krm is normally around 0.5. When necessary, krm may be varied.

At S504, the camera microcomputer 31 calculates the main light emission amount multiple KgnM of the master SB with wt[i], deltaY, and the like in accordance with the following formula 11 and formula 12.

$$K=\Sigma(2^{(GV[i]/2)}*wt[i])/(2^{(GNpre/2)}) \quad \text{(Formula 11)}$$

where each variable represents:
GV[i]: GV value for a region used for calculation.
w[i]: Weighting coefficient for a region used for calculation
GNpre: Guide number for which preliminary light emission is performed When the FV is locked, GV[i] is only GV[3, 3]. In addition, the relation of w[3, 3]= 1 is satisfied.

The main light emission amount multiple value Kgn is obtained in accordance with the following formula (12).

$$Kgn=12*(\log 2\ (K)+\text{deltaY})+128 \quad \text{(Formula 12)}$$

Kgn obtained by the formula 12 is substituted for the main light emission amount multiple KgnM of the master SB.

At S506, when the remote SB is used, the camera microcomputer 31 selects the minimum value of GVr[i] (i=1 to 5) that is a GV value obtained by a preliminary light emission of the remote SB. The minimum value represents the brightest region of the photographic field lighted by the remote SB. In FIG. 25, for example, the brightest region is the lower right region A.

At S507, the camera microcomputer 31 calculates the main light emission amount multiple KgnR of the remote SB with the selected GV value in accordance with the formula 11 and formula 12.

Figure 26:
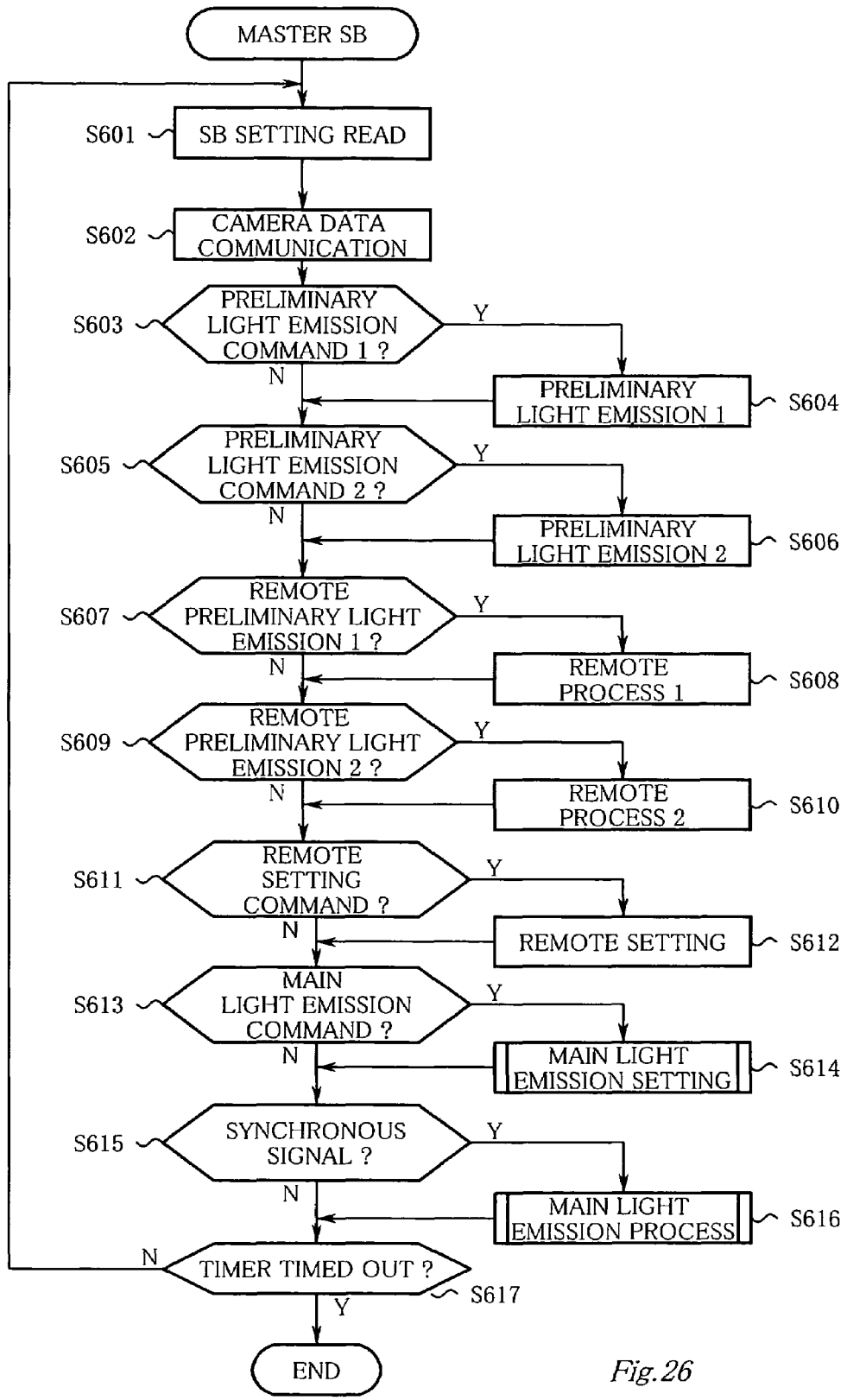
FIG. 26 is a flow chart showing a program of a master SB microcomputer 51.

FIG. 26 is a flow chart showing a program of the master SB microcomputer 51. When the power of the master SB is turned on, the master SB microcomputer 51 executes the program.

At S601, the master SB microcomputer 51 reads settings of the master SB 50.

At S602, the master SB microcomputer 51 communicates with the camera 30.

At S603, the master SB microcomputer 51 determines whether or not it has received from the camera 30 a command (preliminary light emission command 1) that causes a preliminary light emission 1 to be performed (at S103 and S110 shown in FIG. 18). When the master SB microcomputer 51 has received the preliminary light emission command 1 from the camera 30, the flow advances to S604. When the master SB microcomputer 51 has not received the preliminary light emission command 1, the flow advances to S605.

At S604, the master SB microcomputer 51 causes the preliminary light emission 1 to be executed (see FIG. 20).

At S605, the master SB microcomputer 51 determines whether or not it has received from the camera 30 a command (preliminary light emission command 2) that causes the preliminary light emission 2 to be performed (at S109 shown in FIG. 18). When the preliminary light emission command 2 has been received from the camera 30, the flow advances to S606. When the preliminary light emission command 2 has not been received from the camera 30, the flow advances to S607.

At S606, the master SB microcomputer 51 causes the preliminary light emission 2 to be executed (see FIG. 21).

At S607, the master SB microcomputer 51 determines whether or not the remote preliminary light emission 1 is performed. When a remote preliminary light emission command has been received from the camera 30 and the remote preliminary light emission 1 is to be performed, the flow advances to S608. When the remote preliminary light emission 1 is not to be performed, the flow advances to S609.

At S608, the master SB microcomputer 51 performs the remote process 1. Specifically, a communication light emission is performed to cause the remote flash part to perform a remote preliminary light emission (low).

At S609, the master SB microcomputer 51 determines whether or not the remote preliminary light emission 2 is performed. When a remote preliminary light emission command has been received from the camera 30 and the remote preliminary light emission 2 is to be performed, the flow advances to S610. When the remote preliminary light emission 2 is not to be performed, the flow advances to S611.

At S610, the master SB microcomputer 51 performs the remote process 2. Specifically, the remote flash part 19 performs a communication light emission that causes a remote preliminary light emission (high) to be performed.

At S611, the master SB microcomputer 51 determines whether or not a remote setting command has been received from the camera 30. When the remote setting command has been received, the flow advances to S612. When the remote setting command has not been received, the flow advances to S613.

At S612, the master SB microcomputer 51 causes a communication light emission for setting the remote SB 60 to be performed.

At S613, the master SB microcomputer 51 determines whether or not a main light emission command has been received from the camera 30. When the main light emission command has been received, the flow advances to S614. When the main light emission command has not been received, the flow advances to S615.

Figure 27:
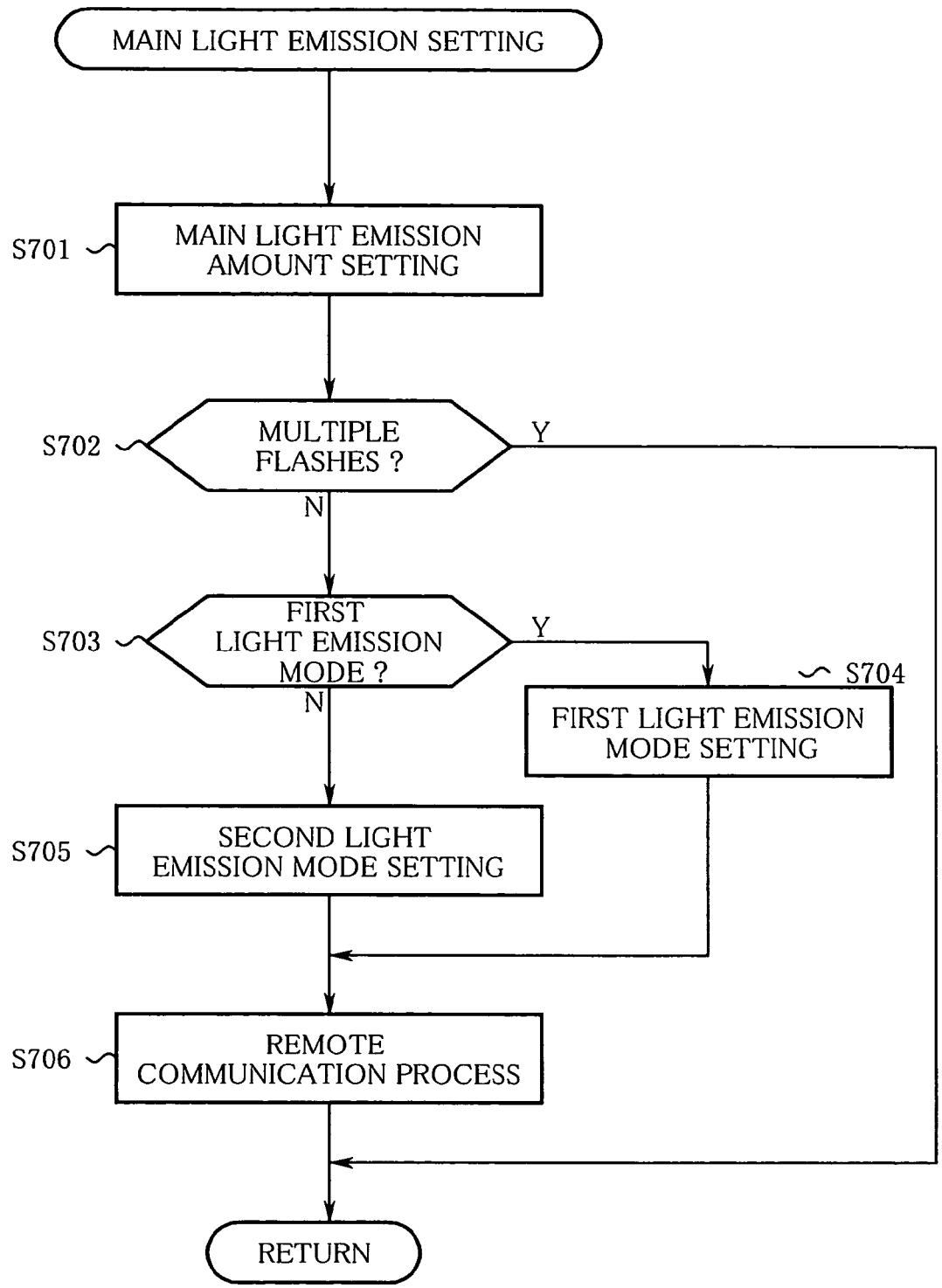
FIG. 27 is a flow chart showing a subroutine in the case where the master SB receives a main light emission command.

At S614, the master SB microcomputer 51 performs the main light emission setting (see FIG. 27).

At S615, the master SB microcomputer 51 determines whether or not a synchronous signal has been received from the camera 30. The synchronous signal is a signal representing that the signal level of the X-contact goes low (see FIG. 10 to FIG. 17). When the synchronous signal has been received from the camera 30, the flow advances to S616. When the synchronous signal has not been received from the camera 30, the flow advances to S617.

At S616, the master SB microcomputer 51 causes a main light emission to be performed.

At S617, the master SB microcomputer 51 determines whether or not a predetermined time period has elapsed after the half-press timer has been pressed. When the predetermined time period has not elapsed, the flow returns to S601. At S601, the master SB microcomputer 51 repeats the process. When the timer has timed out, the master SB microcomputer 51 completes the process.

FIG. 27 is a flow chart showing a subroutine for the master SB microcomputer 51 in the case that the master SB receives the main light emission command. When S614 shown in FIG. 26 is executed, the master SB microcomputer 51 calls and executes this subroutine.

At S701, the master SB microcomputer 51 sets a main light emission amount.

At S702, the master SB microcomputer 51 determines whether or not a multiple-flash photographing operation is performed. When the multiple-flash photographing operation is performed, the flow returns to the main routine. When a single-flash photographing operation is performed, the flow advances to S703.

At S703, the master SB microcomputer 51 determines whether or not a first light emission mode is executed. Specifically, when the custom settings have been set as automatic, an operation is performed in accordance with the table shown in FIG. 36. When the custom settings have been set, an operation is performed in accordance with the setting. When the master SB microcomputer 51 executes a first light emission mode, the flow advances to S704. When the master SB microcomputer 51 executes a second light emission mode, the flow advances to S705.

At S704, the master SB microcomputer 51 causes the first light emission mode to be executed.

At S705, the master SB microcomputer 51 causes the second light emission mode to be executed.

At S706, the master SB microcomputer 51 causes a communication light emission to be performed so as to set the remote SB 60 in the first light emission mode or the second light emission mode. Thereafter, the flow returns to the main program.

Figure 28:
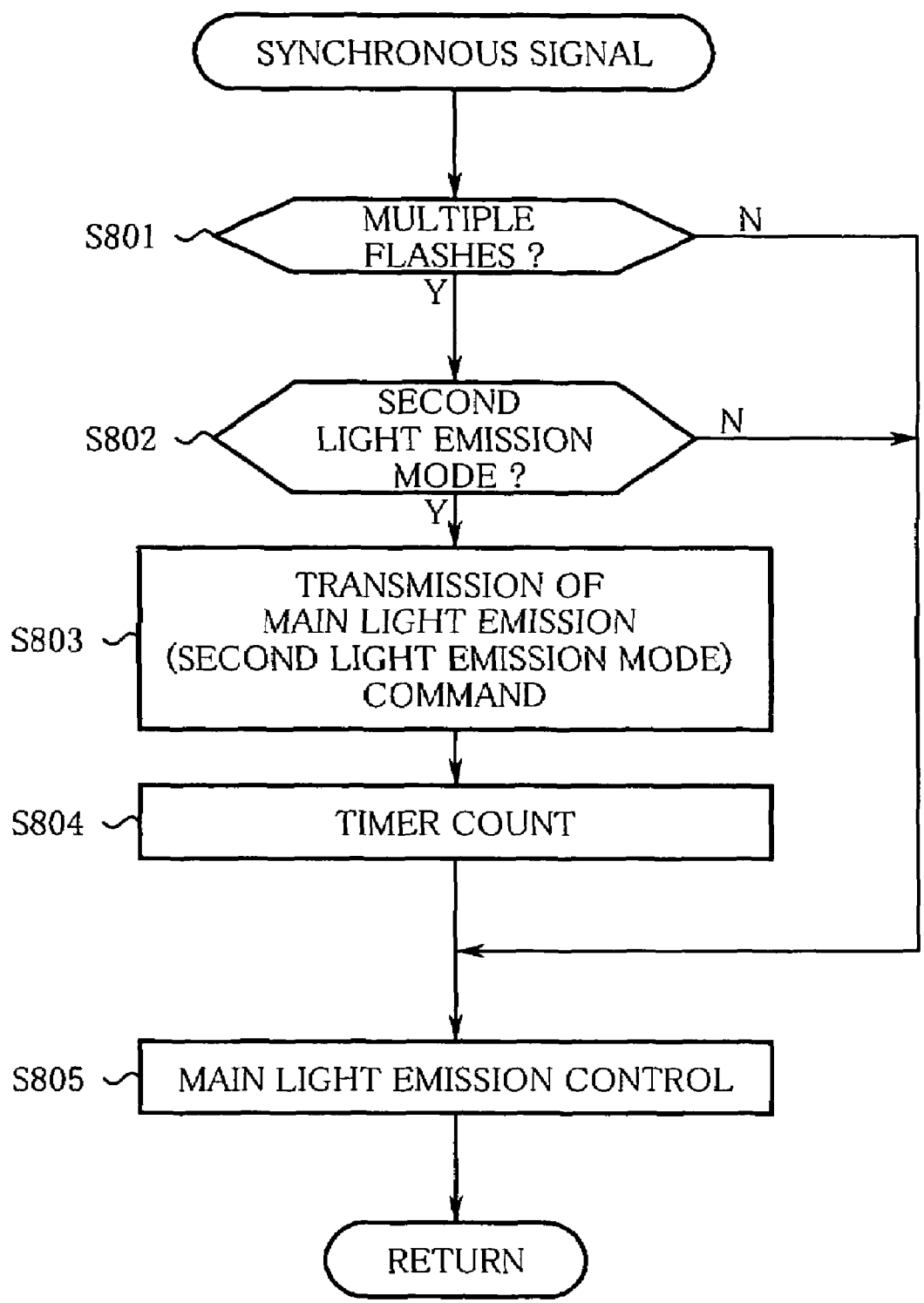
FIG. 28 is a flow chart showing a subroutine in the case where the master SB 50 receives a synchronous signal (X signal) form the camera 30.

FIG. 28 is a flow chart showing a subroutine of the master SB microcomputer 51 in the case that the master SB 50 receives a synchronous signal (X signal) from the camera 30. When S616 shown in FIG. 26 is executed, the master SB microcomputer 51 calls and executes the subroutine.

At S801, the master SB microcomputer 51 determines whether or not a multiple-flash photographing operation is preformed. When the multiple-flash photographing operation is performed, the flow advances to S802. When the multiple-flash photographing operation is not performed, the flow advances to S805.

At S802, the master SB microcomputer 51 determines whether or no the second light emission mode has been set. When the second light emission mode has been set, the flow advances to S803. When the second light emission mode has not been set, the flow advances to S805.

At S803, the master SB microcomputer 51 causes a main light emission (second light emission mode) command to be transmitted as a communication light emission. The command also indicates a timer period after which the main light emission is performed.

At S804, the master SB microcomputer 51 causes the timer to start counting. The timer counts the same time period as the timer that counts the time period after which the remote SB 60 performs the main light emission which is indicated by the communication light emission. When the timer has timed out, the flow advances to S805.

At S805, the master SB microcomputer 51 causes the master flash part 17 to perform the main light emission.

Figure 29:
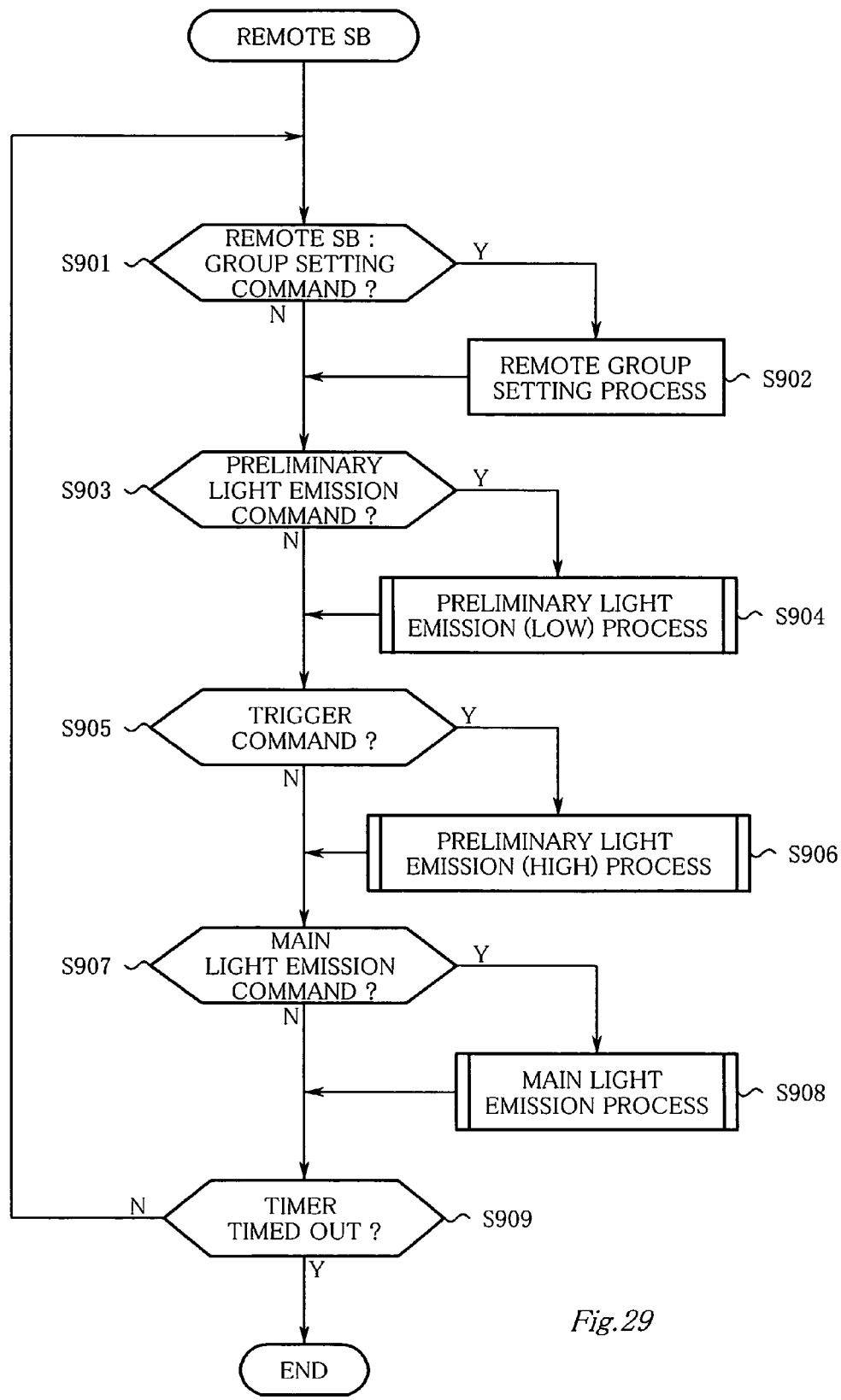
FIG. 29 is a flow chart showing a program of a remote SB microcomputer 61.

FIG. 29 is a flow chart showing a program of the remote SB microcomputer 61. When the power of the remote SB is turned on, the remote SB microcomputer 61 calls and executes the program.

At S901, the remote SB microcomputer 61 determines whether or not a group setting command for the remote SB has been received. When the group setting command for the remote SB has been received, the flow advances to S902. When the group setting command for the remote SB has not been received, the flow advances to S903.

At S902, the remote SB microcomputer 61 performs the remote group setting process.

At S903, the remote SB microcomputer 61 determines whether or not a preliminary light emission command has been received. When the preliminary light emission command has been received, the flow advances to S904. When the preliminary light emission command has not been received, the flow advances to S905.

Figure 30:
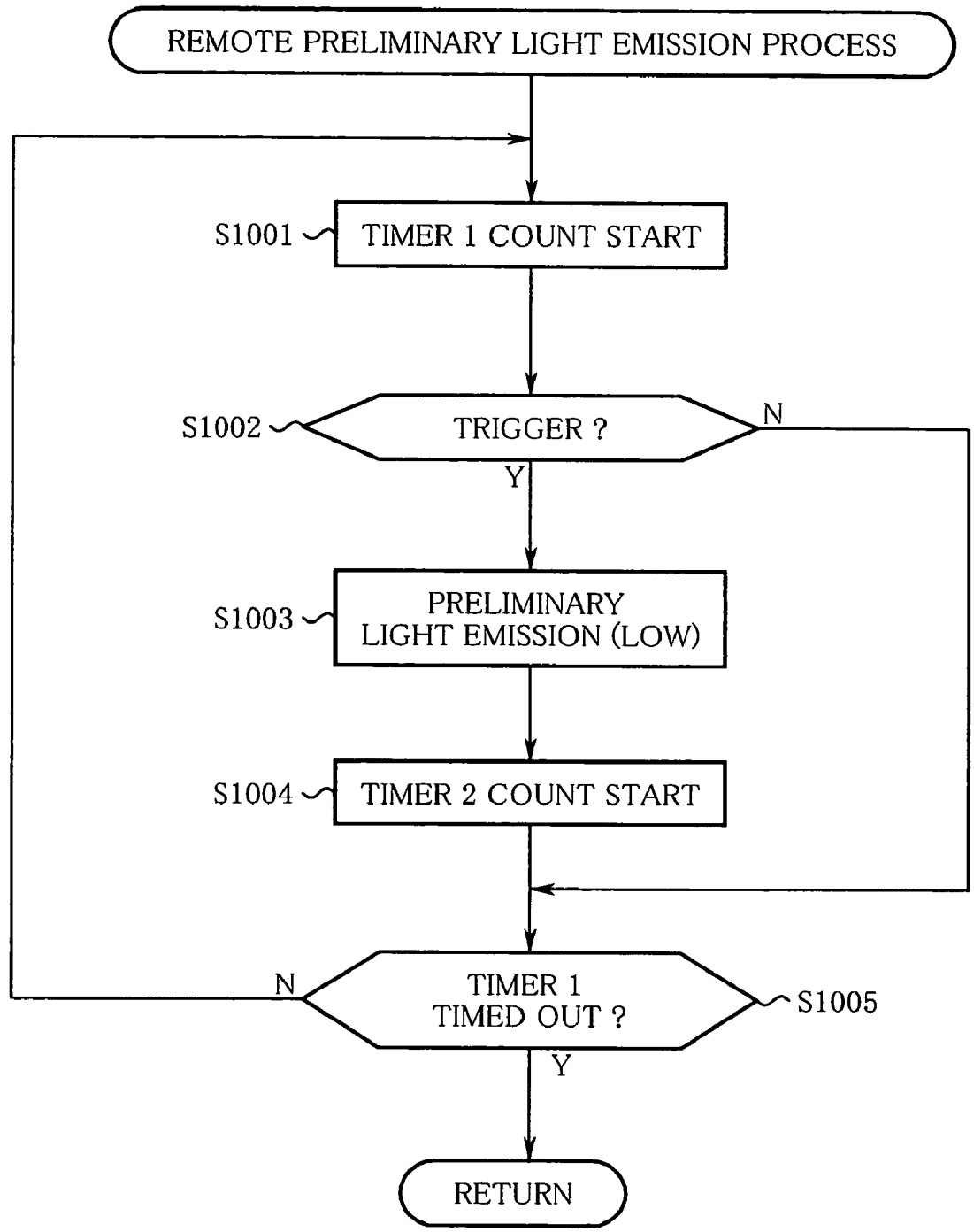
FIG. 30 is a flow chart showing a subroutine in the case where the remote SB 60 receives a remote preliminary light emission command from the master SB 50.

At S904, the remote SB microcomputer 61 performs a preliminary light emission (low) process (see FIG. 30).

At S905, the remote SB microcomputer 61 determines whether or not a trigger command has been received. The trigger command is a trigger that promote s a remote preliminary light emission (high) as a communication light emission to be performed at P10-12 shown in FIG. 10, for example. When the trigger command has been received, the flow advances to 5906. When the trigger command has not been received, the flow advances to S907.

Figure 31:
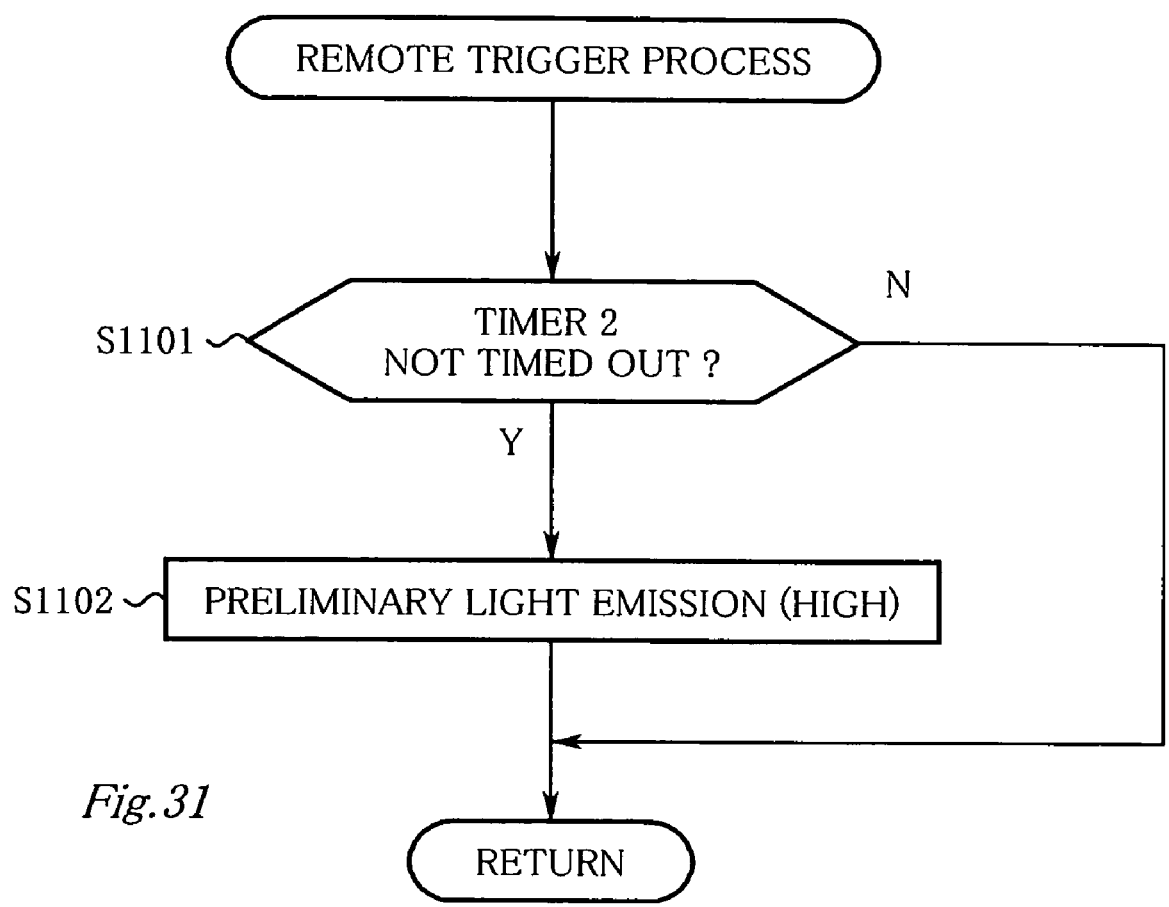
FIG. 31 is a flow chart showing a subroutine in the case where the remote SB 60 receives a trigger signal light command from the master SB 50.

At S906, the remote SB microcomputer 61 performs a preliminary light emission (high) process (see FIG. 31).

At S907, the remote SB microcomputer 61 determines whether or not a main light emission command has been received. The main light emission command is a command transmitted as a communication light emission performed immediately before a main light emission in for example P16-17, P18, P14-17, P12-17, and so forth. When the main light emission command has been received, the flow advances to S908. When the main light emission command has not been received, the flow advances to S909.

Figure 32:
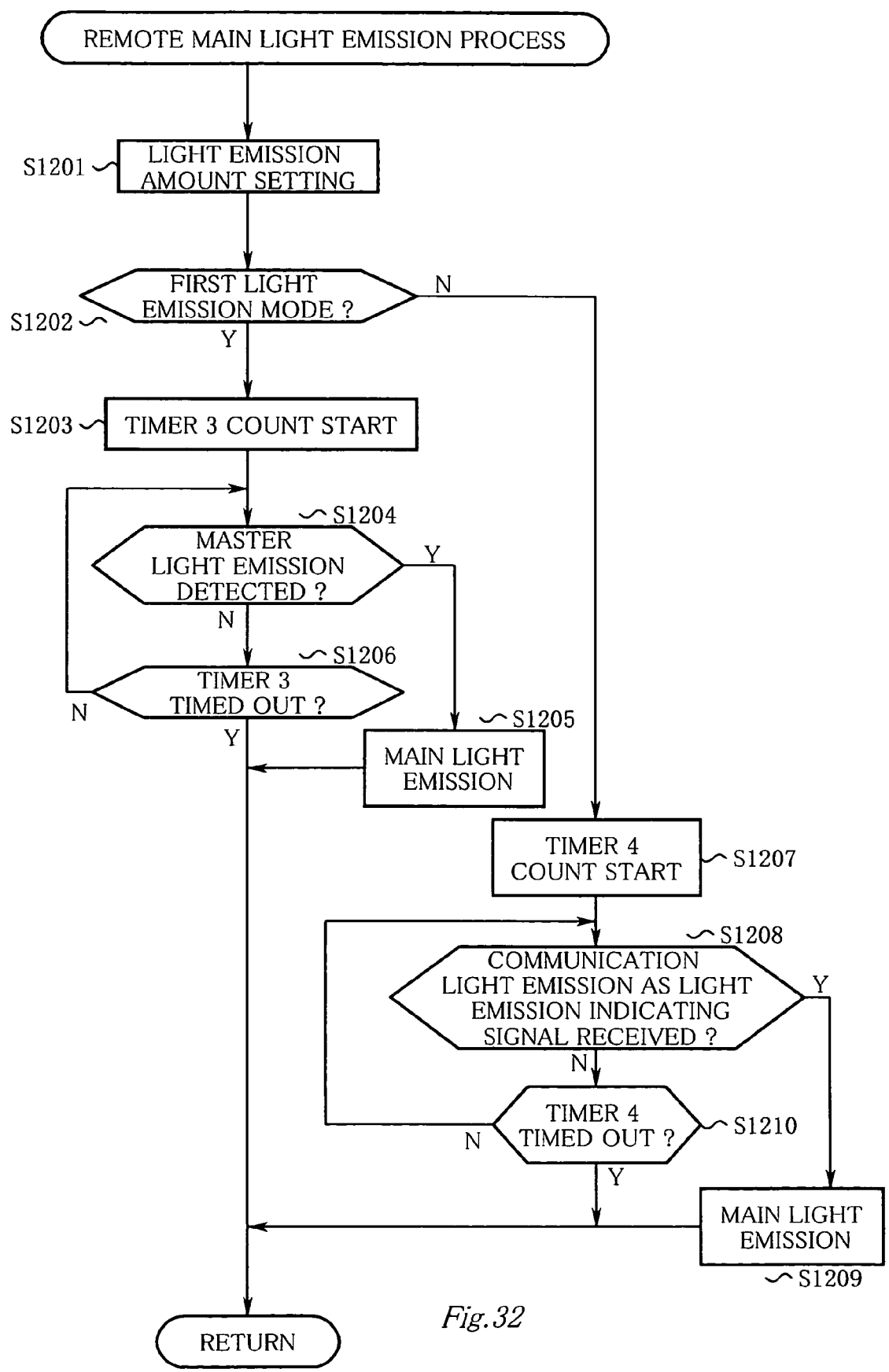
FIG. 32 is a flow chart showing a subroutine in the case where the remote SB 60 receives a main light emission command from the master SB 50.

At S908, the remote SB microcomputer 61 performs a main light emission process (see FIG. 32).

At S909, the remote SB microcomputer 61 determines whether or not the timer (SB auto sleep timer) has timed out. Specifically, the remote SB microcomputer 61 determines whether or not a predetermined time period has elapsed after the power has been turned on. When the predetermined time period has not elapsed (the timer has not timed out), the flow returns to S901. At S901, the remote SB microcomputer 61 repeats the process. When the timer has timed out, the remote SB microcomputer 61 completes the process.

FIG. 30 is a flow chart showing a subroutine of the remote SB microcomputer 61 in the case that the remote SB 60 receives a remote preliminary light emission command from the master SB 50. When S904 shown in FIG. 29 is executed, the remote SB microcomputer 61 calls and executes the subroutine.

At S1001, the remote SB microcomputer 61 causes the timer 1 to start counting.

At S1002, the remote SB microcomputer 61 determines whether or not a trigger has been received. The trigger at S1002 is a trigger light emission, for example, performed by the master flash part 17 after a preliminary light emission command of the A group as shown in P10-9 of FIG. 10. When the trigger has been received, the flow advances to S1003. When the trigger has not been received, the flow advances to S1005.

At S1003, the remote SB microcomputer 61 causes the remote flash part 19 to perform a preliminary light emission (low).

At S1004, the remote SB microcomputer 61 causes the timer 2 to start counting.

At S1005, the remote SB microcomputer 61 determines whether or not the timer 1 has timed out. When the timer 1 has timed out, the flow returns to the main program. When the timer 1 has not timed out, the flow returns to S1001. At S1001, the remote SB microcomputer 61 repeats the subroutine.

FIG. 31 is a flow chart showing the subroutine of the remote SB microcomputer 61 in the case that the remote SB 60 receives a trigger signal as a light command from the master SB 50. When S906 shown in FIG. 29 is executed, the remote SB microcomputer 61 calls and executes the subroutine.

At S1101, the remote SB microcomputer 61 determines whether or not the timer 2 that has started counting at S1004 shown in FIG. 30 has not timed out. When the timer 2 has not timed out, the flow advances to S1102. When the timer 2 has timed out, even if the trigger command has been received at S905 shown in FIG. 29, the remote SB microcomputer 61 does not cause the monitor light emission (high) to be preformed. Thereafter, the flow returns to the main program.

At S1102, the remote SB microcomputer 61 causes the remote flash part 19 to perform the monitor light emission (high).

FIG. 32 is a flow chart showing the subroutine of the remote SB microcomputer 61 in the case that the remote SB 60 receives the main light emission command from the master SB 50. When S908 shown in FIG. 29 is executed, the remote SB microcomputer 61 calls and executes the subroutine.

At S1201, the remote SB microcomputer 61 sets the light emission amount of the main light emission to the main light emission amount indicated by the communication light emission.

At S1202, the remote SB microcomputer 61 determines whether or not the first light emission mode is executed. Which to execute the first light emission mode or the second light emission mode is indicated by, for example, a communication light emission performed by the master flash part 17 in P16-16 shown in FIG. 16. When the first light emission mode is executed, the flow advances to S1203. When the second light emission mode is executed, the flow advances to S1207.

At S1203, the remote SB microcomputer 61 causes the timer 3 to start counting.

At S1204, the remote SB microcomputer 61 determines whether or not the main light emission of the master flash part 17 has been detected. When the main light emission of the master flash part 17 has been detected, the flow advances to S1205. When the main light emission of the master flash part 17 has not been detected, the flow advances to S1206.

At S1205, the remote SB microcomputer 61 causes the remote flash part 19 to immediately perform the main light emission in accordance with the main light emission amount that has been set.

At S1206, the remote SB microcomputer 61 determines whether or not the timer 3 has timed out. The timer 3 is used to accept the main light emission indicating signal of the main light emission of the master flash part 17 only within a predetermined time period that is set to the timer 3, after a communication light emission causes the first light emission mode to be executed. According to the present embodiment, one second is set for the predetermined value of the timer 3. Thus, even if the first light emission mode has been set, when the main light emission of the master flash part 17 is not detected after one second has elapsed, the remote flash part 19 does not perform the main light emission. Thus, even in the case where the main light emission of the master flash part 17 is cancelled, the remote SB can be prevented from mistakenly performing the light emission against light of another SB, fireworks, and so forth when a considerable time has elapsed after the cancellation.

One second as the predetermined value of the timer 3 is sufficiently longer than ½ second that is a threshold value with which the first light emission mode or the second light emission mode is automatically selected. Thus, even if one of the timers has an error, it can be prevented from malfunctioning. When the timer 3 has timed out, the flow returns to the main program. When the timer has not timed out, the flow returns to S1204.

At S1207, the remote SB microcomputer 61 causes the timer 4 to start counting.

At S1208, the remote SB microcomputer 61 determines whether or not a light emission indicating signal using a communication light emission has been received. A light emission indicating signal using a communication light emission is a communication light emission (main light emission command) performed by the master flash part 17 immediately before its main light emission in P16-18 shown in FIG. 16. When the light emission indicating signal using a communication light emission has been received, the flow advances to S1209. When the light emission indicating signal using a communication light emission has not been received, the flow advances to S1210.

At S1209, after the light emission indicating signal using a communication light emission has been received and a predetermined wait time period has elapsed, the remote flash part 19 performs the main light emission. At that point, after the same predetermined wait time period has elapsed, the master flash part 17 performs the main light emission after transmitting the light emission indicating signal using a communication light emission. Thus, the master flash part 17 and the remote flash part 19 can perform main light emissions at the same time (namely, they can be synchronized).

At S1210, the remote SB microcomputer 61 determines whether or not the timer 4 has timed out. When the timer 4 has timed out, the flow returns to the main program. When the timer 4 has not timed out, the flow returns to S1208.

According to the present embodiment, there are the first light emission mode in which the remote flash part 19 performs a main light emission by a light emission indicating signal using a main light emission of the master flash part 17 and the second light emission mode in which the remote flash part 19 performs a main light emission by a light emission indicating signal using a communication light emission of the master flash part 17. When the rear synchronous photographing operation is performed for relatively longer seconds, the second light emission mode is executed. Otherwise, the first light emission mode is executed. Thus, when the rear synchronous photographing operation is performed, light emission timings of a plurality of SBs can be securely synchronized and they can be prevented from malfunctioning.

In addition, since the first light emission mode and the second light emission mode can be freely selected when custom settings are performed, an optimum light emission mode can be executed in accordance with various photographing conditions.

When the second light emission mode is automatically selected and executed, the rear synchronous photographing operation is performed for relatively long seconds. Because of this, it takes a long time until performing flash light emission after the release switch is pressed. During that time, if an obstacle enters the photographic field, the photographer may want to cancel the photographing operation. In such a situation, according to the present embodiment, the remote flash part 19 can be prevented from automatically performing a light emission even if the photographing operation is cancelled, since the light emission indicating signal is transmitted immediately before the flash light emission. Alternatively, instead of not causing the remote flash part 19 to perform the main light emission when canceling the photographing operation, the main light emission command as a communication light emission may cause the remote flash part 19 to perform the main light emission after the cancel command is received. Thereafter, the rear curtain of the shutter may be closed.

In addition, according to the present embodiment, the rear synchronous photographing operation can be performed with bulb exposure even if multiple flashes are used.

(Effects of Present Embodiment)

Next, effects of the present embodiment will be described.

(1) According to the present embodiment, the first light emission mode in which the remote flash part 19 performs a light emission by a light emission indicating signal using a main light emission of the master flash part 17 and the second light emission mode in which the remote flash part 19 performs a light emission by a light emission indicating signal using a communication light emission of the master flash part 17 can be selected. Thus, a preferred synchronizing method for a multiple-flash photographing operation can be selected in accordance with photographing conditions. As a result, a multiple-flash photographing operation that is more securely synchronized and low on malfunctions can be performed.

(2) In addition, according to the present embodiment, when the second light emission mode is executed, after a predetermined wait time period has elapsed since the transmission of a light emission indicating signal as a communication light emission, the master flash part 17 and/or the remote flash part 19 is caused to perform a main light emission. The wait time period allows time periods required until the plurality of SBs 50 and 60 perform their light emissions to be adjusted. Thus, the main light emission of the master flash part 17 and the main light emission of the remote flash part 19 can be synchronized.

(3) In addition, the predetermined wait time period is set to a short time period to the extent that it ensures necessary time until the master flash part 17 and the remote flash part 19 start performing the main light emissions. Thus, since the light emission timings of the master flash part 17 and the remote flash part 19 are almost free of error, they can be synchronized.

(4) In addition, according to the present embodiment, when the second light emission mode is executed, a light emission indicating signal as a communication light emission is transmitted immediately before the shutter is closed. Thus, when a rear synchronous photographing operation or a bulb photographing operation is performed, the main light emission of the master flash part 17 and the main light emission of the remote flash part 19 can be synchronized, being almost free of malfunction.

(5) In addition, according to the present embodiment, when a main light emission is performed within a predetermined light-emission start time period after the shutter is released, the first light emission mode is executed. Otherwise, the second light emission mode is executed. The second light emission mode can be automatically selected in accordance with a photographing operation such as a rear synchronous photographing operation or a bulb photographing operation. As a result, the remote flash part 19 can be securely prevented form malfunctioning.

(6) In addition, according to the present embodiment, one of the first light emission mode and the second light emission mode can be selected and set in advance, in accordance with various photographing conditions.

(7) In addition, according to the present embodiment, the remote flash device 60 accepts a light emission indicating signal as a main light emission of the master flash part 17 only within a predetermined reception time period, after the remote flash device 60 is caused to execute the first light emission mode by a communication light emission. Thus, even if the main light emission of the master flash part 17 is cancelled, the master flash part 17 can be prevented from mistakenly performing a light emission.

(8) In addition, since the predetermined reception time period is sufficiently longer than the predetermined light-emission start time period, malfunction can be prevented even if any of timers has an error.

(Modifications)

According to the present invention, an electronic still camera using an imaging sensor such as a CCD was described. However, it should be noted that the present invention can be applied to a camera that exposes a silver-salt film.

In addition, when a so-called direct photometry system that measures surrounding light during exposure is used, the second light emission mode of the present invention can be executed. In this case, immediately before the shutter closing operation is started, the master flash part and the remote flash part can synchronously perform light emissions in accordance with the photometry value of the surrounding light.

The invention is not limited to the above embodiments and various modifications may be made without departing from the spirit and scope of the invention. Any improvement may be made in part or all of the components.

What is claimed is:

1. A flash control device for controlling a flash in synchronization with photographing operation of a camera, comprising:
   a master flash part; and
   a controlling part for controlling a light emission of the master flash part, wherein
   the controlling part has, as selectable light emission modes,
   a first light emission mode in which a remote flash part is given indication to perform a light emission by a light emission indicating signal using a main light emission of the master flash part, and
   a second light emission mode in which a communication light emission to the remote flash part is performed using a pulse light emission of the master flash part, and the remote flash part is given indication to perform a light emission by sending a light emission indicating signal using the communication light emission during exposure of said camera.

2. The flash control device as set forth in claim 1, wherein when the controlling part executes the second light emission mode, the controlling part transmits the light emission indicating signal of the communication light emission at a timing preceding the main light emission of the master flash part and/or the remote flash part by a predetermined wait time period.

3. The flash control device as set forth in claim 2, wherein the predetermined wait time period is a period necessary until the master flash part and/or the remote flash part starts to perform the main light emission after receiving the light emission indicating signal.

4. A flash control device for controlling a flash in synchronization with photographing operation of a camera, comprising:

a master flash part; and a controlling part for controlling a light emission of the master flash part, wherein the controlling part has, as selectable light emission modes, a first light emission mode in which a remote flash part is given indication to perform a light emission by a light emission indicating signal using a main light emission of the master flash part, a second light emission mode in which a communication light emission to the remote flash part is performed using a pulse light emission of the master flash part, and the remote flash part is given indication to perform a light emission by a light emission indicating signal using the communication light emission, and when the controlling part executes the second light emission mode, the controlling part transmits the light emission indicating signal of the communication light emission immediately before a shutter closing operation of the camera.

5. A flash control device for controlling a flash in synchronization with photographing operation of a camera, comprising:

a master flash part; and a controlling part for controlling a light emission of the master flash part, wherein the controlling part has, as selectable light emission modes, a first light emission mode in which a remote flash part is given indication to perform a light emission by a light emission indicating signal using a main light emission of the master flash part, a second light emission mode in which a communication light emission to the remote flash part is performed using a pulse light emission of the master flash part, and the remote flash part is given indication to perform a light emission by a light emission indicating signal using the communication light emission, and the controlling part selects the first light emission mode when the main light emission is performed within a predetermined light-emission start time period after a shutter of the camera is released, and selects the second light emission mode otherwise.

6. The flash control device as set forth in claim 1, wherein the controlling part is capable of fixing its light emission mode to either one of the first and the second light emission modes in advance.

7. A flash control system for controlling a flash in synchronization with photographing operation of a camera, comprising:

a master flash part;

a remote flash part; and a controlling part for controlling a light emission of the master flash part, wherein the controlling part has, as selectable light emission modes, a first light emission mode in which a remote flash part is given indication to perform a light emission by a light emission indicating signal using a main light emission of the master flash part, and a second light emission mode in which a communication light emission to the remote flash part is performed using a pulse light emission of the master flash part, and the remote flash part is given indication to perform a light emission by sending a light emission indicating signal using the communication light emission during exposure of said camera.

8. The flash control system as set forth in claim 7, wherein when the controlling part executes the second light emission mode, the controlling part transmits the light emission indicating signal of the communication light emission at a timing preceding the main light emission of the master flash part and/or the remote flash part by a predetermined wait time period, and the controlling part causes the master flash part to perform the main light emission after the predetermined wait time period has elapsed since the transmission of the light emission indicating signal of the communication light emission, and the remote flash part performs the main light emission after the predetermined wait time period has elapsed since the transmission of the light emission indicating signal of the communication light emission.

9. The flash control system as set forth in claim 8, wherein the predetermined wait time period is a period necessary until the master flash part and/or the remote flash part starts to perform the main light emission after receiving the light emission indicating signal.

10. A flash control system for controlling a flash in synchronization with photographing operation of a camera, comprising:

a master flash part;

a remote flash part; and a controlling part for controlling a light emission of the master flash part, wherein the controlling part has, as selectable light emission modes, a first light emission mode in which a remote flash part is given indication to perform a light emission by a light emission indicating signal using a main light emission of the master flash part, a second light emission mode in which a communication light emission to the remote flash part is performed using a pulse light emission of the master flash part, and the remote flash part is given indication to perform a light emission by a light emission indicating signal using the communication light emission, and when the controlling part executes the second light emission mode, the controlling part transmits the light emission indicating signal of the communication light emission immediately before a shutter closing operation of the camera.

11. A flash control system for controlling a flash in synchronization with photographing operation of a camera, comprising:

a master flash part;

a remote flash part; and a controlling part for controlling a light emission of the master flash part, wherein the controlling part has, as selectable light emission modes, a first light emission mode in which a remote flash part is given indication to perform a light emission by a light emission indicating signal using a main light emission of the master flash part, a second light emission mode in which a communication light emission to the remote flash part is performed using a pulse light emission of the master flash part, and the remote flash part is given indication to perform a light emission by a light emission indicating signal using the communication light emission, and the controlling part selects the first light emission mode when the main light emission is performed within a predetermined light-emission start time period after a shutter of the camera is released, and selects the second light emission mode otherwise.

12. A flash control system for controlling a flash in synchronization with photographing operation of a camera, comprising:
 a master flash part;
 a remote flash part; and
 a controlling part for controlling a light emission of the master flash part, wherein
 the controlling part has, as selectable light emission modes,
 a first light emission mode in which a remote flash part is given indication to perform a light emission by a light emission indicating signal using a main light emission of the master flash part,
 a second light emission mode in which a communication light emission to the remote flash part is performed using a pulse light emission of the master flash part, and the remote flash part is given indication to perform a light emission by a light emission indicating signal using the communication light emission, and
 the controlling part informs the remote flash part of the first light emission mode using the communication light emission, and
 when the remote flash part is informed of the first light emission mode using the communication light emission, the remote flash part accepts the light emission indicating signal using the main light emission of the master flash part only within a predetermined reception time period.

13. A flash control system for controlling a flash in synchronization with photographing operation of a camera, comprising:
 a master flash part;
 a remote flash part; and
 a controlling part for controlling a light emission of the master flash part, wherein
 the controlling part has, as selectable light emission modes,
 a first light emission mode in which a remote flash part is given indication to perform a light emission by a light emission indicating signal using a main light emission of the master flash part,
 a second light emission mode in which a communication light emission to the remote flash part is performed using a pulse light emission of the master flash part, and the remote flash part is given indication to perform a light emission by a light emission indicating signal using the communication light emission, and
 the controlling part selects the first light emission mode when the main light emission is performed within a predetermined light-emission start time period after a shutter of the camera is released, selects the second light emission mode otherwise, and informs the remote flash part of the first light emission mode using the communication light emission when the controlling part has selected the first light emission mode,
 when the remote flash part is informed of the first light emission mode using the communication light emission, the remote flash part accepts the light emission indicating signal using the main light emission of the master flash part only within a predetermined reception time period, and
 the predetermined reception time period is longer than the predetermined light-emission start time period.

14. The flash control system as set forth in claim 7, wherein the controlling part is capable of fixing its light emission mode to either one of the first and the second light emission modes in advance.

15. A master flash device for controlling a flash in synchronization with photographing operation of a camera, comprising:
 a master flash part;
 a controlling part for controlling a light emission of the master flash part; and
 an input part for accepting light emission indication from the camera, wherein
 the controlling part has, as selectable light emission modes,
 a first light emission mode in which the light emission indication accepted from the camera is transmitted to the remote flash part using a main light emission of the master flash part, and
 a second light emission mode in which the light emission indication accepted from the camera is transmitted, during exposure of said camera, to the remote flash part using a communication light emission by a pulse light emission of the master flash part.

16. The master flash device as set forth in claim 15, wherein
 when the controlling part executes the second light emission mode, the controlling part transmits a light emission indicating signal of the communication light emission at a timing preceding the main light emission of the master flash part and/or the remote flash part by a predetermined wait time period.

17. A master flash device for controlling a flash in synchronization with photographing operation of a camera, comprising:
 a master flash part;
 a controlling part for controlling a light emission of the master flash part; and
 an input part for accepting light emission indication from the camera, wherein
 the controlling part has, as selectable light emission modes,
 a first light emission mode in which the light emission indication accepted from the camera is transmitted to the remote flash part using a main light emission of the master flash part,
 a second light emission mode in which the light emission indication accepted from the camera is transmitted to the remote flash part using a communication light emission by a pulse light emission of the master flash part, and
 the controlling part selects the first light emission mode when the main light emission is performed within a predetermined light-emission start time period after a shutter of the camera is released, and selects the second light emission mode otherwise.

18. A remote flash device usable with a camera, comprising:
 a remote flash part; and
 a multiple-flash controlling part for controlling a light emission of the remote flash part, wherein
 the multiple-flash controlling part has, as selectable light emission modes,
 a first light emission mode in which a main light emission of the master flash part is detected and the remote flash part is caused to perform a main light emission, and a second light emission mode in which a pulse light emission of the master flash part is received as a communication light emission before a shutter closing operation of the camera and the remote flash part is caused to perform the main light emission in accordance with the communication light emission.

19. The remote flash device as set forth in claim 18, wherein the multiple-flash controlling part performs the main light emission after a predetermined wait time period has elapsed since the transmission of a light emission indicating signal using the communication light emission.

20. A remote flash device, comprising:

a remote flash part; and a multiple-flash controlling part for controlling a light emission of the remote flash part, wherein the multiple-flash controlling part has, as selectable light emission modes, a first light emission mode in which a main light emission of the master flash part is detected and the remote flash part is caused to perform a main light emission, a second light emission mode in which a pulse light emission of the master flash part is recieved as a communication light emission and the remote flash part is caused to perform the main light emission in accordance with the communication light emission, and the multiple-flash controlling part accepts selection indication of the first light emission mode by the communication light emission from the master flash part, and accepts light emission indication using the main light emission of the master flash part within a predetermined reception time period when the multiple-flash controlling part receives the selection indication of the first light emission mode.

* * * * *